US008622431B2

(12) United States Patent
 Singh

(10) Patent No.: US 8,622,431 B2
(45) Date of Patent: *Jan. 7, 2014

(54) SEATBELT HARNESSES FOR PETS SUCH AS DOGS FOR USE WITH A VEHICLE SEATBELT SYSTEM TO RESTRAIN THEM FOR PROTECTION DURING THEIR TRAVEL IN A VEHICLE

(76) Inventor: Sanjeev Kumar Singh, Danbury, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 13/397,823

(22) Filed: Feb. 16, 2012

(65) Prior Publication Data

US 2012/0204812 A1    Aug. 16, 2012

Related U.S. Application Data

(63) Continuation-in-part of application No. 13/241,695, filed on Sep. 23, 2011, now Pat. No. 8,292,329, which is a continuation of application No. 12/916,184, filed on Oct. 29, 2010, now Pat. No. 8,056,927, which is a continuation of application No. 11/951,575, filed on Dec. 6, 2007, now abandoned, which is a continuation-in-part of application No. 11/852,714, filed on Sep. 10, 2007, now Pat. No. 7,699,348.

(51) Int. Cl.
 *B60R 22/10* (2006.01)

(52) U.S. Cl.
 USPC .......................................................... 280/806

(58) Field of Classification Search
 USPC ............................................. 280/801.1, 806
 IPC ...................... A01K 270/00,29/00; B60R 22/10
 See application file for complete search history.

(56) References Cited

U.S. PATENT DOCUMENTS

| 2,695,052 | A |   | 11/1954 | Yales et al. |
| 3,310,034 | A |   | 3/1967  | Dishart |
| 3,576,056 | A |   | 4/1971  | Barcus |
| 4,143,914 | A |   | 3/1979  | Klich |
| 4,226,474 | A |   | 10/1980 | Rupert et al. |
| 4,324,204 | A | * | 4/1982  | Friedman ...................... 119/771 |
| 4,366,604 | A |   | 1/1983  | Anthony et al. |
| 4,537,154 | A |   | 8/1985  | Kay |
| 4,679,852 | A |   | 7/1987  | Anthony et al. |

(Continued)

OTHER PUBLICATIONS

Non-Final Rejection mailed Jun. 15, 2009 for U.S. Appl. No. 11/852,714, filed Sep. 10, 2007, 19 pages.

(Continued)

*Primary Examiner* — Nicole Verley
(74) *Attorney, Agent, or Firm* — Sanjeev K. Singh

(57) ABSTRACT

For protection of a dog during travel in a motor vehicle, in one embodiment, a seatbelt harness may include a restraint portion coupled to an attachment portion that may have first and second connectors which are either fixedly or removably attached to the restraint portion. The first connector may be adapted to attach to a seatbelt or a first belt connector in their default positions and the second connector may be adapted to attach to a second belt connector or an anchor. The positions of first and second connectors may be selected for aligning them with the restraint portion such that the attachment portion to act in conjunction with the restraint portion to enable positioning of the pet on a vehicle seat at an intermediate point along a longitudinal path between the first belt connector and the second belt connector or between the first belt connector and the anchor.

20 Claims, 52 Drawing Sheets

(56) References Cited

U.S. PATENT DOCUMENTS

| | | |
|---|---|---|
| 4,715,618 A | 12/1987 | Harris |
| 4,817,562 A | 4/1989 | Giroux |
| 4,970,991 A | 11/1990 | Luce |
| 5,035,203 A | 7/1991 | Cardenas |
| 5,131,682 A | 7/1992 | Reed |
| 5,154,660 A | 10/1992 | Snyder et al. |
| 5,167,203 A | 12/1992 | Scott et al. |
| 5,427,061 A | 6/1995 | McCullough |
| 5,529,018 A * | 6/1996 | Butts ............................ 119/792 |
| 5,806,467 A | 9/1998 | Arakawa |
| 5,836,656 A | 11/1998 | Baggott |
| 5,909,927 A | 6/1999 | Henshall |
| 5,915,335 A | 6/1999 | Holt |
| 6,027,127 A | 2/2000 | Olson et al. |
| 6,033,029 A | 3/2000 | Henshall |
| D424,761 S | 5/2000 | Mortenson |
| 6,101,979 A | 8/2000 | Wilson et al. |
| 6,192,835 B1 | 2/2001 | Calhoun et al. |
| 6,253,713 B1 * | 7/2001 | Giedeman et al. ............ 119/771 |
| 6,427,635 B1 | 8/2002 | Ballard |
| 6,564,749 B1 | 5/2003 | Dorsey |
| 6,637,377 B2 | 10/2003 | Lobanoff et al. |
| 7,357,099 B2 | 4/2008 | Smith et al. |
| 7,699,348 B2 | 4/2010 | Singh |
| 8,056,927 B2 | 11/2011 | Singh |
| 2004/0025804 A1 | 2/2004 | Smith et al. |

OTHER PUBLICATIONS

Final Rejection mailed Dec. 7, 2009 for U.S. Appl. No. 11/852,714, filed Sep. 10, 2007, 16 pages.

Notice of Allowance mailed Feb. 12, 2010 for U.S. Appl. No. 11/852,714, filed Sep. 10, 2007, 14 pages.

Non-Final Rejection mailed Dec. 15, 2009 for U.S. Appl. No. 11/951,575, filed Dec. 6, 2007, 17 pages.

Second Non-Final Rejection mailed May 19, 2010 for U.S. Appl. No. 11/951,575, filed Dec. 6, 2007, 3 pages.

Final Rejection mailed Jul. 29, 2010 for U.S. Appl. No. 11/951,575, filed Dec. 6, 2007, 11 pages.

Non-Final Rejection mailed Mar. 18, 2011 for U.S. Appl. No. 12/916,184, filed Oct. 29, 2010, 10 pages.

Notice of Allowance mailed Sep. 2, 2011 for U.S. Appl. No. 12/916,184, filed Oct. 29, 2010, 5 pages.

Restriction Requirement Office Action mailed Jan. 18, 2012 for U.S. Appl. No. 13/241,695, filed Nov. 23, 2011, 5 pages.

* cited by examiner

SEATBELT HARNESSES FOR PETS SUCH AS DOGS FOR USE WITH A VEHICLE SEATBELT SYSTEM TO RESTRAIN THEM FOR PROTECTION DURING THEIR TRAVEL IN A VEHICLE

CROSS REFERENCE TO RELATED APPLICATIONS

This application is a continuation-in-part of U.S. patent application of U.S. Ser. No. 13/241,695, field Sep. 23, 2011, which is a continuation application of U.S. Ser. No. 12/916, 184, filed Oct. 29, 2010 (now a U.S. Pat. No. 8,056,927), which is a continuation application of U.S. Ser. No. 11/951, 575, filed Dec. 6, 2007, which is a continuation-in-part of U.S. patent application U.S. Ser. No. 11/852,714, filed on Sep. 10, 2007 (now a U.S. Pat. No. 7,699,348), all of which are incorporated by reference herein in their entirety.

FIELD OF THE INVENTION

This invention relates generally to seatbelt harnesses for pets such as dogs and they are intended to be used for their protection during travel in a motor vehicle by directly connecting to a vehicle seatbelt system including a seatbelt webbing lock-release system.

DESCRIPTION OF THE RELATED ART

About 70 million plus homes in United States of America have a pet and 50% of those have two pets. Whether it's a quick trip to the supermarket or a long ride to the beach, companion animals are now traveling animals too and pet friendly lodging has increased 300% since 2005. For example, 82% of pets travel on vacation with their owners. However, 98% of dogs do not travel properly restrained in a moving vehicle. When driving at 35 mph speed, a 60-pound unrestrained dog can cause an impact of 2,700 lbs, slamming into a motor vehicle seat, windshield, or driver/passenger(s). In fact, driver distraction causes more accidents than any other issue.

An average of seventy five percent family pets visit veterinary clinic every year for treatment. Forty percent of all vet fees come from unforeseen illnesses or accidents. Only 20% of family pets are covered by a pet insurance. The average vet bill for attention and care needed following a road accident involving a cat or dog last year was around $1000 to $1,500.

Traveling in a vehicle with a dog can pose a serious danger to the pet. In an accident, a pet—like a person—can exert a force of 20 times its body weight if it is not properly restrained. Should another passenger collide with a pet, serious, life-threatening injuries can result to both occupants. Even worse, a dog can be thrown from a vehicle in a collision. For pet safety during their travel in a vehicle, use of a variety of pet containers or harnesses types and designs is known in the prior art. Several of these known pet containers or harnesses comprise familiar, expected and obvious structural configurations, notwithstanding the myriad of designs encompassed by the many of such pet containers or harnesses which have been devised to fulfill numerous objectives and requirements associated with pet travel in a vehicle.

While these solutions fulfill their respective, particular objectives and requirements, many known pet restraining container or harness systems fail to disclose a way for easier use in a vehicle for safely securing a pet. More particularly, such known solutions do not enable a safe, secure and comfortable environment for a pet traveling in a vehicle as is otherwise available to human occupants of the vehicle. When the pet is traveling within the vehicle, these known solutions to the pet safety during their travel in a vehicle fail to safely and controllably restrain a pet during a collision or sudden breaking of the vehicle.

SUMMARY OF THE INVENTION

The following presents a simplified summary of the present invention in order to provide a basic understanding of some aspects thereof. It is neither an exhaustive overview of the invention nor intended to identify key or critical elements of the invention or to delineate its scope. Its sole purpose is to act as a prelude to detailed description set forth later. This invention is directed to overcoming, or at least reducing, the effects of, one or more of the problems set forth above.

In one exemplary embodiment of the present invention, a seatbelt harness is provided to restrain a pet such as a dog in a motor vehicle. The vehicle may include a vehicle seat and an associated shoulder lap belt combination seatbelt system that has at least one of a seatbelt connected to a seatbelt webbing lock-release system, a first belt connector connected to the seatbelt, a second belt connector and an anchor that connects to an auto child seat all of which are being provided near or at the vehicle seat. The seatbelt harness may include a restraint portion configured to be worn by the pet on their torso. The seatbelt harness may further include an attachment portion that is coupled or couples to the restraint portion. The attachment portion may have at least one of first and second connectors each of which have a free end. The first connector may be adapted to couple to at least one of the seatbelt or the first belt connector in default positions thereof during a state of non-operating mode. The first connector may connect the attachment portion directly to the seatbelt webbing lock-release system via the seatbelt. The second connector may be adapted to couple to at least one of the second belt connector or the anchor. While the first connector may be configured and arranged at a first predetermined position, the second connector may be configured and arranged at a second predetermined position relative to the first determined position. The first and second predetermined positions may be selected for aligning the first and second connectors with the restraint portion such that the attachment portion to act in conjunction with the restraint portion. This arrangement or configuration may enable positioning of the pet on the vehicle seat at an intermediate point along a longitudinal path between the first belt connector and the second belt connector or between the first belt connector and the anchor.

In another exemplary embodiment of the present invention, a kit for a seatbelt harness is provided to restrain a pet such as a dog in a motor vehicle. The vehicle may include a vehicle seat and an associated shoulder/lap belt combination seatbelt system that has at least one of a seatbelt connected to a seatbelt webbing lock-release system, a first belt connector connected to the seatbelt, a second belt connector and an anchor that connects to an auto child seat all of which are being provided near or at the vehicle seat. The seatbelt harness kit may include a restraint portion that may be configured to be worn by the pet on their torso. The seatbelt harness kit may further include an attachment portion that may be configured to be removably coupled to the restraint portion. The attachment portion may have at least one of first and second connectors each of which have a free end. The first connector may be adapted to couple to at least one of the seatbelt or the first belt connector in default positions thereof during a state of non-operating mode. The first connector may connect the attachment portion directly to the seatbelt webbing lock-release system via the seatbelt. The second connector may be adapted to couple to at least one of the second belt connector or the anchor. While the first connector may be configured and arranged at a first predetermined position, the second connector may be configured and arranged at a second predetermined position relative to the first determined position. The first and second predetermined positions may be selected for aligning the first and second connectors with the restraint portion such that the attachment portion to act in conjunction with the restraint portion. This arrangement/configuration may enable positioning of the pet on the vehicle seat at an intermediate point along a longitudinal path between the first belt connector and the second belt connector or between the first belt connector and the anchor.

BRIEF DESCRIPTION OF THE DRAWINGS

The invention may be understood by reference to the following description taken in conjunction with the accompanying drawings, in which like reference numerals identify like elements, and in which.

Figure 1:
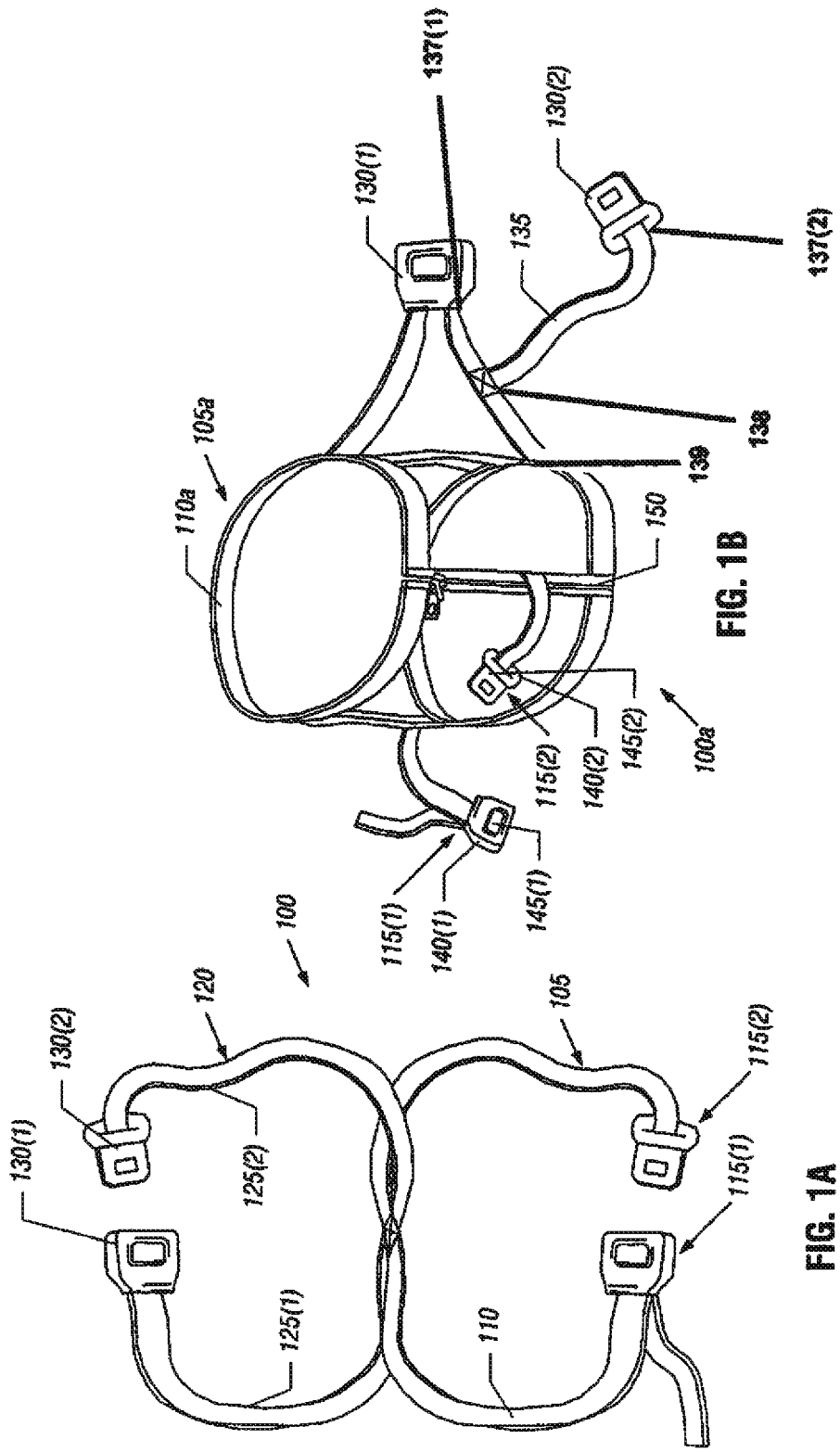
FIG. 1A schematically illustrates a safety restrainer for securing a pet in a vehicle having a seat belt with a first seat belt prong to latch into a first seat belt buckle in accordance with one exemplary embodiment of the present invention.
FIG. 1B schematically illustrates a safety belt for use in a vehicle having a seat belt system including a first buckle and a first prong to securely restrain a pet consistent with one illustrative embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF EXEMPLARY EMBODIMENTS

Illustrative embodiments of the present invention are described below. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Generally, a method and apparatus are provided for safely and comfortably restraining a pet within a motor vehicle for their protection during travel according to various embodiments of the present invention. For example, embodiments of seatbelt harnesses are provided for pets such as dogs. These seatbelt harnesses are intended to be used in a motor vehicle by directly connecting them to a vehicle seatbelt system including a seatbelt connected to a seatbelt webbing lock-release system, a buckle, a prong and/or an anchor for attaching an auto child seat. Consistent with one embodiment of the present invention, a seatbelt harness securely, flexibly and controllably restrains a pet for his/her protection during travel in a vehicle. More particularly, a seatbelt harness as a pet travel safety device is provided which a pet may wear while traveling in the vehicle to protect him/her from harm during a collision or sudden maneuvering or sudden braking of the vehicle. It is to be understood that all the embodiments may be used in combination with one or more other embodiments. For instance, a seatbelt harness may include a restraint portion and an attachment portion wherein a harness may be provided to connect a first connector of the attachment portion to the restraint portion in combination with a second connector of the attachment portion which may be directly attached to the restraint portion without a harness. That is, either no harnesses are provided or one or more harnesses are provided in the attachment portion. Likewise, one connector is attached to the harness of the attachment portion or two connectors are attached to it. And one or more such harnesses may be directly attached to the restraint portion or include one connector to couple to another connector of the restraint portion. Accordingly, many permutations and combinations of no or one or more connectors and no or one or more harnesses for coupling the restraint portion to the attachment portion and coupling the attachment portion to the vehicle are provided. The restraint portion may be configured in a form of a vest to be worn on the body of a pet such as on the torso of a dog. The vest may include a male and female connector such as a buckle and a prong or mating Velcro to engage the body of the dog. The harnesses can be adjusted to a desired length when they are present in the seatbelt harness. In some embodiments, connectors directly or fixedly attach to the vest without the use of a harness. The vest may have one or more connectors such as D-rings to attach to harnesses of the attachment portion or directly to connectors of the attachment portion which are provided to attach to either the seatbelt, belt connectors such as a buckle, a prong and/or an anchor. These connectors of the attachment portion may be user-operable buckle type connectors with an open mouth or regular buckles or prongs. For example, to restrain a pet in a motor vehicle a seatbelt harness may include a restraint portion coupled to an attachment portion that may have first and second connectors which may be either fixedly or removably attached to the restraint portion. The first connector may be adapted to attach to a seatbelt or a first belt connector in their default positions and the second connector may be adapted to attach to a second belt connector or an anchor. The first and second connectors may be disposed relative to each other at first and second predetermined positions, respectively. The first and second predetermined positions may be selected for aligning the first and second connectors with the restraint portion such that the attachment portion to act in conjunction with the restraint portion to enable positioning of the pet on a vehicle seat at an intermediate point along a longitudinal path between the first belt connector and the second belt connector or between the first belt connector and the anchor. The first belt connector may be connected to the seatbelt which is generally further connected to the seatbelt webbing lock-release system of the shoulder/lap belt combination seatbelt system. The seatbelt webbing lock-release system may be configured and arranged to lock a given position on the pet upon at least one of a vehicle collision, a sudden braking or deceleration and a sudden maneuvering of the motor vehicle. In use, the restraint portion may have a first distance from the default position of the seatbelt or the default position of the first belt connector and the restraint portion may have a second distance from the free end of the second connector such that the second distance determines the maximum increase allowable to the first distance. Likewise, a kit for such a seatbelt harness may also be provided.

Accordingly, in one embodiment, a seatbelt harness called as a pet travel safety device (k9 Seatbelt™) for dogs is designed to protect them from injury during ride in a vehicle by directly attaching the dog to the seat belt webbing lock-release system of a vehicle seatbelt. So this design enables a dog to stand or stretch while providing an unmatched degree of safety in comparison to any competing products sold today in the market. This seatbelt harness attaches the dog to the vehicle seatbelt system to protect the dog just like a vehicle seatbelt protects humans by connecting the dog to a vehicle's seatbelt webbing lock-release system. This seatbelt harness doubles up as a vest having a D-ring which can be connected to a leash for taking the dog for a walk. Its competitive advantage is that the seatbelt harness couples to both a vehicle seatbelt buckle and a vehicle seatbelt prong/tongue or anchor for restraining a dog within a vehicle seat area. This seatbelt harness secures the dog by locking only during collision or sudden braking while staying flexible in otherwise normal travel conditions. The seatbelt harness may be made of two parts, one—a restraint vest to go over the torso of the dog and second—a harness having two connectors (e.g., a buckle and a prong but instead of the buckle/prong it can be a snap-hook type connector) meant to attach to the vehicle seat buckle and prong. In this embodiment, a lower strap of the harness connects to the vest at the belly of the dog (under or bottom) and an upper strap of the harness connects to the vest at the back of the dog (top). The length of the lower strap gives enough leverage to the dog to stand and move freely. The upper strap connects to the prong or tongue of the vehicle seatbelt which is coupled to the seatbelt webbing lock-release system of the vehicle. This seatbelt harness increases comfort as when the dog is at ease and in the absence of a jerk, break or collision the upper strap can be released as much as the dog wishes (only restricted by the length of the lower strap). This seatbelt harness improves safety since a dog has no problem in standing, stretching or moving but as soon as the jerk or collision happens the vehicle seatbelt webbing lock-release system kicks in and locks the dog's position where it was before the jerk or collision just like how the vehicle seatbelt system locks a vehicle occupant in its position in case of an accident.

It is to be understood that the present invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that this disclosure may readily be utilized as a basis for the designing of other structures, methods and systems for carrying out the several purposes of the present invention. It is important, therefore, that the claims be regarded as including such equivalent constructions insofar as they do not depart from the spirit and scope of the present invention. The abstract is neither intended to define the invention of the application nor is it intended to be limiting as to the scope of the invention in any way.

Embodiments of the present invention may provide a seatbelt harness which may be easily and efficiently manufactured and marketed. Embodiments of the present invention may also provide a seatbelt harness which is of a durable and reliable construction. Embodiments of the present invention may provide a seatbelt harness which is susceptible of a low cost of manufacture with regard to both materials and labor, and which accordingly is then susceptible of low prices of sale to the consuming public, thereby making such seatbelt harness economically available to the buying public. Embodiments of the present invention may provide a seatbelt harness which provides in the systems and methods of the prior art some of the advantages thereof, while simultaneously overcoming some of the disadvantages normally associated therewith. Embodiments of the present invention may provide a seatbelt harness for restraining a pet traveling in a vehicle having a seatbelt with a buckle, a prong and/or an anchor. Embodiments of the present invention may provide a seatbelt harness that restricts movement of a pet in the vehicle making transporting a pet more enjoyable. Embodiments of the present invention may provide a seatbelt harness for protecting a pet traveling in a vehicle that is involved in a collision. The pet is secured to the interior of the vehicle preventing the pet from being injured by being thrown about the interior of the vehicle or from being thrown from the vehicle. The present invention also protects a passenger traveling in the vehicle from being injured by a pet that is thrown about the interior of the vehicle.

Referring to FIG. 1A, a safety restrainer 100 is illustrated for securing a pet in a vehicle having a seat belt (not shown) with a first seat belt prong that latches into a first seat belt buckle in accordance with one exemplary embodiment of the present invention. The safety restrainer 100 may comprise a restraint assembly 105 including a restraint strap 110 removably couplable to a body portion (not shown) of the pet. The restraint assembly 105 may be positionable about the body of the pet and the restrain strap 110 positionable between a pair of fore legs and a pair of hind legs of the pet. A suitable structural form of a restraint assembly is disclosed in U.S. Pat. No. 6,564,749, entitled "Pet Restraining Harness System" and is incorporated herein by reference in its entirety.

The restraint strap 110 may include a first strap end 115(1) and a second strap end 115(2) being releaseably couplable to each other such that the restraint strap 110 forms a loop having a hole when the first and second strap ends 115 (1,2) are releaseably coupled together. The safety restrainer 100 may further comprise a harness 120 coupled to the restraint assembly. The harness 120 may be releasably couplable to the seat belt of the vehicle for flexibly restraining the pet. The harness 120 may include a first harness end 125(1) and a second harness end 125(2). The first harness end 125(1) having a second seat belt buckle 130(1) for releasably coupling to the first seat belt prong (not shown) and the second harness end 125(2) having a second seat belt prong 130(2) for releasably coupling to the first seat belt buckle (not shown). A suitable structural form of a restraint strap and a harness is disclosed in U.S. Pat. No. 5,628,548, entitled "Vehicular Passenger Restraint Systems" and is incorporated herein by reference in its entirety.

Turning now to FIG. 1B, a safety belt 100a is schematically illustrated for use in a vehicle having a seat belt system (not shown) including a first buckle and a first prong to securely restrain a pet during a collision of the vehicle and/or sudden braking of the vehicle consistent with one illustrative embodiment of the present invention. For the safety restrainer 100 or the safety belt 100a, the second seat belt buckle 130(2) to couple to a leash 135 for flexibly restricting movement of the pet in the vehicle when coupled to the first seat belt prong.

According to one embodiment of the present invention, the first strap end 115(1) of a restraint strap 110a may comprise an adjustable coupling member 140(1) and the second strap end 115(2) may comprise a securing member 140(2) for coupling each of the strap ends of the restraint strap 110a together such that the restraint strap 110a is adjustably restrictable about the body of the pet. In this way, the restraint strap 110a may safely protect the pet while the safety belt 100a controllably restrains movement of the body of the pet in response to at least one of a collision of the vehicle or sudden braking of the vehicle by using the seat belt system. The adjustable coupling member 140(1) may comprise a user operable buckle 145(1) to adjust the length of the restraint strap 110a and the securing member 140(2) may comprise a prong 145(2) to couple with the user operable buckle 145(1). This coupling may restrict movement of the torso of the pet in response to an impact force that the vehicle may experience in the event of a collision or sudden braking.

In one embodiment of the present invention, to provide further safety to the pet by avoiding severe bodily injury to the pet, the restraint assembly 105a may further comprise a zipper 150. The zipper 150 may enable a relatively secure grip of the pet's body by the safety belt 100a in addition to evenly distributing the impact of forces on the body of the pet during an accident such as a collision or sudden braking.

Figure 2:
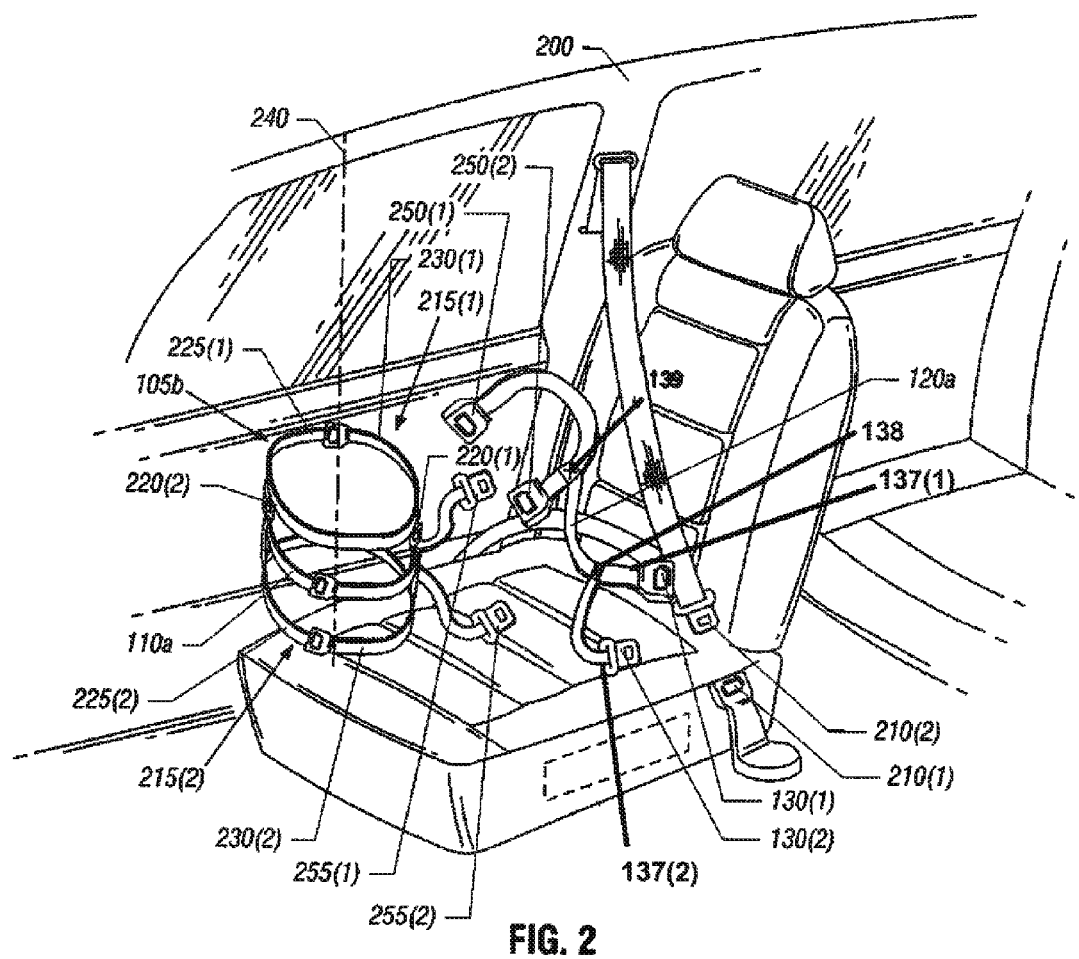
FIG. 2 schematically illustrates the safety belt for use in a vehicle having a seat belt system including a first buckle and a first prong to securely restrain a pet during a collision of the vehicle and/or sudden braking of the vehicle consistent with one embodiment.

Referring to FIG. 2, it schematically illustrates the safety belt 100a of FIG. 1B for use in a vehicle 200 having a seat belt system including a first buckle 210(1) and a first prong 210(2) to securely restrain a pet (not shown) during a collision of the vehicle 200 and/or sudden braking of the vehicle 200 consistent with one illustrative embodiment of the present invention. A suitable seat belt system is disclosed in U.S. Pat. No. 7,204,334, entitled "Occupant Restraint System" and is incorporated herein by reference in its entirety.

The restraint assembly 105b further includes an upper restraint strap 215(1) being positionable about the body of the pet and positionable adjacent to the pair of fore legs of the pet. The restraint assembly 105b further comprises a lower restraint strap 215(2) being positionable about the body of the pet and positionable adjacent to the pair of hind legs of the pet. The restraint strap 110a being positionable between the upper and lower restraint straps 215(1,2) on the body of the pet.

Consistent with one embodiment of the present invention, the restraint assembly 105b further comprises a pair of side straps 220(1,2) for coupling each of the restraint strap 110a, upper restraint strap 215(1) and lower restraint strap 215(2) together. Each of the side straps 220(1,2) may be coupled to and extend between each of the restraint strap 110a, upper restraint strap 215(1) and lower restraint strap 215(2). Each of the upper and tower restrainer straps 215(1,2) having a first end 225(1,2) and a second end 230(1,2) being releasably couplable to each other such that each of the upper and lower restraint straps 215(1,2) form a loop having a hole when ends of each of the upper and lower restraint straps 215(1,2) are releasably coupled together. Each of the holes of the loops being aligned with each other around a common axis 240 when the ends of the each of the upper restraint strap 215(1), lower restraint strap 215(2) and the first 115(1), second strap ends 115(2) of the restraint strap 110a are releaseably coupled together.

Referring FIGS. 1B and 2, a first harness portion refers to the length of strap between the second seat belt buckle 130(1) and the seat belt prong 130(2). A point marked as "X" between a first harness end (137(1)) and a second harness end (137(2)) is shown to be an intermediate point (138) of the first harness portion. The first harness portion has a first distance from the intermediate point (138) to the first harness end (137(1)) and a second distance from the intermediate point (138) to the second harness end (137(2)). A second harness portion refers to the length of strap between the intermediate point (138) and a point where the second harness portion couples to the restraint strap shown to be an intermediate point (139) of the restraint strap 110a.

Each of the upper and lower restrainer straps 215(1,2) include a pair of coupling members for coupling each of the ends of the upper and lower restraint straps 215(1,2) together. Each of the pair of coupling members may include a first coupling portion coupled to the second ends 230(1,2) of the upper and lower restraint straps 215(1,2) and a second coupling portion coupled to the first ends 225(1,2) of the upper and lower restraint straps 215(1,2). The first and second coupling portions may be releasably coupled together. Each of the pair of coupling members may comprise a buckle and a prong.

In accordance with one embodiment of the present invention, the safety belt 100a may further comprise a third and fourth buckles 250(1,2) to latch into a mating third and fourth prongs 255(1,2), respectively. In this way, a different type or sizes of the restraint assembly 105b may be detachably coupled to a harness 120a. For example, one type and or size of the restraint assembly 105b may be suited for a first pet such as dogs and another type and/or size of the restraint assembly 105b may be suited for a second pet such as cats.

One example of the safety belt 100a may be a detachable safety belt for use in the vehicle 200 with the seat belt system by using the first buckle 210(1) and the first prong 210(2) to securely restrain a pet. The detachable safety belt may comprise the restraint strap 110a removably couplable to the torso of the pet. The restraint strap 110a may define a cover portion of the restraint strap to wrap around a body portion of the pet for restricting movement of the restraint strap 110a on the torso of the pet in response to an impact force that the vehicle 200 to experience during a collision of the vehicle and/or braking of the vehicle 200.

For controllably restraining movement of the body of the pet in response to the impact force, the harness 120a may be coupled to the restraint strap 110a. The harness 120a having the second buckle 130(1) and the second prong 130(2) may releasably couple to the first prong 210(2) and first buckle 210(1) of the seat belt system, respectively. For example, the second buckle 130(1) may be a vehicle seatbelt buckle and second prong 130(2) may be a vehicle seatbelt prong.

The restraint strap 110a may comprise a first end and second end being releasably couplable to each other such that a third buckle such as the user operable buckle 145(1) may be coupled to the first end and a mated third prong such as the prong 145(2) may be coupled to the second end for releasably coupling together. The third buckle 145(1) may comprise a user operable lever to adjust the length of the restraint strap 110a. For example, the user operable third buckle 145(1) may be an airplane seat buckle. A suitable prong and buckle are disclosed in U.S. Pat. No. 4,567,629, entitled "Buckle Device," and is incorporated herein by reference in its entirety.

In accordance with one embodiment of the present invention, the restraint strap 110a of the safety belt 100a may further comprise a first end and a second end such that a third buckle coupled to the first end and a fourth buckle coupled to the second end. The cover portion of the restraint strap 110a may comprise a third prong and a fourth prong being releasably coupled to the third and fourth buckles, respectively. The cover portion of the restraint strap 110a may comprise a first end and second end to enable a fastening member for fastening the first end of the cover portion to the second end of the cover portion.

Figure 3:
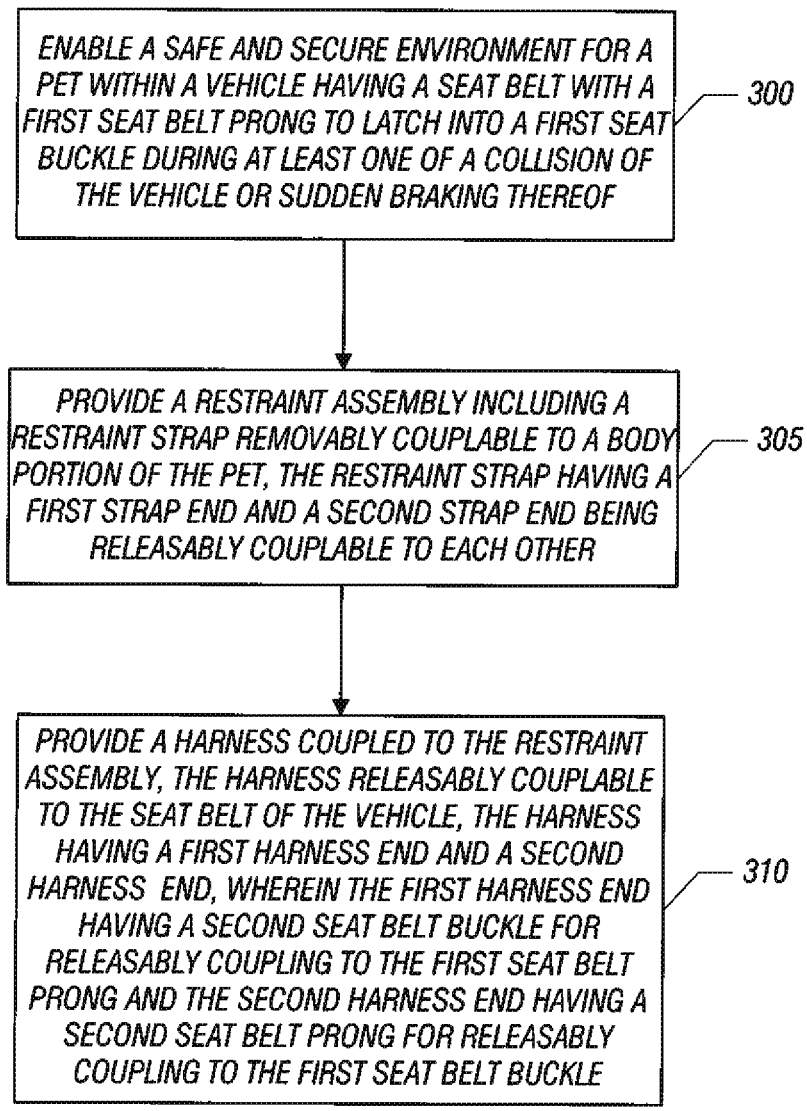
FIG. 3 illustrates a stylized representation of a method of enabling a safe and secure environment for a pet within a vehicle having a seat belt with a first seat belt prong that latches into a first seat belt buckle according to an exemplary embodiment of the present invention.

Referring to FIG. 3, a stylized representation of a method of enabling a safe and secure environment for a pet within the vehicle 200 shown in FIG. 2 having a seat belt with the seat belt prong 210(2) that latches into the seat belt buckle 210(1) is illustrated according to an exemplary embodiment of the present invention. At block 300, a safe and secure environment may be enabled for a pet within the vehicle 200 by providing a seat belt with the seat belt prong 210(2) to latch into the seat belt buckle 210(1). At block 305, the restraint assembly 105a may be provided including the restraint strap 110a removably couplable to a body portion of the pet. The restraint strap 110a may comprise first and second strap ends being releasably couplable to each other.

At block 310, the harness 120a that is coupled to the restraint assembly 105a may be provided such that the harness 120a is releasably couplable to the seat belt of the vehicle 200 for flexibly restraining the pet. The harness 120a may include a first harness end and a second harness end with the first harness end having a second seat belt buckle for releasably coupling to the first seat belt prong and the second harness end having a second seat belt prong for releasably coupling to the first seat belt buckle. In this way, by removably coupling the restraint strap 110a to the torso of the pet, the pet may be flexibly secured within the vehicle 200 during either a collision of the vehicle 200 or a sudden braking of the vehicle 200 by use of both the ends of the seat belt typically provided to operate with the seat belt system.

Consistent with one embodiment of the present invention, each of the upper and lower restraint straps 215(1,2) may comprise a generally flexible material such as a cloth webbing or leather material or synthetic nylon type material. Likewise, each of the side straps, restraint strap 110a, harness 120a that is coupled to the restraint assembly 105a may comprise a generally flexible material such as a cloth webbing or leather material or synthetic nylon type material. Each of the prong being removably insertable into the buckle may comprise metal and/or plastic configured in a manner such that the seat belt prong 210(2) typically latches into the seat belt buckle 210(1).

In use, the restraint assembly 105b is positioned around the body of the pet. The fastening restraint strap 110a, the upper and lower restraint straps 215(1,2) and the side straps may be adjusted to fit around the body of the pet. Use of both the prong and the buckle of the seat belt with the safety restrainer 100 or the safety belt 100a may flexibly restrict movement of the pet around an interior of the vehicle 200 in a manner similar to that of human occupants of the vehicle 200 during an accident or sudden jerk from braking or otherwise.

Figure 4:
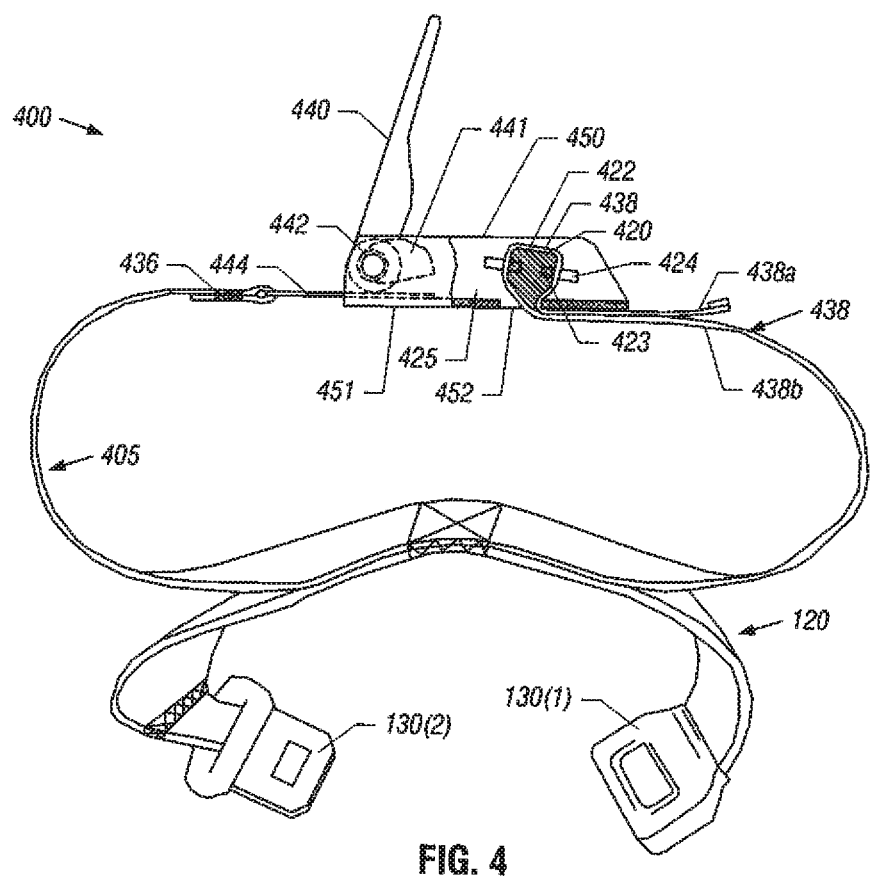
FIG. 4 schematically illustrates a detachable seat belt for use with a pet in a vehicle having a passenger seat belt system including a vehicle seat belt prong and a vehicle seat belt buckle in accordance with one exemplary embodiment of the present invention.

FIG. 4 schematically illustrates a detachable seat belt 400 for use with a pet in the vehicle 200 having a conventional passenger or vehicle or occupant seat belt system including the vehicle seat belt prong 210(2) and the vehicle seat belt buckle 210(1) in accordance with one exemplary embodiment of the present invention. The detachable seat belt 400 may comprise the harness 120 configured to releasably couple to the vehicle seat belt prong 210(2) and the vehicle seat belt buckle 210(1) of the passenger seat belt system. The detachable seat belt 400 may further comprise a seat belt webbing 405 coupled to the harness 120. The seat belt webbing 405 may include a first side length 436 having a first prong 444 attached thereto and a second side length 438 having a first buckle 450 combined with a webbing adjuster 420 for adjusting and locking the seat belt webbing 405. In this way, when the seat belt webbing 405 is buckled and adjusted snugly across a torso of a pet, the detachable seat belt 400 may hold the pet safely on a vehicle seat during at least one of a sudden deceleration of the vehicle 200 or in response to an impact force that the vehicle 200 to experience in a collision. A suitable webbing and an adjuster including the seat belt webbing 405 and the webbing adjuster 420 for the detachable seat belt 400 is disclosed in U.S. Pat. No. 5,088,160, entitled "Lap Belt Webbing Adjuster" and is incorporated herein by reference in its entirety.

Seat belt restraint systems used in vehicles to protect the occupant in the event of sudden decelerations are generally known. In particular, seatbelt webbing adjusters are used in aircraft passenger lap seatbelts. For example, a lap seatbelt, when buckled and adjusted snugly across the waist of the passenger, holds a passenger safely within a seat during sudden decelerations of a vehicle. A typical aircraft passenger lap seatbelt consists of two lengths of seatbelt webbing, each anchored to the seat at one end, one webbing (here selected to be the left side length) having a buckle connector attached to its free end, and the other webbing (here selected to be the right side length) having a combined buckle and webbing adjuster attached to it so that the buckle connector fits into and releasably locks with a buckle to join the two side lengths of webbing together and form the seatbelt.

The webbing adjuster includes a moveable load bar in a base frame. The free end of the right side length of webbing is inserted through a slot in the bottom of the base frame, wound around the load bar, and then passed back through the slot to exit the webbing adjuster. With no tension in the webbing, the webbing adjuster is said to be in the adjustment mode and the length of belt webbing may be adjusted by pulling on the free end of the webbing.

When heavy loads are suddenly applied to the webbing adjuster, as in deceleration during landing or crash situations, the load bar rotates further counter-clockwise, pinching and joggling the loose webbing around the end of the bar and through a close series of very tight 90 degree bends, until the webbing is clinched between the notch and the body and web lock occurs.

Other typical configurations and arrangements of seat belt adjusters seen in the prior art and in the marketplace are disclosed in U.S. Pat. No. 3,118,208, U.S. Pat. No. 3,576,056, U.S. Pat. No. 4,366,604 and U.S. Pat. No. 4,679,852.

The seatbelt webbing 405 and the webbing adjuster 420 may be suitably adapted for use with the detachable seatbelt 400 for pets. The operation of the webbing adjuster 420 of for a pet is the same as described above for aircraft passenger webbing adjusters. The webbing adjuster 420 utilizes a load bar of unique shape which provides a plurality of webbing pressure/friction generating edges which can grab and securely hold the seatbelt webbing 405 under severe load conditions.

The seat belt webbing 405 and the webbing adjuster 420 may better grip the set belt webbing 405 during normal usage and most importantly during rapid deceleration as in sudden braking or crash conditions. The webbing adjuster 420 securely grip and lock the set belt webbing 405 during crash conditions, while at the same time providing for the easy release of the webbing when the webbing adjuster 420 is moved to its adjustment mode.

Referring to FIG. 4, it shows the detachable seat belt 400 including a buckle such as the first buckle 450 and a buckle connector such as the first prong 444 joining together the webbing 436 on one side and webbing 438 on the other side to form the detachable seat belt 400. The buckle 450 includes a base frame 451 having side flanges 425 in which the webbing adjuster 420 is mounted. Also shown therein are the buckle cover 440 and accompanying latch assembly including the ratchet 441 and spring 442 which are mounted about shaft 443 to releaseably engage the first prong 444. The webbing adjuster 420 includes the load bar 422 slideably supported in canted slots 424 of the upstanding side of flanges 425 by means of two keepers 423 located at opposite ends of the load bar 422.

As may be seen in FIG. 4, installation of the webbing 438 is readily accomplished by inserting the free end of the webbing 438A through slot 452 in the bottom of the base frame 451, by passing the webbing clockwise first up on the left side of load bar 422, then over its top, and then down on its right side, and finally back through base frame slot 452 to exit the base frame 451. Sufficient webbing 438 must be pulled through the webbing adjuster 420 to provide a good handhold on the free end of the webbing designated as 438A.

Consistent with one embodiment of the present invention, for the detachable seat belt 400 the harness 120 may be configured to form a loop that releasably couples to the passenger seat belt system when the vehicle seat belt prong 210(2) passes through the loop before coupling to the vehicle seat belt buckle 210(1) such that when the seat belt webbing 405 is buckled and adjusted snugly across a torso of a pet the detachable seat belt 400 to hold the pet safely on a vehicle seat during at least one of a sudden deceleration of the vehicle 200 or in response to an impact force that the vehicle 200 to experience in a collision.

According to one embodiment of the present invention, the harness 120 may include the first and second harness ends 125(1-2). At the first harness end 125(1), a second prong or buckle attached thereto and at the second harness end a second buckle or prong attached thereto for releasably coupling the seat belt webbing 405 to the passenger seat belt system such that when the seat belt webbing 405 is buckled and adjusted snugly across a torso of a pet the detachable seat belt 400 to hold the pet safely on a vehicle seat during at least one of a sudden deceleration of the vehicle 200 or in response to an impact force that the vehicle 200 to experience in a collision.

For example, the second prong at the first harness end 125(1) configured to releasably couple to the vehicle seat belt buckle 210(2) and the second buckle at the second harness end 125(2) adapted to releasably couple to the vehicle seat belt prong 210(1).

In accordance with one embodiment of the present invention, the first buckle such as the buckle 450 may further comprise the buckle cover 440 for use with the webbing adjuster 420 for lengthening and shortening the seat belt webbing 405. The webbing adjuster 420 may securely grip and lock the seat belt webbing 405 during the at least one of a sudden deceleration of the vehicle 200 or in response to an impact force that the vehicle 200 to experience in a collision.

In accordance with one embodiment, the first prong such as the buckle connector 444 may be configured to fit into and releasably lock with the first buckle or the buckle 450 to join the first side and second side lengths 436, 438 of the seatbelt webbing 405 together for forming a pet seatbelt. The seatbelt webbing 405 having the free end 438A that enables a user to pull a portion 438 of the seatbelt webbing 405 through the webbing adjuster 420 for a shortening adjustment of the pet seatbelt. Likewise, the seatbelt webbing 405 having the free end 438A that enables a user to push a portion 438 of the seatbelt webbing 405 through the webbing adjuster 420 for a lengthening adjustment of the pet seatbelt. In this way, the seatbelt webbing 405 is progressively frictionally gripped by the webbing adjuster 420 for adjusting a length of the pet seatbelt.

It is understood that the buckle 450 and the first prong 444 illustrated are standard prior art items which exemplify the manner in which webbing adjusters are presently incorporated into aircraft passenger lap seat belt systems. In practice the webbing adjuster 420 might not be incorporated in the buckle 450 but might be incorporated in the first prong 444 or might be mounted to either side length of webbing 405 independent of the buckle 450 and first prong 444.

Figure 5:
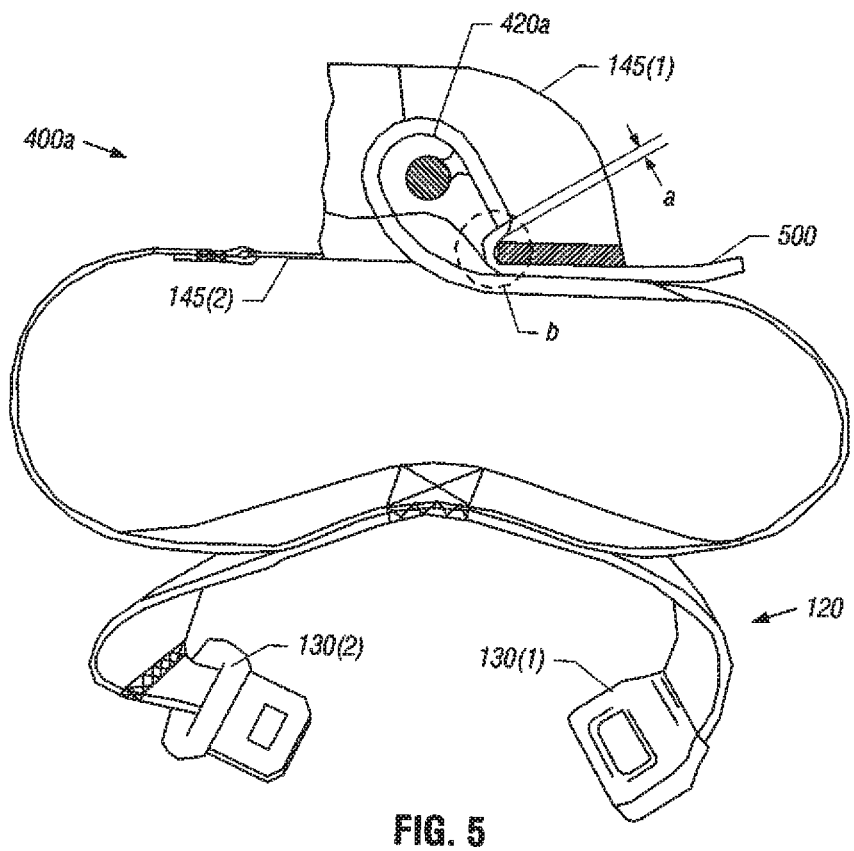
FIG. 5 schematically illustrates a detachable safety belt for use in a vehicle with a vehicle seat belt system including a first buckle at a first end and a first prong at a second end to securely restrain a pet wherein the detachable safety belt comprises an adjustable restraint strap having a webbing adjuster in accordance with one exemplary embodiment of the present invention.

Referring to FIG. 5, a detachable safety belt 400a is schematically illustrated for use in the vehicle 200 with a vehicle seat belt system including the first buckle 210(1) at a first end and the first prong 210(2) at a second end to securely restrain a pet in accordance with one exemplary embodiment of the present invention. The detachable safety belt 400a comprises an adjustable restraint strap 500 having a webbing adjuster 420a.

The detachable safety belt 400a may further comprise the harness 120 coupled to the adjustable restraint strap 500. The harness 120 having the second buckle 130(1) and the second prong 130(2) to releasably couple to the first prong 210(2) and the first buckle 210(1) of the vehicle seat belt system respectively for movably restraining movement of the body of the pet by holding the pet safely in response to an impact force that the vehicle 200 to experience during at least one of a collision of the vehicle 200 or sudden braking of the vehicle 200. The adjustable restraint strap 500 may comprise the third buckle 145(1) coupled to the first end and the third prong 145(2) coupled to the second end for releasably coupling together.

In the detachable safety belt 400a, the third buckle 145(1) may comprise the user operable buckle cover 440 to adjust the length of the adjustable restraint strap 500. For example, the third buckle 145(1) may be an aircraft passenger seat buckle. Likewise, the second buckle 130(1) may be a vehicle seat belt buckle and the second prong 130(2) may be a vehicle seat belt prong.

Figure 6:
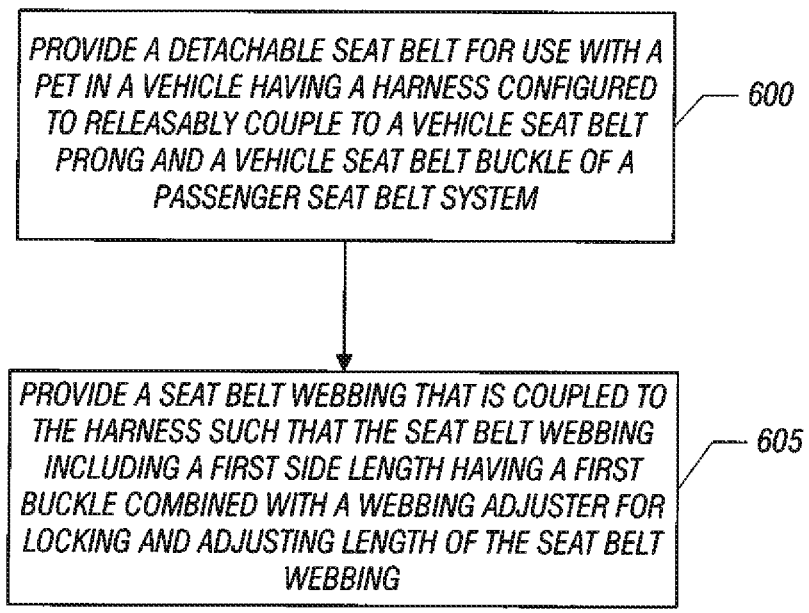
FIG. 6 illustrates a stylized representation of a method of providing a detachable seat belt for use with a pet in a vehicle having a passenger seat belt system including a vehicle seat belt prong and a vehicle seat belt buckle according to an exemplary embodiment.

Referring to FIG. 6, it illustrates a stylized representation of a method of providing the detachable seat belt 400 for use with a pet in the vehicle 200 having a passenger seat belt system including the vehicle seat belt prong 210(2) and the vehicle seat belt buckle 210(1) according to an exemplary embodiment of the present invention. At block 600, the harness 120 is provided and configured to releasably couple to the vehicle seat belt prong 210(2) and the vehicle seat belt buckle 210(1) of the passenger seat belt system. At block 605, the seat belt webbing 405 may be provided such that it is coupled to the harness 120. The seat belt webbing 405 may include the first side length 436 having a buckle connector such as the first prong 444 attached thereto. The seat belt webbing 405 may include the second side length 438 having a first buckle such as the buckle 450 combined with the webbing adjuster 420 for adjusting and locking the seat belt webbing 405.

By enabling the webbing adjuster 420 to securely grip and lock the seat belt webbing 405 when the seat belt webbing 405 is buckled and adjusted snugly across a torso of a pet, the detachable seat belt 400 may protect the pet and occupants of the vehicle 200 during the at least one of a sudden deceleration of the vehicle 200 or in response to an impact force that the vehicle 200 to experience in a collision. In one embodiment of the present invention, the harness 120 may be configured to form a loop that releasably couples to the passenger seat belt system when the vehicle seat belt prong 210(2) passes through the loop before coupling to the vehicle seat belt buckle 210(1).

Figure 7:
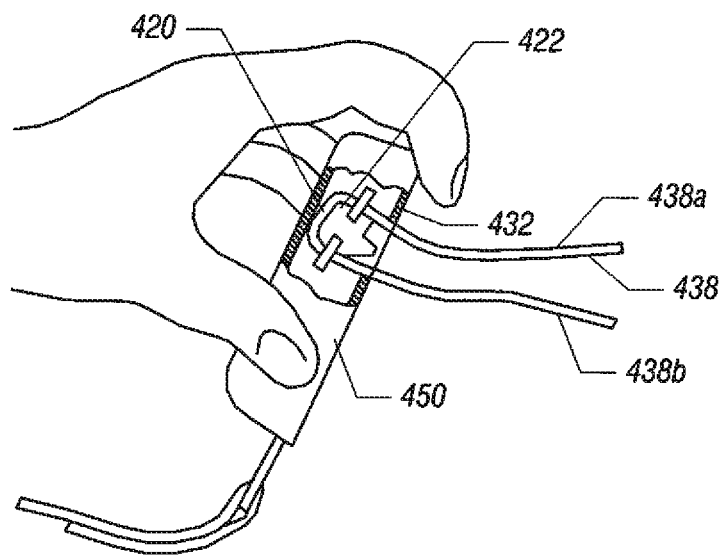
FIG. 7 schematically illustrates a side view, partially in cross-section, of a webbing adjuster assembly in the adjustment mode for lengthening the seat belt webbing according to one embodiment of the present invention.

Referring to FIG. 7, it schematically illustrates a side view, partially in cross-section, of a webbing adjuster assembly in the adjustment mode for lengthening the seat belt webbing 405 according to one embodiment of the present invention. As shown in FIG. 7, when the buckle 450 and the webbing adjuster 420 is rotated to an angle of approximately 50 degree measured between the bottom surface of base frame 451 and anchor end of webbing 438B, tension in anchor end of webbing 438B cannot cause load bar 422 to slide in the direction of bar stop 432 and thus cannot pinch the free end of the webbing 438A. The webbing 438 can then move freely over load bar 422 and the webbing adjuster 420 is said to be in its adjustment mode. Further, pulling on the buckle body 450 in the adjustment mode causes the free end 438A of webbing 438 to slide into the webbing adjuster 420 and around load bar 422 in a counter-clockwise direction, thus increasing the length of the anchored end 438B of the web.

Figure 8:
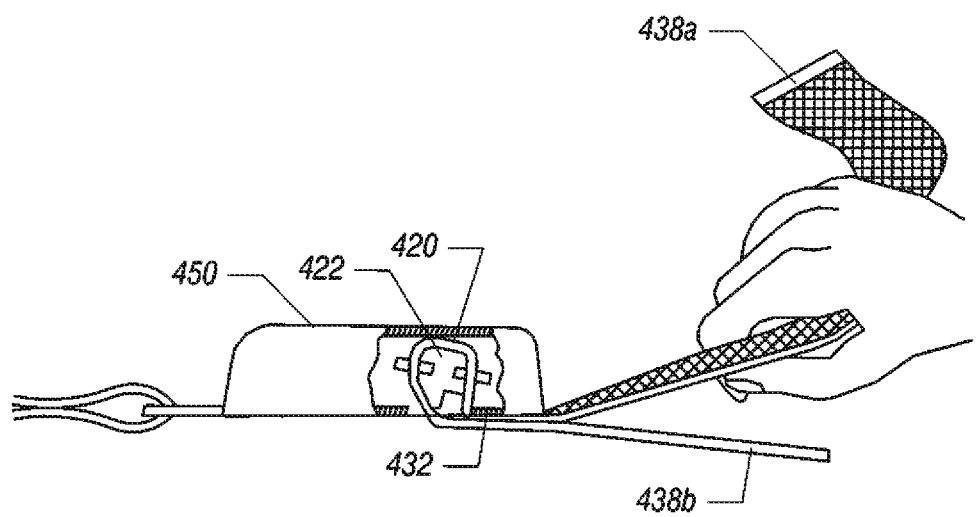
FIG. 8 schematically illustrates a side view, partially in cross-section, of the webbing adjuster assembly shown in FIG. 7 for shortening the seat belt webbing according to one embodiment of the present invention.

Referring to FIG. 8, it schematically illustrates a side view, partially in cross-section, of the webbing adjuster assembly shown in FIG. 7 for shortening the seat belt webbing 405 according to one embodiment of the present invention. As shown in FIG. 8, during the shortening adjustment the user pulls on the free end of the webbing 438A, causing the webbing to flow through the adjuster. Pulling on the free end of the webbing 438A causes the load bar 422 to slide to the left away from the bar stop 432. This prevents excessive loads and wear on the webbing during the shortening adjustment is that the bend angles in the webbing at points I, H, G, and F are of a large radii. These present friction areas which the webbing encounters as it moves in the clockwise direction. Accordingly, the changes in direction for the webbing at those points are slight and prevent the webbing from experiencing high tension loads at those points. As disclosed hereinafter, sharper changes in direction and higher tension loads on the webbing occur at points E, D, C, and A.

Figure 9:
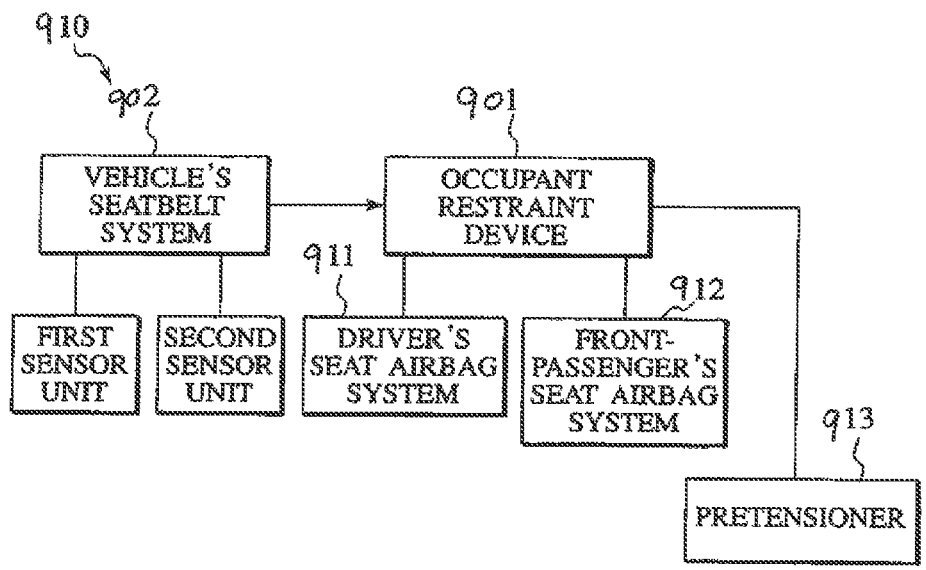
FIG. 9 is a block diagram showing a typical seatbelt webbing lock-release system generally provided in a typical vehicle for a vehicle seat to restraint a human occupant.

Referring to FIG. 9, a block diagram shows a configuration of a typical seatbelt webbing lock-release system 910 that is generally provided in a typical motor vehicle for a vehicle seat to restraint a human occupant. The seatbelt webbing lock-release system 910 is mounted on a vehicle and includes an occupant restraint device 901 and a typical vehicle's seatbelt system 902. The occupant restraint device 901 (corresponding to a controller) performs a control of timing to activate and expand equipment for restraining an occupant, or occupants, in a vehicle.

The occupant restraint device 901 is connected to a driver's seat airbag system 911 for an occupant seated in a driver's seat, to a front-passenger's seat airbag system 912 for an occupant seated in a front-passenger's seat, and to a pretensioner 913. Upon receiving information to the effect that the occurrence of a collision has been detected by an external collision sensor, the occupant restraint device 911 expands the driver's seat airbag system 911 and the front-passenger's seat airbag system 912, and activates the pretensioner 913, thereby performing a control to restrain the occupants seated in the driver's seat and in the front-passenger's seat. Note that the driver's seat airbag system 911, the front-passenger's seat airbag system 912 and the pretensioner 913 are collectively referred to also as occupant restraint equipment in this specification.

Figure 10:
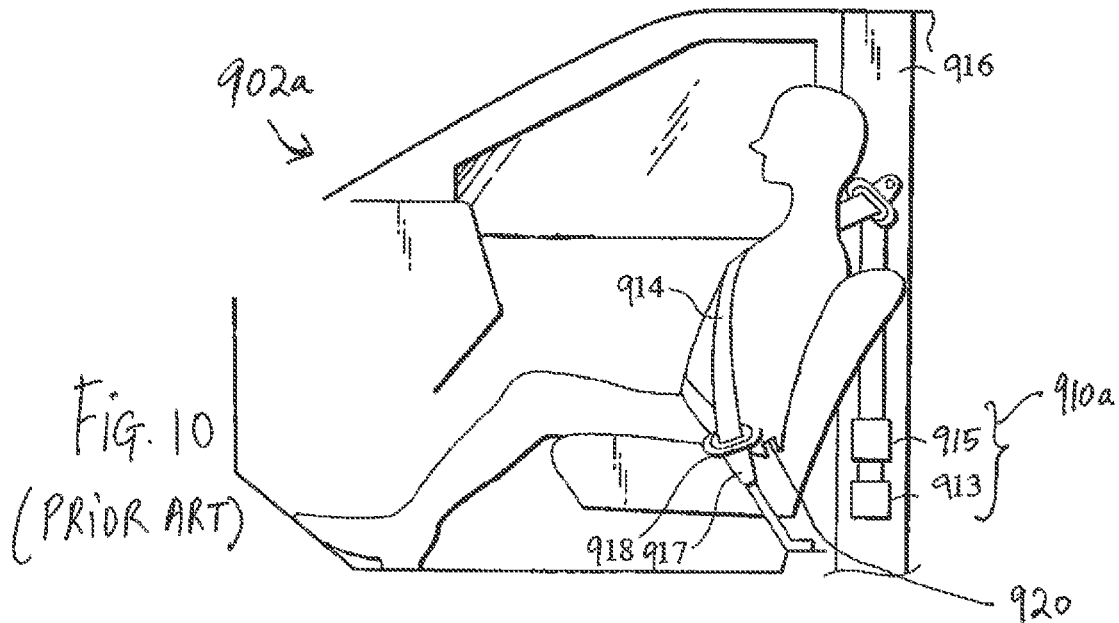
FIG. 10 is a schematic view showing a typical vehicle's seatbelt system.

Referring to FIG. 10, a schematic view is shown of the vehicle's seatbelt system 902. The vehicle's seatbelt system 902 includes at least one of the seatbelt 914 connected to the seatbelt webbing lock-release system 910, a first belt connector such as the prong or the tongue 918, a second belt connector such as the buckle 917 and an anchor 920 that connects to an auto child seat to restrain a pet such as a dog or a cat. The anchor 920 has been mandated to be provided in at least two rear seats of all passenger vehicles sold in U.S. after September 2002. As shown in FIG. 10, in order to prevent an excessive forward movement of an occupant in the event of a vehicle collision, the pretensioner 913 (seatbelt tensioner 913) immediately winds up a typical seatbelt 914, and exerts a tensile force on the occupant, and thus the occupant is restrained. The pretensioner 913 is configured to instantaneously wind up the seatbelt 914 with an explosive force using an explosive or a spring upon a vehicle collision. In one embodiment, a seatbelt webbing lock-release system 910a includes the pretensioner 913 and a motor 915 to wind-up the seatbelt 914 or release it during the operation of the vehicle's seatbelt system 902.

Figure 11:
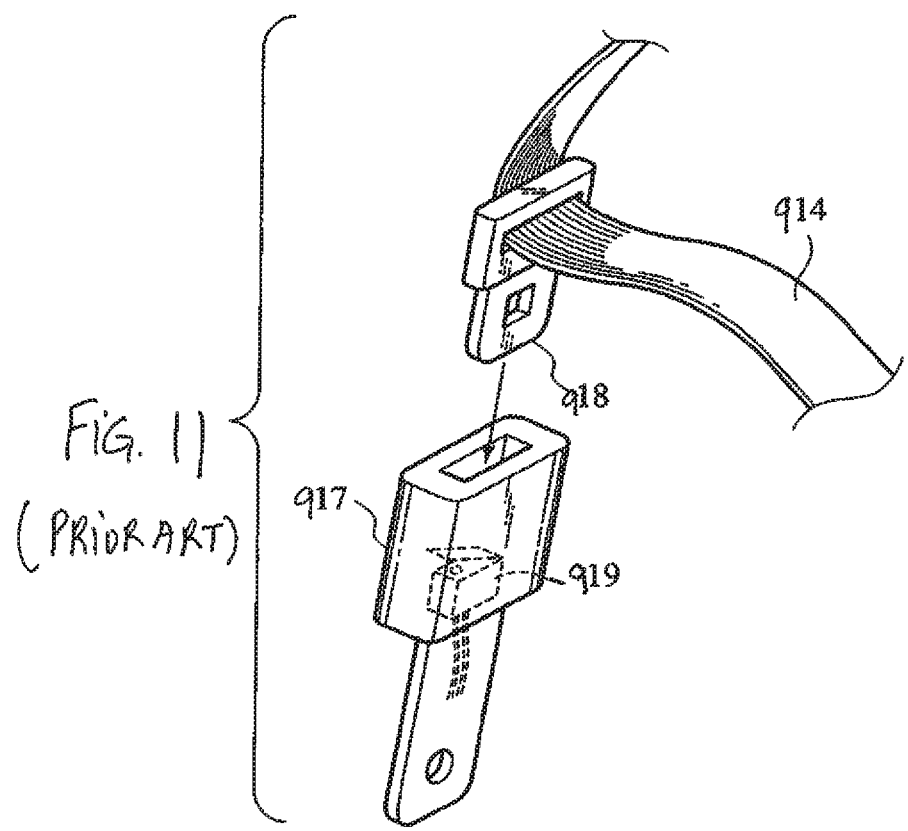
FIG. 11 is a perspective view of a prong/tongue and a buckle of a typical seatbelt.

Referring to FIG. 11, a perspective view of a prong or tongue and a buckle of the seatbelt 914 is shown. As shown in FIGS. 10 and 11, the seatbelt 914 is worn in such a manner that the seatbelt 914 is drawn out from a retractor (not shown) which is fixed to a lower portion of a pillar 916 on a body side, or the like; a prong or tongue 918 is mechanically inserted into a buckle 917 on the body side and fixed thereto.

The vehicle's seatbelt system 902 in the seatbelt webbing lock-release system 910 includes the seatbelt 914. Further, the vehicle's seatbelt system 902 is connected to a unit (corresponding to a first sensor unit) for detecting a state of wearing the seatbelt 914 which is worn by an occupant seated in the driver's seat or in the front-passenger's seat. Specifically, the vehicle's seatbelt system 902 is connected to a switch 919 serving as the first sensor unit for detecting whether or not the prong or tongue 918 of the seatbelt 914 is connected to the buckle 917. When the prong or tongue 918 is inserted into the buckle 917 and fixed thereto, a connection signal is sent from the switch 919, as the first sensor unit, to the vehicle's seatbelt system 902.

In addition, the seatbelt webbing lock-release system 910 is applied to a vehicle including a pre-crash seatbelt system. Specifically, as shown in FIG. 10, at the lower portion of the pillar 916, the pretensioner 913 and the motor 915 that is included in the pre-crash seatbelt system are provided. Further, the seatbelt 914 is connected to both the pretensioner 913 and the motor 915. The pre-crash seatbelt system is a system of winding up the seatbelt 914 with the motor 915 to restrain an occupant before a vehicle collision.

Figure 12:
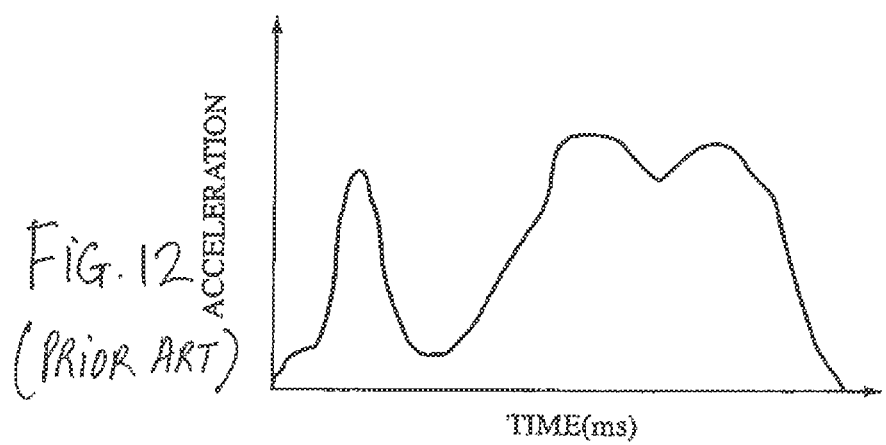
FIG. 12 is a typical graph showing a time history of acceleration G of a typical vehicle upon a collision.

Referring to FIG. 12, a typical graph shows a time history of acceleration G of a typical vehicle upon a collision. When the vehicle collides against an obstacle in front, acceleration G as shown in FIG. 12 is generated in the vehicle. This acceleration G can be detected by an acceleration sensor or the like. At this event, if an occupant is not wearing the seatbelt, the body of the occupant is moved toward the front of the vehicle due to the collision, and therefore there is a strong possibility that the occupant strikes his/her head and chest on a steering wheel and/or a windshield. However, if an occupant is wearing the seatbelt, the occupant is restrained to some extent by the pre-crash seatbelt system before a collision. Upon the collision, the pretensioner 913 is activated and instantaneously winds up the seatbelt 914, thereby firmly restraining the occupant. Accordingly, there is less possibility that the occupant strikes his/her head and chest on the steering wheel and/or the windshield.

Here, in the case of the occupant not wearing the seatbelt, since the occupant is considerably moved toward the front of the vehicle upon the collision, it is necessary to start expansion time of the airbag system as soon as possible after the collision. However, in the case of the occupant wearing the seatbelt, the occupant is restrained by the seatbelt before the collision. Accordingly, even if the expansion time of the airbag system is delayed in comparison with the case of the occupant not wearing the seatbelt, the occupant can be properly protected by the airbag system and can be prevented from colliding against the interior equipment.

Here, in this specification, the state of wearing the seatbelt 914 is a state where the prong or tongue 918 of the seatbelt 914 is inserted into the buckle 917 and fixed thereto, that is, a state where an occupant wears the seatbelt 914. The state of not wearing the seatbelt 914 is a state for a non-operating mode. In this state, the prong or tongue 918 of the seatbelt 914 is not inserted into the buckle 917 and both of these are at their default positions. Also the seatbelt 914 is also in a default position in this state, i.e., not being not used for its intended purpose.

Figure 13:
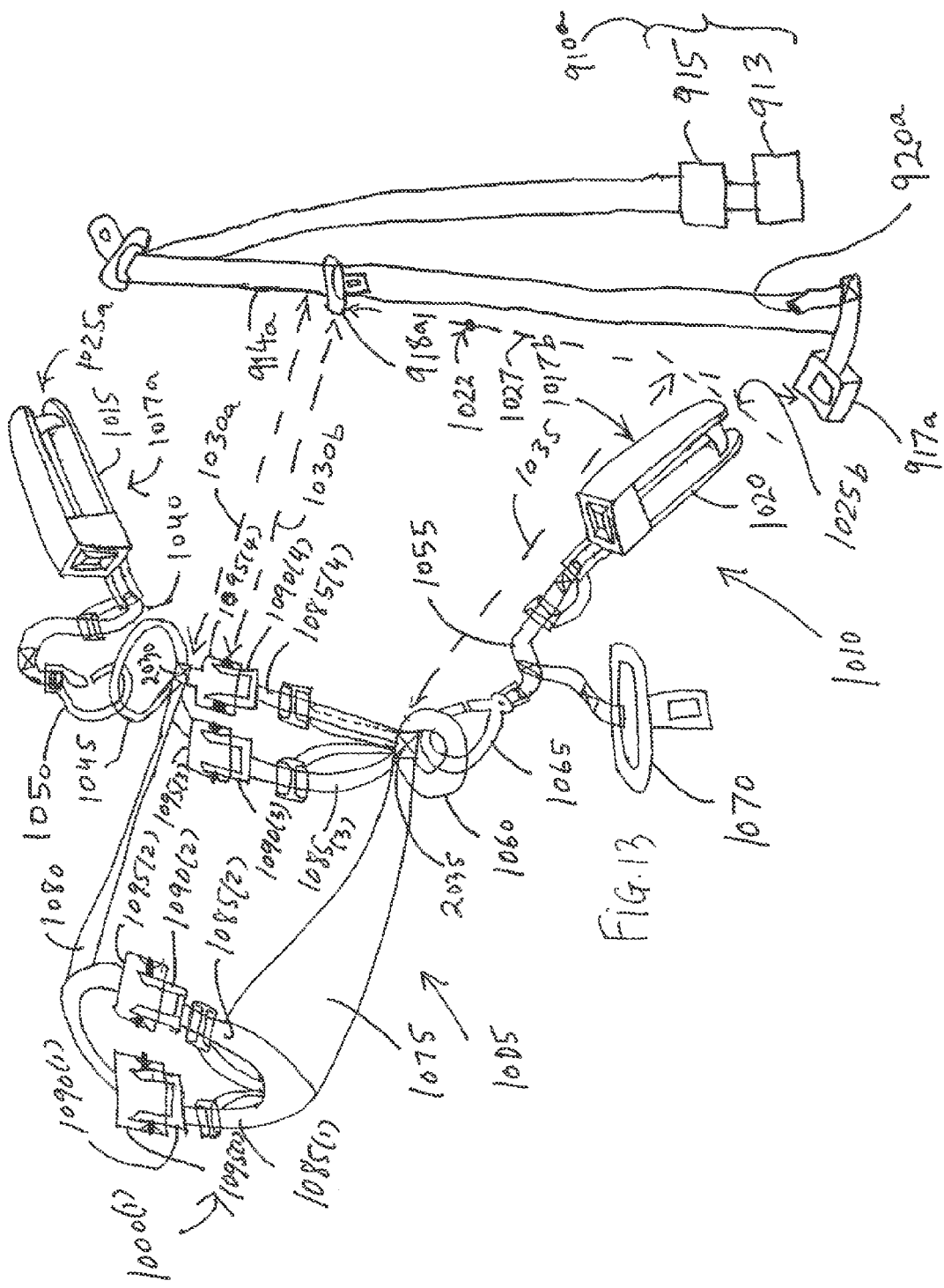
FIG. 13 is a schematic view showing a seatbelt harness according to one embodiment of the present invention.

Referring to FIG. 13, a schematic view shows a seatbelt harness 1000(1) according to one embodiment of the present invention. This seatbelt harness 1000(1) is intended for use in a motor vehicle with a shoulder/lap belt combination seatbelt system such as the vehicle's seatbelt system 902 described above. The seatbelt harness 1000(1) may include a restraint portion 1005 configured to be worn by the pet on the torso of a pet such as a dog. The seatbelt harness 1000(1) may further include an attachment portion 1010 that is coupled to the restraint portion 1005. The attachment portion 1010 may include a first connector 1015 and a second connector 1020 each of which having a free end 1025a and 1025b, respectively. The first and second connectors 1015, 1020 of the attachment portion 1010 may be either fixedly or removably attached to the restraint portion 1005.

In one embodiment, the first connector 1015 may be adapted to couple to at least one of a seatbelt 914a connected to a seatbelt webbing lock and release system 910a or the first belt connector 918a such as a prong or tongue in default positions thereof during a state of non-operating mode (as shown in FIG. 13) such that the first connector 1015 connects the attachment portion 1010 directly to the seatbelt webbing lock-release system 910a via the seatbelt 914a. The second connector 1020 may be adapted to couple to at least one of the second belt connector 917a or an anchor 920a. The anchor 920a has been mandated to be provided in at least two rear seats of all passenger vehicles sold in U.S. after September 2002.

The seatbelt harness 1000(I) may be provided for use in a motor vehicle having one or more vehicle seats and an associated shoulder/lap belt combination seatbelt system that has at least one of the seatbelt 914a connected to the seatbelt webbing lock-release system 910a. The shoulder/lap belt combination seatbelt system may further include the first belt connector 918a connected to the seatbelt 914a, the second belt connector 917a and the anchor 920a that connects to an auto child seat all of which are generally provided near or at the vehicle seat so as to enable restraining of a pet by the seatbelt harness 1000(1).

In one embodiment, the first connector 1015 may be configured and arranged at a first predetermined position 1017a and the second connector 1020 may be configured and arranged at a second predetermined position 1017b relative to the first determined position 1017a. The first predetermined position 1017a may be selected relative to the restraint portion 1005, e.g., based on a desired location of the restraint portion 1005, in use, with respect to locations of either the first belt connector 918a and/or second belt connector 917a according to a particular size of a given pet who is intended to wear the seatbelt harness 1000(1). Likewise, the second predetermined position 1017b may be selected relative to the restraint portion 1005, e.g., based on the desired location of the restraint portion 1005, in use, with respect to locations of either the first belt connector 918a and/or second belt connector 917a according to the particular size of the given pet who is intended to wear the seatbelt harness 1000(1).

As one example, to accommodate a dog of a large size 40 lbs-80 lbs, the first predetermined position 1017a may be selected such that the restraint portion 1005, in use, nominally remains at a distance in a range of 6-12 inches from the first belt connector 918a or the seatbelt 914a when that dog is located about the center of the vehicle seat. Similarly, the second predetermined position 1017b may be selected such that the restraint portion 1005, in use, preferably stays at a distance in a range of 12-18 inches from either the second belt connector 917a or the anchor 920a when the above dog is at or near the center of the vehicle seat.

In particular, in one embodiment of the present invention, the first and second predetermined positions 1017a, 1017b may be selected for aligning the first and second connectors 1015, 1020 with the restraint portion 1005 such that the attachment portion 1010 to act in conjunction with the restraint portion 1005 to enable positioning of the given pet on the vehicle seat at a desired intermediate point 1022 along a longitudinal path 1027 between the first belt connector 918a and the second belt connector 917a or between the first belt connector 918a and the anchor 920a.

One example of the desired intermediate point 1022 may be near or at a middle of a length of the longitudinal path 1027. One example of the longitudinal path 1027 may be either a point-to-point distance in a straight line between the first belt connector 918a and the second belt connector 917a or a point-to-point distance in a straight line between the first belt connector 918a and the anchor 920a.

Consistent with one embodiment, the first and second predetermined positions 1017a, 1017b may be selected to align the first and second connectors 1015, 1020 with respect to the restraint portion 1005 such that, in use, a pet standing on a vehicle seat would be approximately situated in a state which is about perpendicular to the longitudinal path 1027. In this way, the restraint portion 1005 when coupled to the first and second belt connectors 918a, 917a via the first and second connectors 1015, 1020 respectively of the attachment portion 1010, positions the pet about the middle of a movable link which gets formed between the first and second belt connectors 918a, 917a when the seatbelt harness 1000(1) is attached thereto. Accordingly, the above configuration of the restraint and attachment portions 1005, 1010 of the seatbelt harness 1000(1) enables it to be directly connected to the seatbelt webbing lock-release system 910a via the seatbelt 914a. Since the seatbelt webbing lock-release system 910a remains free to operate in its intended manner should the seatbelt 914a was to be used for protection by a human occupant sitting on the vehicle seat, the pet is provided with almost the same safety as the occupant. Moreover, the pet also simultaneously has an ability to sit, stand, move, and/or stretch with ease without sacrificing any safety.

As shown in FIG. 13, the first belt connector 918a is fixedly connected to the seatbelt 914a which is further connected to the seatbelt webbing lock-release system 910a of the vehicle's seatbelt system 902a (see FIG. 10) such as a shoulder/lap belt combination seatbelt system. The seatbelt webbing lock-release system 910a is generally configured and arranged to lock a given position on the pet upon at least one of a vehicle collision, a sudden braking or deceleration and a sudden maneuvering of the motor vehicle. By limiting a distance that a pet can go from the default position of the seatbelt 914a or the default position of the first belt connector 918a when the pet is wearing the seatbelt harness 1000(1) it protects the pet as he/she avoids hitting the interior of the vehicle or the driver/any passengers in the vehicle with a significant force. The occupants of the vehicle are also protected from being getting injured by avoiding the pet hitting them with a sufficient force or by avoiding any impact at all from the pet since the pet gets locked in his/her position by the action of the seatbelt webbing lock-release system 910a (see FIG. 10) in response to a collision, sudden braking/deceleration or sudden maneuvering of the vehicle.

According to any one of the disclosed embodiments of the present invention, the first predetermined position 1017a may be a point such as a point 2030 on the restraint portion 1005 of the seatbelt harness 1000(1). Likewise, the second predetermined position 1017b may be a point such as a point 2035 on the restraint portion 1005 of the seatbelt harness 1000(1). The positions of these points 2030, 2035 can be at any suitable place on the restraint portion 1005. For example, the points 2030, 2035 may be located, as shown, on distal ends of the second and first vest portions 1080, 1075, respectively. Otherwise the points 2030 and 2035 can be offset from the distal ends of the restraint portion 1005, e.g., at about the middle of the lengths of the first and second vest portions 1080, 1075, respectively. The first and second connectors 1015, 1020 may be directly and fixedly connected to the restraint portion 1005 at the points 2030 and 2035, respectively. Otherwise, via the use of the first and second harnesses 1040, 1055, the first and second connectors 1015, 1020 may be connected at locations away from the points 2030, 2035 based on a desired application or either alone or in combination of one or more of dimensions, weight, height, breed of the pet, e.g., a dog.

The restraint portion 1005, in use, may have a first distance 1030a or 1030b from the default position of the seatbelt 914a or the default position of the first belt connector 918a, respectively. Likewise, the second connector 1020 may be adapted to couple to at least one of the second belt connector 917a such as a buckle or the anchor 920a such that, in use, the restraint portion 1005 has a second distance 1035 from the free end 1025b of the second connector 1020. In operation, it is the second distance 1035 that determines the maximum increase allowable to the first distance 1030a or 1030b because the second distance 1035 remains fixed due to the non-movable nature of the second belt connector 917a and the anchor 920a but the first distance 1030a, 1030b can vary (increase or decrease) depending upon the extent to which the seatbelt 914a can be pulled out from the seatbelt webbing lock-release system 910a. In this way, the seatbelt harness 1000(1) may be configured and arranged such that the second distance 1035 controls how much the first distance 1030a or 1030b can be at the most.

In other words, due to the above structure and functionality of the seatbelt harness 1000(1) having the given arrangement or configuration of the restraint portion 1005 and the attachment portion 1010 relative to various components of the vehicle's seatbelt system 902a including the seatbelt 914a, the first belt connector 918a, the second belt connector 917a or the anchor 920a and the seatbelt webbing lock and release system 910a, the second distance 1035 is in a position to stop the first distance 1030a or 1030b from increasing any further than allowed by, e.g., the length of second harness 1055. By limiting the first distance 1030a or 1030b, the restraint portion 1005 cannot go too far from the default position of the seatbelt 914a or the default position of the first belt connector 918a when the pet is wearing the seatbelt harness 1000(1). This protects the pet as he/she avoids hitting the interior of the vehicle or the driver/any passengers in the vehicle with a significant force. The occupants of the vehicle are also protected from being getting injured by avoiding the pet hitting them with a sufficient force or by avoiding any impact at all from the pet since the pet gets locked in his/her position by the action of the vehicle's seatbelt system 902a (see FIG. 10) in response to a collision, sudden braking/deceleration or sudden maneuvering of the vehicle.

According to one embodiment of the present invention, the attachment portion 1010 of the seatbelt harness 1000(1) may further include a first harness 1040 having first and second harness ends. Another example of the first connector 1015 may be a regular buckle, e.g., a vehicle seatbelt buckle. The first harness 1040 may include a strap whose length can be adjusted and which can be made of a vehicle seatbelt webbing material. The first harness 1040 may be disposed between the restraint portion 1005 and the first connector 1015 such that the first harness end of the first harness 1040 is coupled or couples to the restraint portion 1005 and the second harness end of the first harness 1040 is coupled to the first connector 1015. Likewise, one example of the first connector 1015 may be a user-operable buckle type connector with an open mouth to latch onto an object and it may be made of materials those are generally used to manufacture a vehicle seatbelt buckle.

The first connector 1015 may be made capable of connecting either directly to the seatbelt 914a or the first belt connector 918a when these are in their default positions, i.e., in a state of non-operating mode or when they are not in use, e.g., the first belt connector 918a is not being coupled to or inserted into the second belt connector 917a. That is, the seatbelt 914a is in a state that it can be released freely such that when the restraint portion 1005 is connected to it the seatbelt harness 1000(1) can move horizontally or vertically without any significant resistance. This flexibility enables the pet such as dog to easily stand, stretch and/or move, providing a comfortable ride to him/her.

As explained above, when the restraint portion 1005 is attached to the second belt connector 917a via the second connector 1020 of the attachment portion 1010, the second distance 1035 limits the first distance 1030a or 1030b in terms of how far the restraint portion 1005 can go away from default positions of the seatbelt 914a or the first belt connector 918a. In other words, a connection point between the second connector 1020 and the second belt connector or the anchor 920a functions as a pivot point for the seatbelt harness 1000(1). By restricting the range of travel/movement of the pet, the safety of the pet is enhanced since the chance that he/she can harm themselves by hitting something are minimized while in normal conditions of travel the pet remains quite free to stand, stretch and/or move around the vehicle seat to which they are attached with the seatbelt harness 1000(1).

Consistent with one embodiment of the present invention, the restraint portion 1005 of the seatbelt harness 1000(1) may further include a first vest portion 1075. One example of the first vest portion 1075 is a pad shaped and configured to hug the chest of the pet when it is worn on the torso of the pet. Likewise, the restraint portion 1005 may further include a second vest portion 1080. For example, the second vest portion 1080 may be a pad shaped and configured to hug the back of the pet when it is worn on the torso of the pet. The first vest portion 1075 may include a plurality of length adjustable straps 1085(1-4) each having a corresponding prong 1090(1-4) attached thereto at their free ends. Likewise, the second vest portion 1080 may include a plurality of mating buckles 1095(1-4) attached thereto for the corresponding prongs 1090(1-4).

Alternatively, in one another embodiment of the restraint portion 1005, instead of having buckles 1095(1-4) and prongs 1090(1-4) the first and second vest portions 1075, 1080 may be in one piece or at least two pieces where either the one piece has mating Velcros or two pieces include one of the opposing form of the mating Velcros, respectively. Similarly, instead of Velcro other types of fasteners can be used to provide a vest format to the restraint portion 1005. One in the skilled in the pertinent art would recognize that any form, shape, material suitable to function as a vest can be deployed and all such variations are contemplated to be as different embodiments of the restraint portion 1005 as described herein according to the present invention. For example, in one another embodiment, in the restraint portion 1005 the first vest portion 1070 may include the buckles 1095(1-4) and the second vest portion 1080 may include the prongs 1090(1-4).

In accordance with one embodiment of the present invention, the restraint portion 1005 of the seatbelt harness 1000(1) may further include a third connector 1045 and the first harness 1040 may include a fourth connector 1050 at the first harness end. The fourth connector 1050 may be configured to removably couple to the third connector 1045. An example of the third connector 1045 is a D-ring which can be made of metal and may be fixedly attached to the second vest portion 1080 of the restraint portion 1005 at the point 2030. Likewise, one example of the fourth connector 1050 is a spring link which can be made of metal. In this case, the first distance 1030a, 1030b may be the distance between the point 2030 and the seatbelt 914a or the first belt connector 918a, respectively.

In one exemplary embodiment of the present invention, the attachment portion 1010 of the seatbelt harness 1000(1) may further include a second harness 1055 having first and second harness ends. The second harness 1055 may include a strap whose length can be adjusted and which can be made of a vehicle seatbelt webbing material. The second harness 1055 may be disposed between the restraint portion 1005 and the second connector 1020 such that the first harness end of the second harness 1055 is coupled to or couples to the restraint portion 1005 and the second harness end of the second harness 1055 is coupled to the second connector 1020. An example of the second harness 1055 may include a strap whose length can be adjusted and which can be made of a vehicle seatbelt webbing material. Likewise, one example of the second connector 1020 may be a user-operable buckle type connector with an open mouth to latch onto an object and it may be made of materials those are generally used to manufacture a vehicle seatbelt buckle.

Consistent with one embodiment of the present invention, the restraint portion 1005 of the seatbelt harness 1000(1) may further include a fifth connector 1060 and the second harness 1055 may include a sixth connector 1065 at the first harness end. The sixth connector 1065 may be configured to removably couple to the fifth connector 1060. An example of the fifth connector 1060 is a D-ring which can be made of metal and may be fixedly attached to the first vest portion 1075 of the restraint portion 1005 at the point 2035. Likewise, one example of the sixth connector 1065 is a spring link which can be made of metal. In this case, the second distance 1035 may be the distance between the point 2035 and the free end 1025b of the second connector 1020.

According to one embodiment of the present invention, the attachment portion 1010 of the seatbelt harness 1000(1) may further include a seventh connector 1070 which is coupled at the second harness end of the second harness 1055. One example of the seventh connector 1070 is a prong such as a vehicle seatbelt prong.

Likewise, the seatbelt harness 1000(1) may be made in different sizes and shapes to suit different breeds of pets such as dogs. That is, dimensions of the seatbelt harness 1000(1) can be determined for different breeds based on their typical sizes, weights and/or heights. In one embodiment, the seatbelt harness 1000(1) is contemplated to be made in at least two models for a combination of pet weight and height ranges. For example, based on a certain size, weight, height and/or neck size etc., the seatbelt harness 1000(1) may be made in five different sizes: extra-small (XS) for 5-10 lbs, small(S) for 10-25 lbs, medium (M) for 25-50 lbs, large (L) for 50-80 lbs and extra-large (XL) for 80+ lbs.

Figure 14:
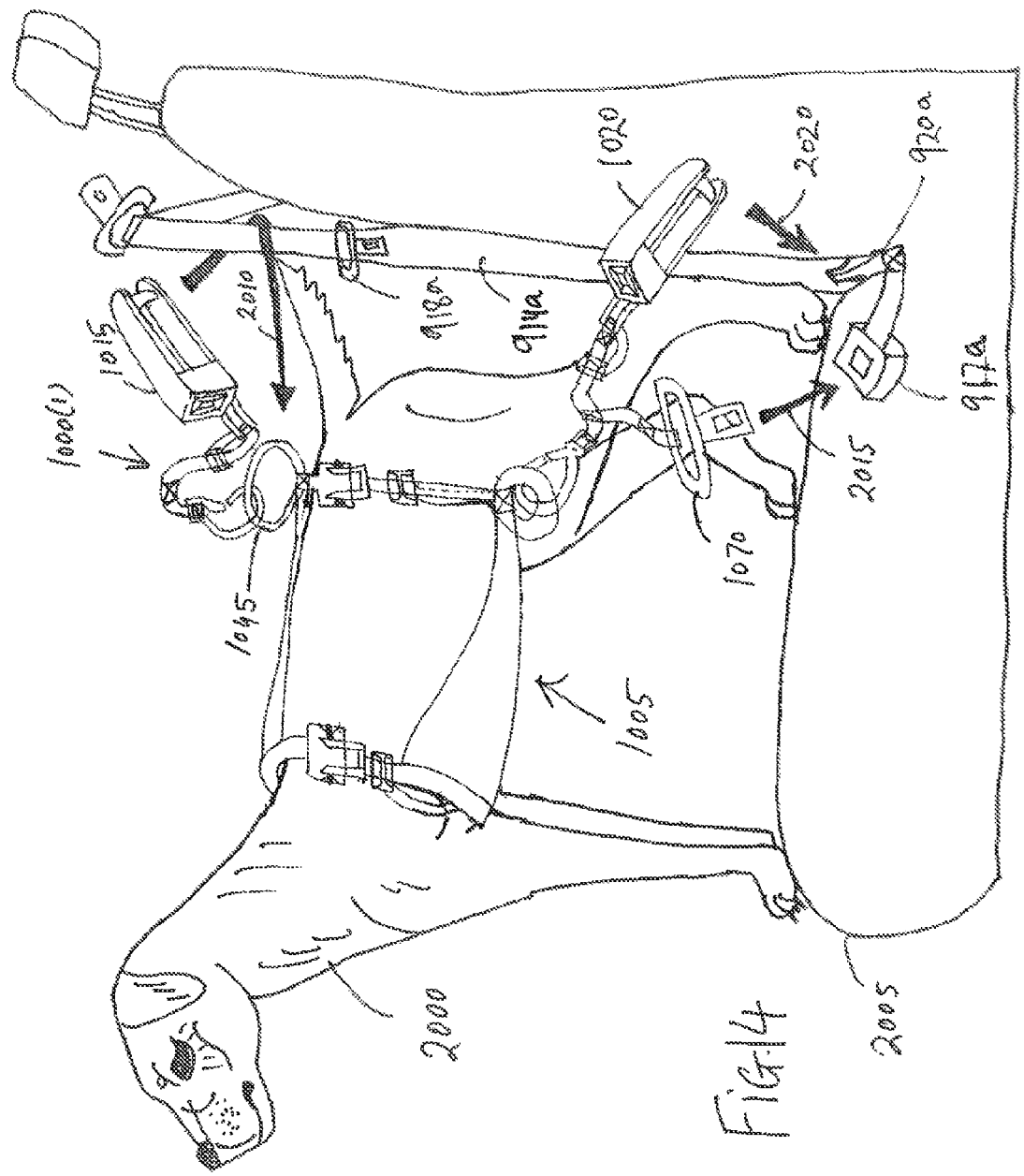
FIG. 14 is a schematic view showing the seatbelt harness of FIG. 13 in use as being worn by a dog standing on a vehicle seat that has an associated vehicle seatbelt system including a seatbelt webbing lock-release system, a seatbelt, first and second belt connectors such as a prong and a buckle respectively and an anchor that connects to an auto child seat.

Referring to FIG. 14, a schematic view of the seatbelt harness 1000(1) of FIG. 13 is shown during its use as being worn by a dog 2000 standing on a vehicle seat 2005. The vehicle seat 2005 generally have the vehicle seatbelt system 902a (not shown, see FIGS. 9-10) including the seatbelt webbing lock-release system 910a (not shown, see FIG. 13), the seatbelt 914a, first and second belt connectors 918a, 917a such as a prong and a buckle respectively and the anchor 920a that connects to an auto child seat.

In operation, the first connector 1015 may form a loop 2010 around the seatbelt 914a when it is connected back to the connector 1045. Alternatively, the first connector 1015 may be hooked to the first belt connector 918a. When the first connector 1015 is connected via the loop 2010 to the seatbelt 914a it latches onto the connector 1045. The forming of the loop 2010 allows the restraint portion 1005 to move up and down or back and forth relatively easily enabling the dog 2000 to comfortably sit, stand, stretch or move on the vehicle seat 2005. Likewise, either the seventh connector 1070 such as a prong can be inserted into the second belt connector 917a as depicted via a first arrow 2015 or the second connector 1020 can be latched to the anchor 920a as depicted by a second arrow 2020.

Figure 15:
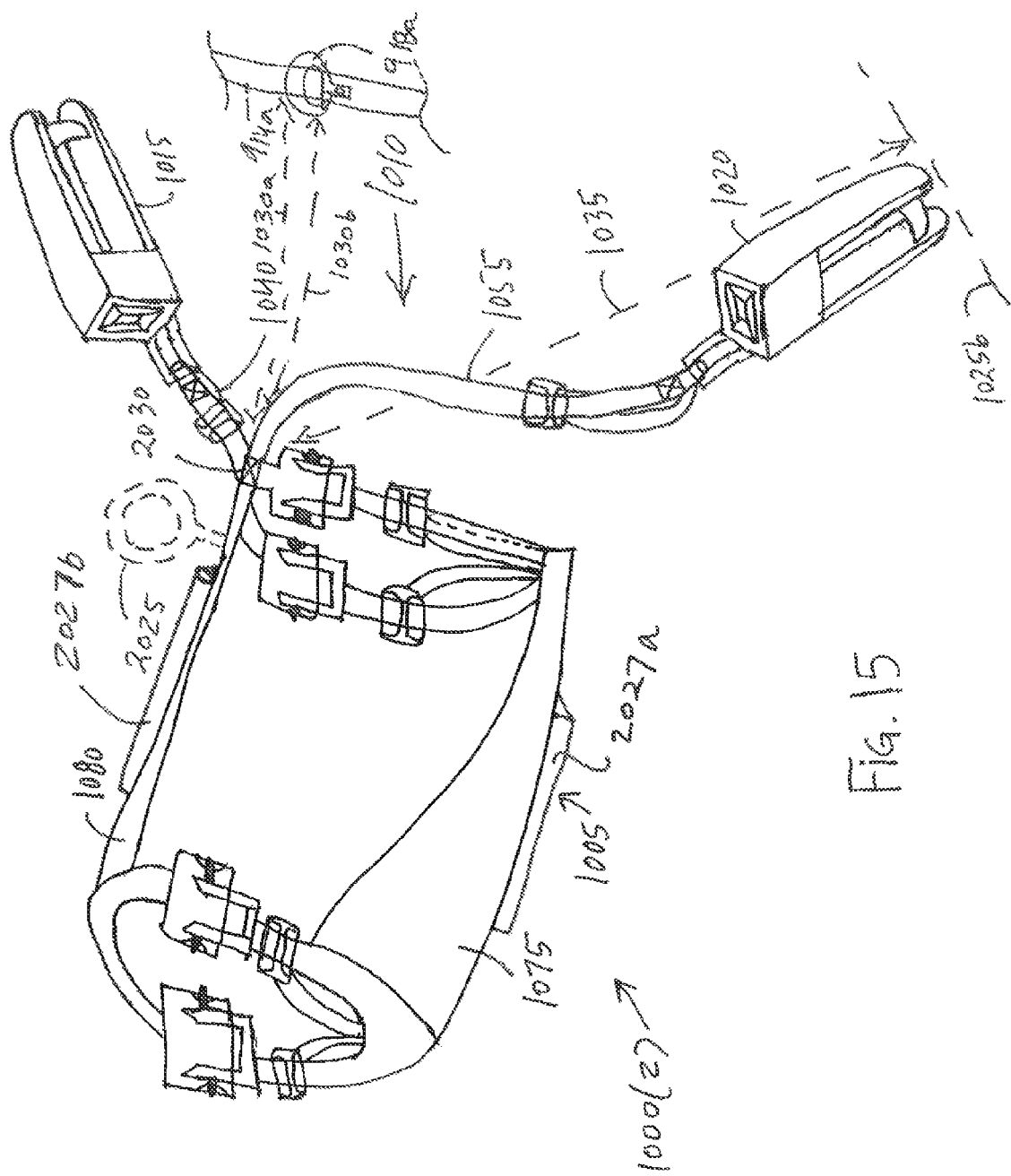
FIGS. 15-56 are schematic views showing a seatbelt harness according to other embodiments of the present invention.

Referring to FIG. 15, a schematic view is shown of a seatbelt harness 1000(2) according to another embodiment of the present invention. Optionally, a connector 2025 such as an O-ring/D-ring may be coupled to the restraint portion 1005. For example, the connector 2025 may be fixedly attached to the second vest portion 1080 and made of metal. The connector 2025 is provided for either connecting the first connector 1015 to it when the first harness 1040 is being drawn around the seatbelt 914a to form the loop 2010, as shown in FIG. 14. The connector 2025 may serve as a connection point for connecting a leash (not shown) that is generally used for walking a pet such as a dog.

According to one or more embodiments of the present invention, the harness portion 1005 may include one or more retainers to retain the first and/or second harnesses 1040, 1055 when they are not in use. In particular, the first vest portion 1075 may include a first pocket 2027a to store the second harness 1055 along with the second connector 1020 with the restraint portion 1005. Likewise, the second vest portion 1080 may include a second pocket 2027b to store the first harness 1040 along with the first connector 1015. Alternatively, the restraint portion 1005 may include only either the first or the second pockets 2027a, 2027b based on a particular arrangement of the first and second harnesses 1040, 1055. For example, depending upon whether the first harness 1040 or the second harness 1055 are fixedly attached to the restraint portion 1005 either the first or second pockets 2027a, 2027b or both the first and second pockets 2027a, 2027b may be provided in the seatbelt harness 1000(2). It is to be understood that the first and second pockets 2027a, 2027b may be selectively provided in all of the embodiments disclosed in the specification or otherwise contemplated without deviating from the scope of the present invention.

The first harness 1040 of the attachment portion 1010 may be coupled to the restraint portion 1005, e.g., fixedly attached to the second vest portion 1080 at the point 2030. Likewise, the second harness 1055 may be coupled to the restraint portion 1005, e.g., fixedly attached to the second vest portion 1080 at the same point 2030. In alternate embodiments, the first and second harnesses 1040, 1055 may be fixedly attached to the restraint portion 1005, e.g., to the second vest portion 1080 at two different suitable points, respectively.

In this embodiment of the present invention, the first connector 1015 may be configured and arranged at the first predetermined position 1017a (not shown, see FIG. 13) and the second connector 1020 may be configured and arranged at the second predetermined position 1017b (not shown, see FIG. 13) relative to the first determined position 1017a. For example, the first and second predetermined positions 1017a, 1017b may be selected for aligning the first and second connectors 1015, 1020 with the restraint portion 1005 such that the attachment portion 1010 to act in conjunction with the restraint portion 1005 to enable positioning of the given pet on the vehicle seat at the desired intermediate point 1022 (not shown, see FIG. 13) along the longitudinal path 1027 (not shown, see FIG. 13) between the first belt connector 918a and the second belt connector 917a or between the first belt connector 918a and the anchor 920a.

Accordingly, in this embodiment of the present invention, the first connector 1015 may be adapted to couple to either the seatbelt 914a or the first belt connector 918a such that, in use, the restraint portion 1005 has the first distance 1030a or 1030b from the default position of the seatbelt 914a or the default position of the first belt connector 918a, respectively. Likewise, the second connector 1020 may be adapted to couple either the second belt connector 917a or the anchor 920a (as shown in FIG. 13) such that, in use, the restraint portion 1005 has the second distance 1035 from the free end 1025b of the second connector 1020. In this way, the seatbelt harness 1000(2) may be configured and arranged in an arrangement or configuration such that the second distance 1035 determines the maximum increase allowable to the first distance 1030a or 1030b, i.e., the second distance 1035 controls how much the first distance 1030a or 1030b can be at the most.

Figure 16:
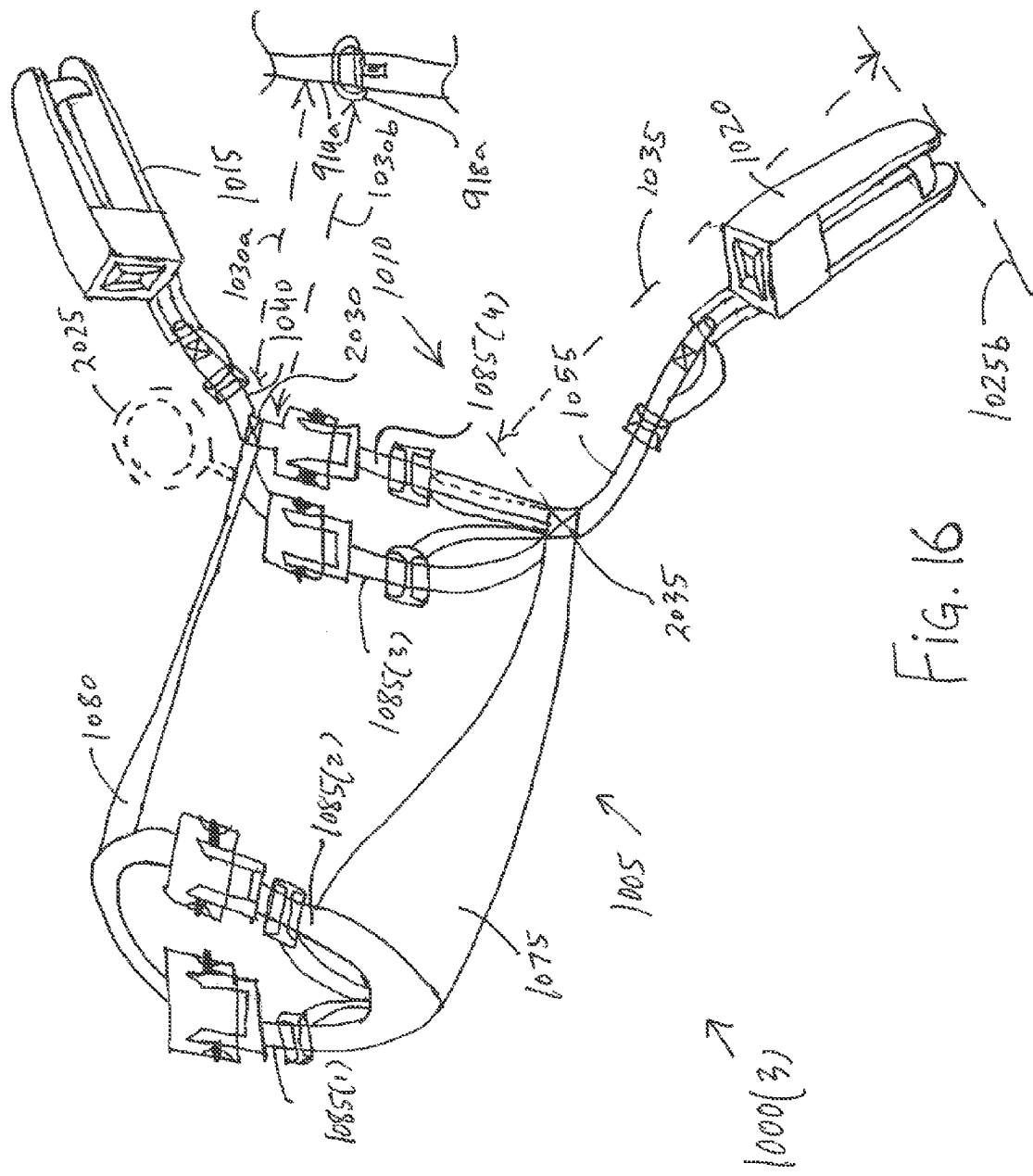

Referring to FIG. 16, a schematic view is shown of a seatbelt harness 1000(3) according to another embodiment of the present invention. In this embodiment, while the first harness 1040 may be coupled to the restraint portion 1005, e.g., at the point 2030 on the second vest portion 1080, the second harness 1055 may be coupled to the restraint portion 1005, e.g., fixedly attached at another point 2035 on the first vest portion 1075. In other embodiments, the second harness 1055 may be coupled to the restraint portion 1005 at any other point than the point 2030, e.g., including on the straps 1085 (1-4). Optionally, the connector 2025 such as an O-ring/D-ring may be coupled to the restraint portion 1005. For example, the connector 2025 may be fixedly attached to the second vest portion 1080.

In this embodiment, the first connector 1015 may be configured and arranged at the first predetermined position 1017a (not shown, see FIG. 13) and the second connector 1020 may be configured and arranged at the second predetermined position 1017b (not shown, see FIG. 13) relative to the first determined position 1017a. For example, the first and second predetermined positions 1017a, 1017h may be selected for aligning the first and second connectors 1015, 1020 with the restraint portion 1005 such that the attachment portion 1010 to act in conjunction with the restraint portion 1005 to enable positioning of the given pet on the vehicle seat at the desired intermediate point 1022 (not shown, see FIG. 13) along the longitudinal path 1027 (not shown, see FIG. 13) between the first belt connector 918a and the second belt connector 917a or between the first belt connector 918a and the anchor 920a.

Accordingly, in this embodiment of the present invention, the first connector 1015 may be adapted to couple to either the seatbelt 914a or the first belt connector 918a such that, in use, the restraint portion 1005 has the first distance 1030a or 1030b from the default position of the seatbelt 914a or the default position of the first belt connector 918a, respectively. Likewise, the second connector 1020 may be adapted to couple either the second belt connector 917a or the anchor 920a (as shown in FIG. 13) such that, in use, the restraint portion 1005 has the second distance 1035 from the free end 1025b of the second connector 1020. In this way, the seatbelt harness 1000(3) may be configured and arranged such that the second distance 1035 determines the maximum increase allowable to the first distance 1030a or 1030b, i.e., the second distance 1035 controls how much the first distance 1030a or 1030b can be at the most.

Figure 17:
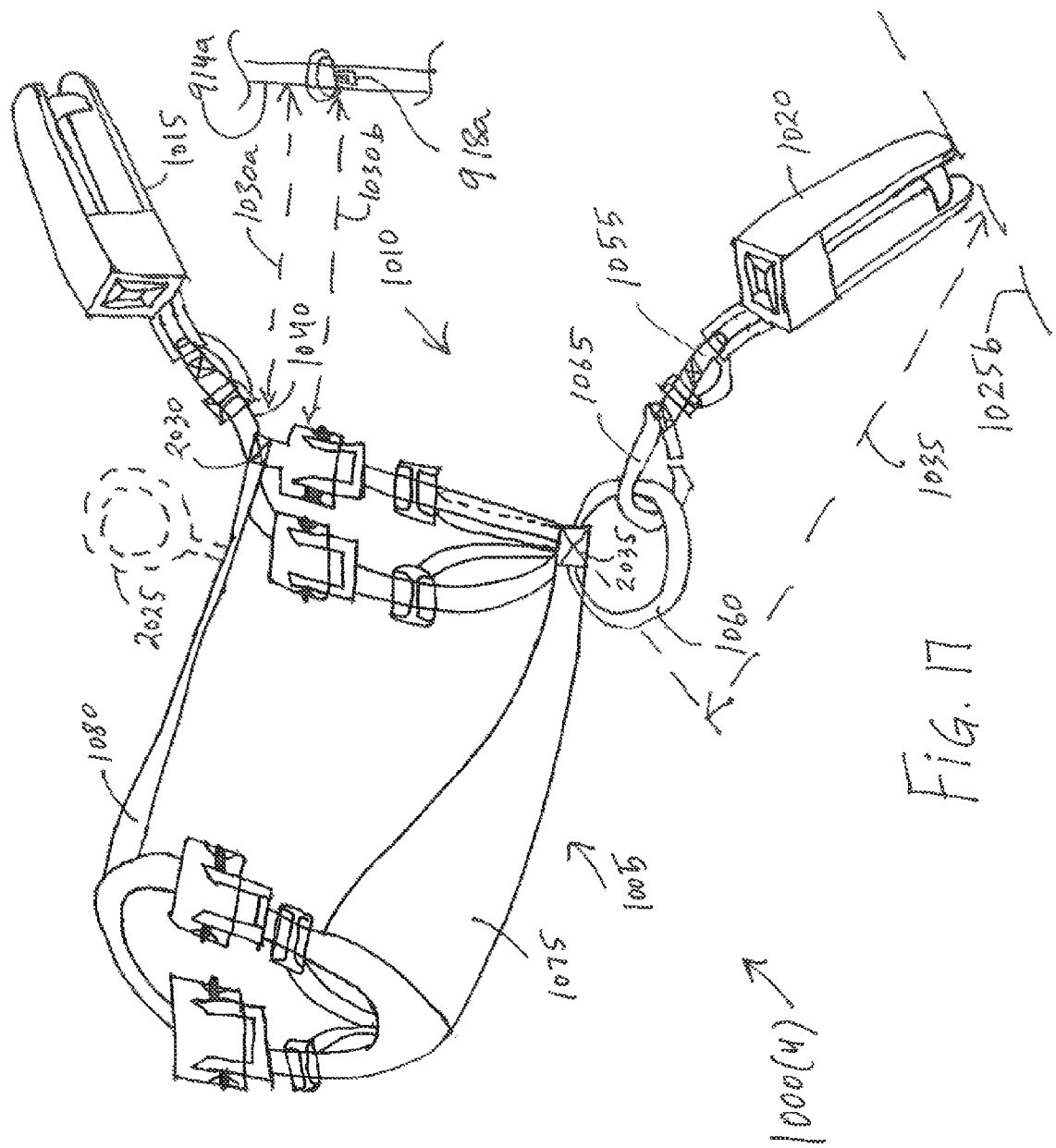

Referring to FIG. 17, a schematic view is shown of a seatbelt harness 1000(4) according to another embodiment of the present invention. Consistent with this embodiment of the present invention, the restraint portion 1005 of the seatbelt harness 1000(4) may further include the fifth connector 1060 and the second harness 1055 may include the sixth connector 1065 at the first harness end such that the sixth connector 1065 may be configured to removably couple to the fifth connector 1060. The fifth connector 1060 may be attached at the point 2035 on the first vest portion 1075. Likewise, the sixth connector 1065 may be coupled to the second harness 1055. Optionally, the connector 2025 may be coupled to the restraint portion 1005, for example, it may be fixedly attached to the second vest portion 1080.

In this embodiment, the first connector 1015 may be configured and arranged at the first predetermined position 1017a (not shown, see FIG. 13) and the second connector 1020 may be configured and arranged at the second predetermined position 1017b (not shown, see FIG. 13) relative to the first determined position 1017a. For example, the first and second predetermined positions 1017a, 1017b may be selected for aligning the first and second connectors 1015, 1020 with the restraint portion 1005 such that the attachment portion 1010 to act in conjunction with the restraint portion 1005 to enable positioning of the given pet on the vehicle seat at the desired intermediate point 1022 (not shown, see FIG. 13) along the longitudinal path 1027 (not shown, see FIG. 13) between the first belt connector 918a and the second belt connector 917a or between the first belt connector 918a and the anchor 920a.

Accordingly, in this embodiment of the present invention, the first connector 1015 may be adapted to couple to either the seatbelt 914a or the first belt connector 918a such that, in use, the restraint portion 1005 has the first distance 1030a or 1030b from the default position of the seatbelt 914a or the default position of the first belt connector 918a, respectively. Likewise, the second connector 1020 may be adapted to couple either the second belt connector 917a or the anchor 920a (as shown in FIG. 13) such that, in use, the restraint portion 1005 has the second distance 1035 from the free end 1025b of the second connector 1020. In this way, the seatbelt harness 1000(4) may be configured and arranged such that the second distance 1035 determines the maximum increase allowable to the first distance 1030a or 1030b, i.e., the second distance 1035 controls how much the first distance 1030a or 1030b can be at the most.

Figure 18:
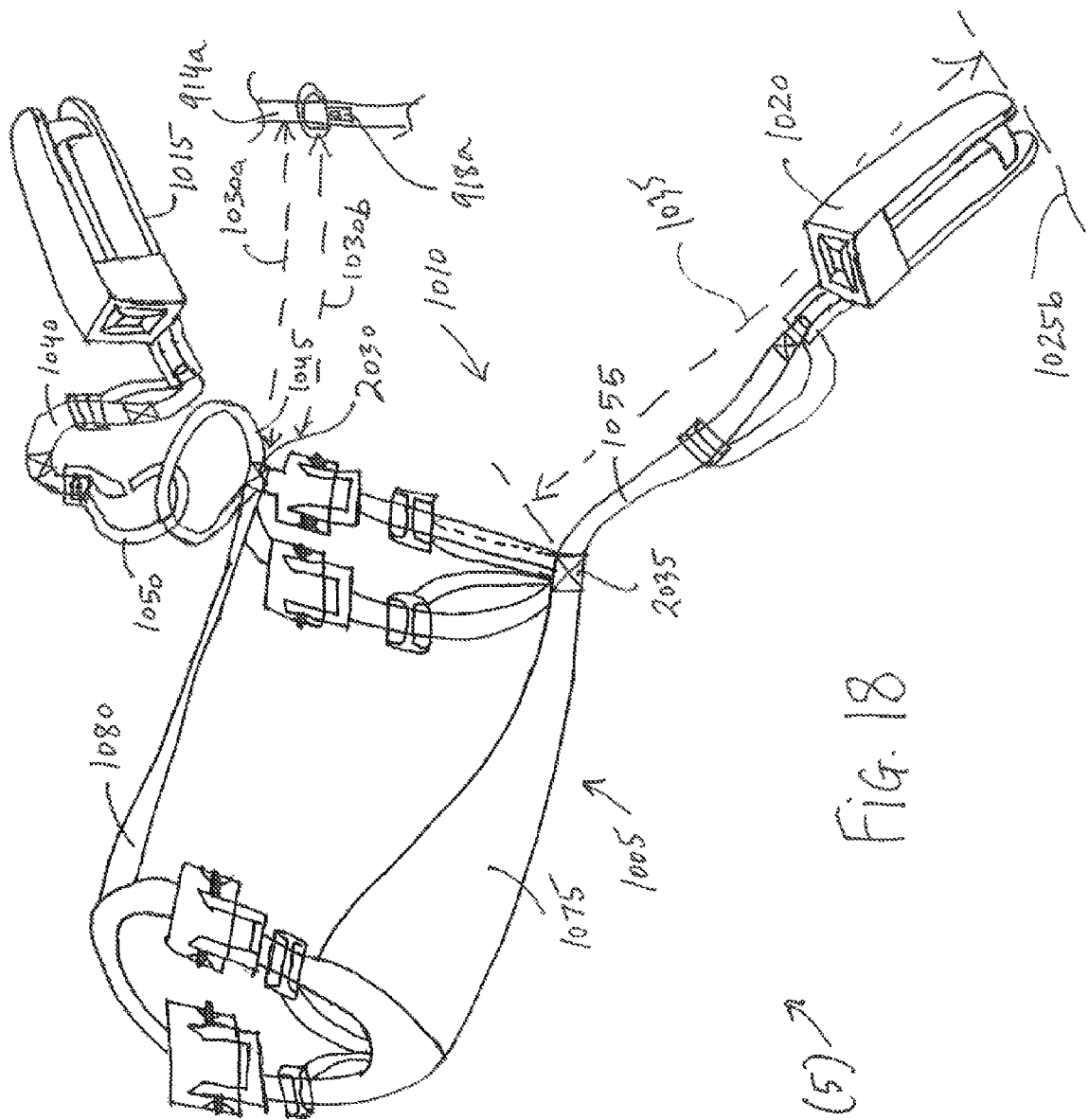

Referring to FIG. 18, a schematic view is shown of a seatbelt harness 1000(5) according to another embodiment of the present invention. Consistent with this embodiment of the present invention, the restraint portion 1005 of the seatbelt harness 1000(5) may further include the third connector 1045 and the first harness 1040 may include the fourth connector 1050 at the first harness end such that the fourth connector 1050 may be configured to removably couple to the third connector 1045. The third connector 1045 may be attached to the point 2030 on the second vest portion 1080. Likewise, the fourth connector 1050 may be coupled to the first harness 1040. The second harness 1055 may be coupled to the restraint portion 1005, e.g., fixedly attached to the first vest portion 1075 at the point 2035.

In this embodiment, the first connector 1015 may be configured and arranged at the first predetermined position 1017a (not shown, see FIG. 13) and the second connector 1020 may be configured and arranged at the second predetermined position 1017b (not shown, see FIG. 13) relative to the first determined position 1017a. For example, the first and second predetermined positions 1017a, 1017b may be selected for aligning the first and second connectors 1015, 1020 with the restraint portion 1005 such that the attachment portion 1010 to act in conjunction with the restraint portion 1005 to enable positioning of the given pet on the vehicle seat at the desired intermediate point 1022 (not shown, see FIG. 13) along the longitudinal path 1027 (not shown, see FIG. 13) between the first belt connector 918a and the second belt connector 917a or between the first belt connector 918a and the anchor 920a.

Accordingly, in this embodiment of the present invention, the first connector 1015 may be adapted to couple to either the seatbelt 914a or the first belt connector 918a such that, in use, the restraint portion 1005 has the first distance 1030a or 1030b from the default position of the seatbelt 914a or the default position of the first belt connector 918a, respectively. Likewise, the second connector 1020 may be adapted to couple either the second belt connector 917a or the anchor 920a (as shown in FIG. 13) such that, in use, the restraint portion 1005 has the second distance 1035 from the free end 1025b of the second connector 1020. In this way, the seatbelt harness 1000(5) may be configured and arranged such that the second distance 1035 determines the maximum increase allowable to the first distance 1030a or 1030b, i.e., the second distance 1035 controls how much the first distance 1030a or 1030b can be at the most.

Figure 19:
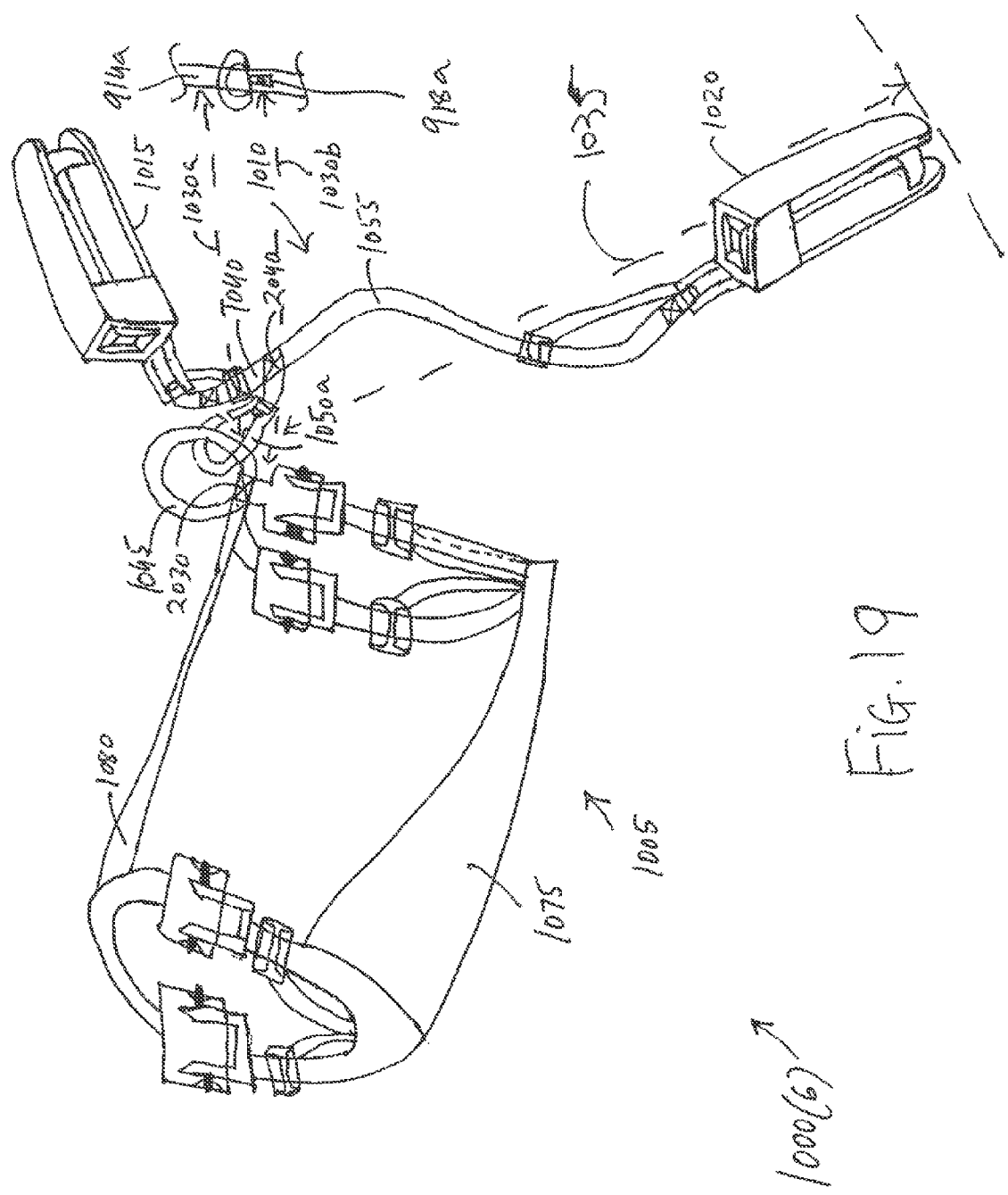

Referring to FIG. 19, a schematic view is shown of a seatbelt harness 1000(6) according to another embodiment of the present invention. Consistent with this embodiment of the present invention, the restraint portion 1005 of the seatbelt harness 1000(6) may further include the third connector 1045 and the first harness 1040 may include a fourth connector 1050a at the first harness end such that the fourth connector 1050a may be configured to removably couple to the third connector 1045. The third connector 1045 may be attached to the point 2030 on the second vest portion 1080. Likewise, the fourth connector 1050a may be coupled to either the first and/or the second harnesses 1040, 1055. The second harness 1055 may be coupled to the first harness 1040 at a point 2040, e.g., fixedly attached to the first harness 1040 at the point 2040.

In this embodiment, the first connector 1015 may be configured and arranged at the first predetermined position 1017a (not shown, see FIG. 13) and the second connector 1020 may be configured and arranged at the second predetermined position 1017b (not shown, see FIG. 13) relative to the first determined position 1017a. For example, the first and second predetermined positions 1017a, 1017b may be selected for aligning the first and second connectors 1015, 1020 with the restraint portion 1005 such that the attachment portion 1010 to act in conjunction with the restraint portion 1005 to enable positioning of the given pet on the vehicle seat at the desired intermediate point 1022 (not shown, see. FIG. 13) along the longitudinal path 1027 (not shown, see FIG. 13) between the first belt connector 918a and the second belt connector 917a or between the first belt connector 918a and the anchor 920a.

Accordingly, in this embodiment of the present invention, the first connector 1015 may be adapted to couple to either the seatbelt 914a or the first belt connector 918a such that, in use, the restraint portion 1005 has the first distance 1030a or 1030b from the default position of the seatbelt 914a or the default position of the first belt connector 918a, respectively. Likewise, the second connector 1020 may be adapted to couple either the second belt connector 917a or the anchor 920a (as shown in FIG. 13) such that, in use, the restraint portion 1005 has the second distance 1035 from the free end 1025b of the second connector 1020. In this way, the seatbelt harness 1000(6) may be configured and arranged such that the second distance 1035 determines the maximum increase allowable to the first distance 1030a or 1030b, i.e., the second distance 1035 controls how much the first distance 1030a or 1030b can be at the most.

Figure 20:
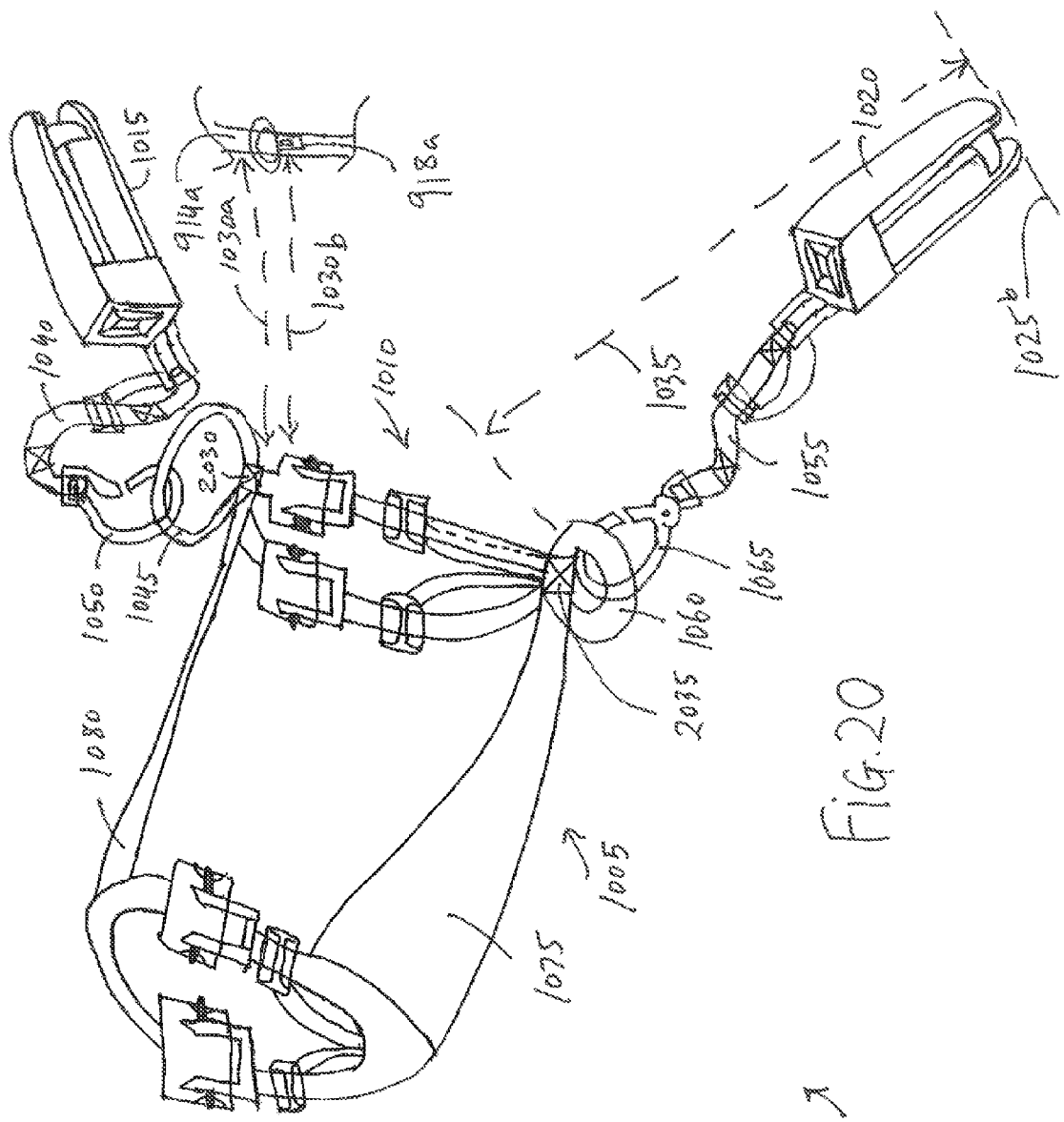

Referring to FIG. 20, a schematic view is shown of a seatbelt harness 1000(7) according to another embodiment of the present invention. Consistent with this embodiment of the present invention, the restraint portion 1005 of the seatbelt harness 1000(7) may further include the third connector 1045 and the first harness 1040 may include the fourth connector 1050 at the first harness end such that the fourth connector 1050 may be configured to removably couple to the third connector 1045. The third connector 1045 may be attached to the point 2030 on the second vest portion 1080. Likewise, the fourth connector 1050 may be coupled to the first harness 1040.

Consistent with this embodiment of the present invention, the restraint portion 1005 of the seatbelt harness 1000(7) may further include the fifth connector 1060 and the second harness 1055 may include the sixth connector 1065 at the first harness end such that the sixth connector 1065 may be configured to removably couple to the fifth connector 1060. The fifth connector 1060 may be attached at the point 2035 on the first vest portion 1075. Likewise, the sixth connector 1065 may be coupled to the second harness 1055.

In this embodiment, the first connector 1015 may be configured and arranged at the first predetermined position 1017a (not shown, see FIG. 13) and the second connector 1020 may be configured and arranged at the second predetermined position 1017b (not shown, see FIG. 13) relative to the first determined position 1017a. For example, the first and second predetermined positions 1017a, 1017b may be selected for aligning the first and second connectors 1015, 1020 with the restraint portion 1005 such that the attachment portion 1010 to act in conjunction with the restraint portion 1005 to enable positioning of the given pet on the vehicle seat at the desired intermediate point 1022 (not shown, see FIG. 13) along the longitudinal path 1027 (not shown, see FIG. 13) between the first belt connector 918a and the second belt connector 917a or between the first belt connector 918a and the anchor 920a.

Accordingly, in this embodiment of the present invention, the first connector 1015 may be adapted to couple to either the seatbelt 914a or the first belt connector 918a such that, in use, the restraint portion 1005 has the first distance 1030a or 1030b from the default position of the seatbelt 914a or the default position of the first belt connector 918a, respectively. Likewise, the second connector 1020 may be adapted to couple either the second belt connector 917a or the anchor 920a (as shown in FIG. 13) such that, in use, the restraint portion 1005 has the second distance 1035 from the free end 1025b of the second connector 1020. In this way, the seatbelt harness 1000(7) may be configured and arranged such that the second distance 1035 determines the maximum increase allowable to the first distance 1030a or 1030b, i.e., the second distance 1035 controls how much the first distance 1030a or 1030b can be at the most.

Figure 21:
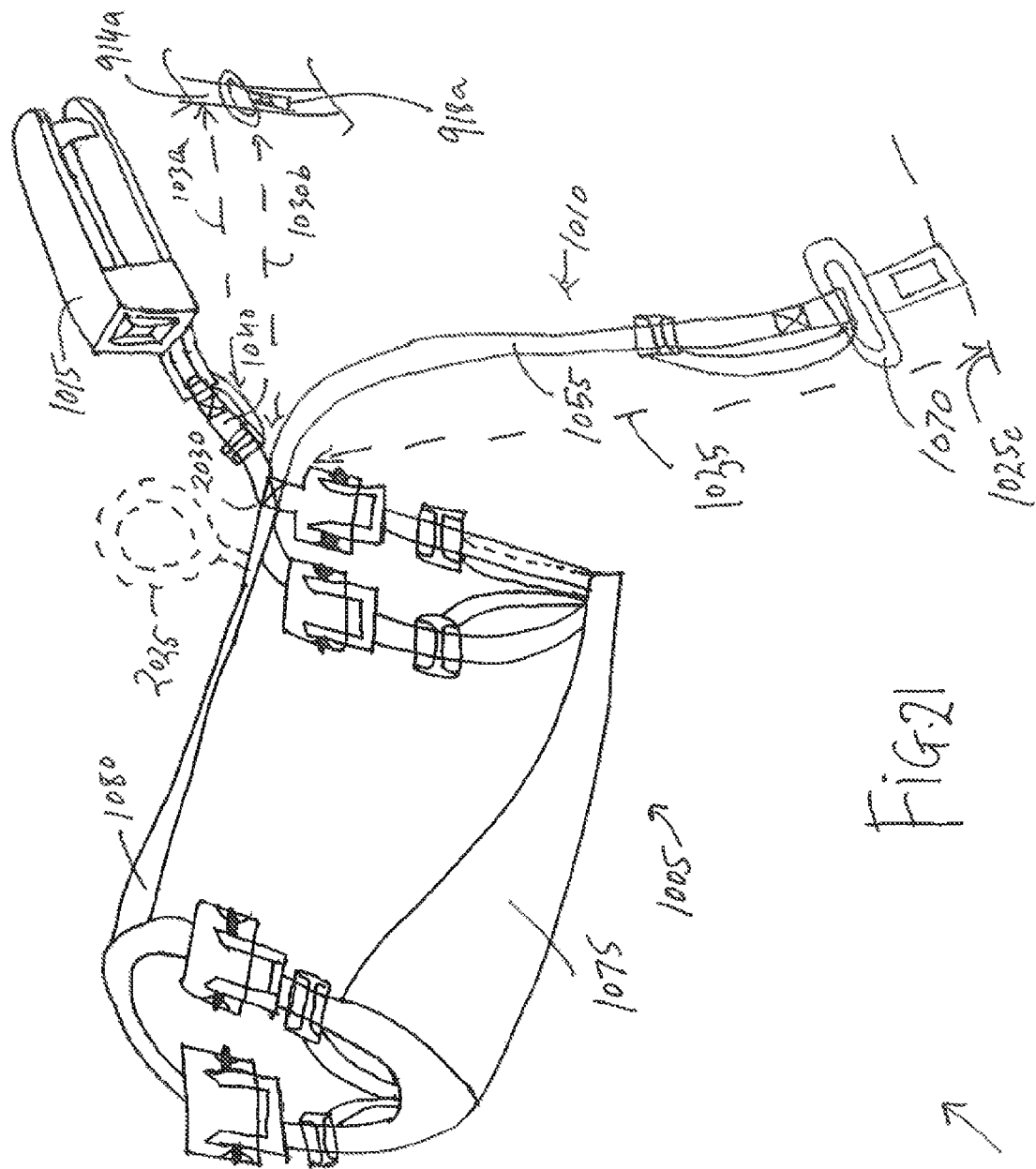

Referring to FIG. 21, a schematic view is shown of a seatbelt harness 1000(8) according to another embodiment of the present invention. Optionally, the connector 2025 such as an O-ring/D-ring may be coupled to the restraint portion 1005. For example, the connector 2025 may be fixedly attached to the second vest portion 1080 and made of metal. The first harness 1040 of the attachment portion 1010 may be coupled to the restraint portion 1005, e.g., fixedly attached to the second vest portion 1080 at the point 2030. Likewise, the second harness 1055 may be coupled to the restraint portion 1005, e.g., fixedly attached to the second vest portion 1080 at the point 2030. In other embodiments, the first and second harnesses 1040, 1055 can be fixedly attached to the restraint portion 1005, e.g., the second vest portion 1080 at two different points, respectively.

In this embodiment, the first connector 1015 may be configured and arranged at the first predetermined position 1017a (not shown, see FIG. 13) and the seventh connector 1070 may be configured and arranged at the second predetermined position 1017b (not shown, see FIG. 13) relative to the first determined position 1017a. For example, the first and second predetermined positions 1017a, 1017b may be selected for aligning the first and seventh connectors 1015, 1070 with the restraint portion 1005 such that the attachment portion 1010 to act in conjunction with the restraint portion 1005 to enable positioning of the given pet on the vehicle seat at the desired intermediate point 1022 (not shown, see FIG. 13) along the longitudinal path 1027 (not shown, see FIG. 13) between the first belt connector 918a and the second belt connector 917a or between the first belt connector 918a and the anchor 920a.

Accordingly, in this embodiment of the present invention, the first connector 1015 may be adapted to couple to either the seatbelt 914a or the first belt connector 918a such that, in use, the restraint portion 1005 has the first distance 1030a or 1030b from the default position of the seatbelt 914a or the default position of the first belt connector 918a, respectively. Likewise, the seventh connector 1070 may be adapted to couple the second belt connector 917a (as shown in FIG. 13) such that, in use, the restraint portion 1005 has the second distance 1035 from a free end 1025c of the seventh connector 1070. In this way, the seatbelt harness 1000(8) may be configured and arranged such that the second distance 1035 determines the maximum increase allowable to the first distance 1030a or 1030b, i.e., the second distance 1035 controls how much the first distance 1030a or 1030b can be at the most.

Figure 22:
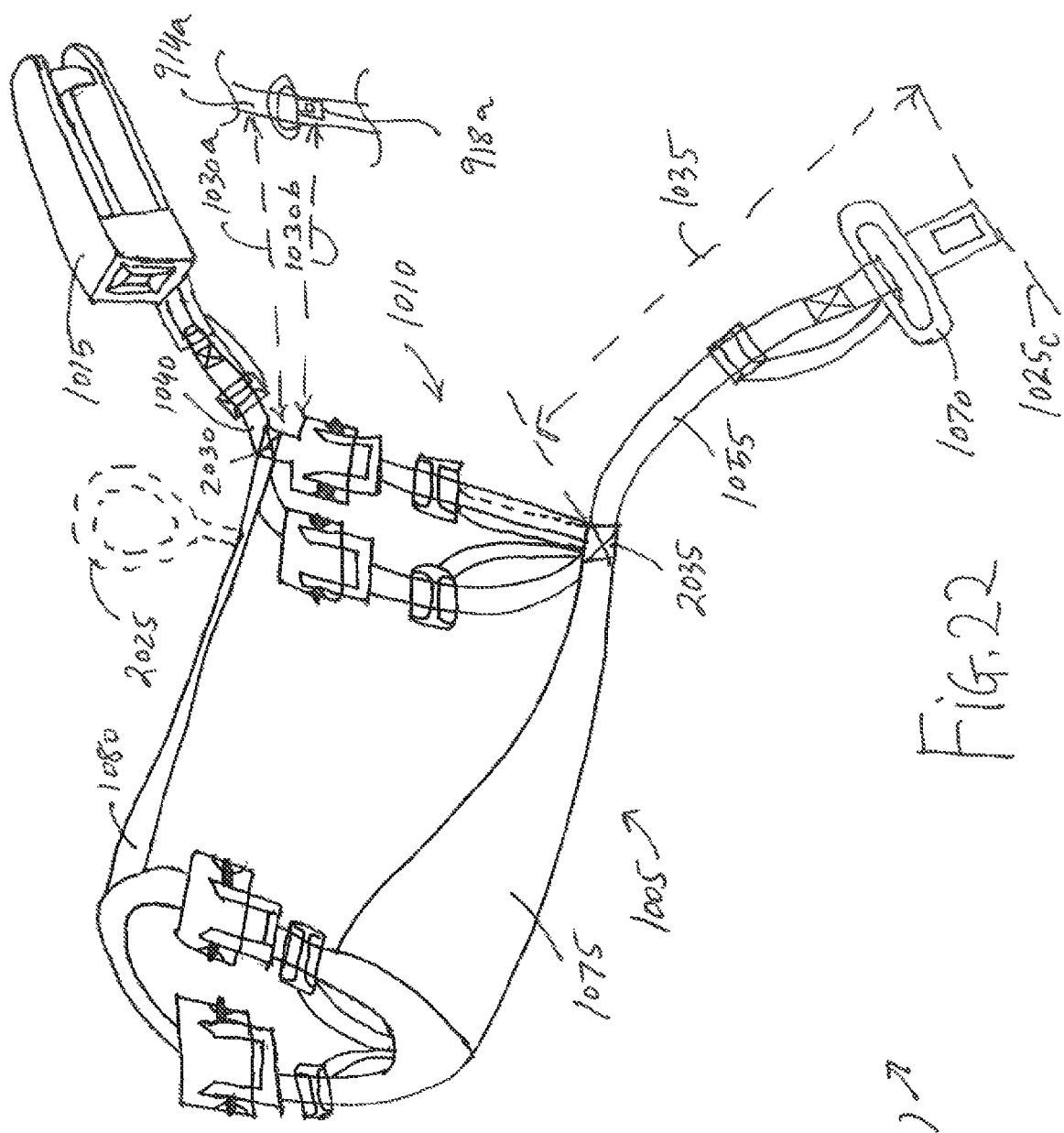

Referring to FIG. 22, a schematic view is shown of a seatbelt harness 1000(9) according to another embodiment of the present invention. In this embodiment, while the first harness 1040 may be coupled to the restraint portion 1005, e.g., at the point 2030 on the second vest portion 1080, the second harness 1055 may be coupled to the restraint portion 1005, e.g., fixedly attached at another point 2035 on the first vest portion 1075. In other embodiments, the second harness 1055 may be coupled to the restraint portion 1005 at any other point than the point 2030 including the straps 1085(14). Optionally, the connector 2025 may be coupled to the restraint portion 1005, for example, it may be fixedly attached to the second vest portion 1080.

In this embodiment, the first connector 1015 may be configured and arranged at the first predetermined position 1017a (not shown, see FIG. 13) and the seventh connector 1070 may be configured and arranged at the second predetermined position 1017b (not shown, see FIG. 13) relative to the first determined position 1017a. For example, the first and second predetermined positions 1017a, 1017b may be selected for aligning the first and seventh connectors 1015, 1070 with the restraint portion 1005 such that the attachment portion 1010 to act in conjunction with the restraint portion 1005 to enable positioning of the given pet on the vehicle seat at the desired intermediate point 1022 (not shown, see FIG. 13) along the longitudinal path 1027 (not shown, see FIG. 13) between the first belt connector 918a and the second belt connector 917a or between the first belt connector 918a and the anchor 920a.

Accordingly, in this embodiment of the present invention, the first connector 1015 may be adapted to couple to either the seatbelt 914a or the first belt connector 918a such that, in use, the restraint portion 1005 has the first distance 1030a or 1030b from the default position of the seatbelt 914a or the default position of the first belt connector 918a, respectively. Likewise, the seventh connector 1070 may be adapted to couple the second belt connector 917a (as shown in FIG. 13) such that, in use, the restraint portion 1005 has the second distance 1035 from the free end 1025c of the seventh connector 1070. In this way, the seatbelt harness 1000(9) may be configured and arranged such that the second distance 1035 determines the maximum increase allowable to the first distance 1030a or 1030b, i.e., the second distance 1035 controls how much the first distance 1030a or 1030b can be at the most.

Figure 23:
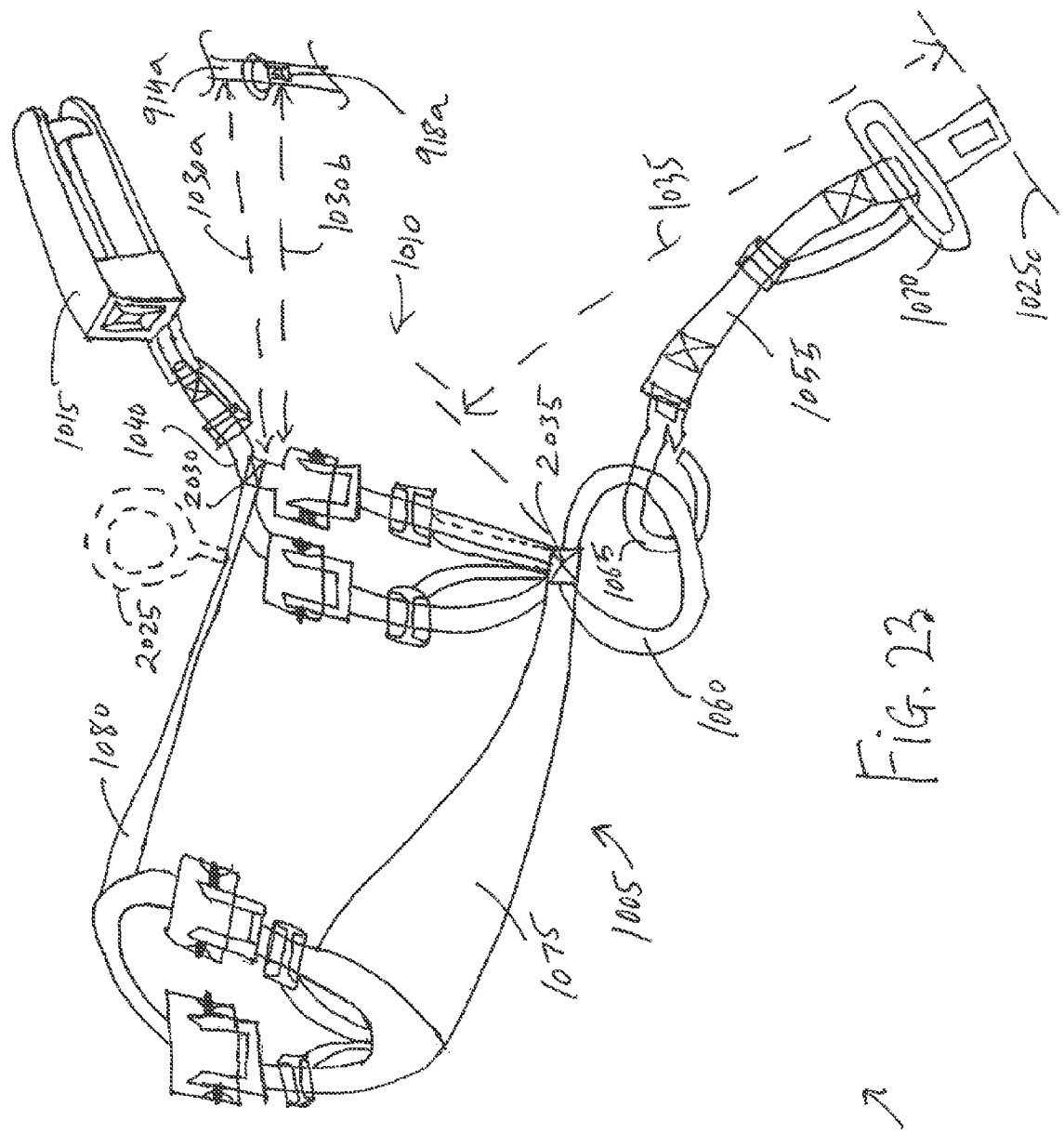

Referring to FIG. 23, a schematic view is shown of a seatbelt harness 1000(10) according to another embodiment of the present invention. Consistent with this embodiment of the present invention, the restraint portion 1005 of the seatbelt harness 1000(10) may further include the fifth connector 1060 and the second harness 1055 may include the sixth connector 1065 at the first harness end such that the sixth connector 1065 may be configured to removably couple to the fifth connector 1060. The fifth connector 1060 may be attached at the point 2035 on the first vest portion 1075. Likewise, the sixth connector 1065 may be coupled to the second harness 1055. Optionally, the connector 2025 may be coupled to the restraint portion 1005, for example, it may be fixedly attached to the second vest portion 1080.

In this embodiment, the first connector 1015 may be configured and arranged at the first predetermined position 1017a (not shown, see FIG. 13) and the seventh connector 1070 may be configured and arranged at the second predetermined position 1017b (not shown, see FIG. 13) relative to the first determined position 1017a. For example, the first and second predetermined positions 1017a, 1017b may be selected for aligning the first and seventh connectors 1015, 1070 with the restraint portion 1005 such that the attachment portion 1010 to act in conjunction with the restraint portion 1005 to enable positioning of the given pet on the vehicle seat at the desired intermediate point 1022 (not shown, see FIG. 13) along the longitudinal path 1027 (not shown, see FIG. 13) between the first belt connector 918a and the second belt connector 917a or between the first belt connector 918a and the anchor 920a.

Accordingly, in this embodiment of the present invention, the first connector 1015 may be adapted to couple to either the seatbelt 914a or the first belt connector 918a such that, in use, the restraint portion 1005 has the first distance 1030a or 1030b from the default position of the seatbelt 914a or the default position of the first belt connector 918a, respectively. Likewise, the seventh connector 1070 may be adapted to couple the second belt connector 917a (as shown in FIG. 13) such that, in use, the restraint portion 1005 has the second distance 1035 from the free end 1025c of the seventh connector 1070. In this way, the seatbelt harness 1000(10) may be configured and arranged such that the second distance 1035 determines the maximum increase allowable to the first distance 1030a or 1030b, i.e., the second distance 1035 controls how much the first distance 1030a or 1030b can be at the most.

Figure 24:
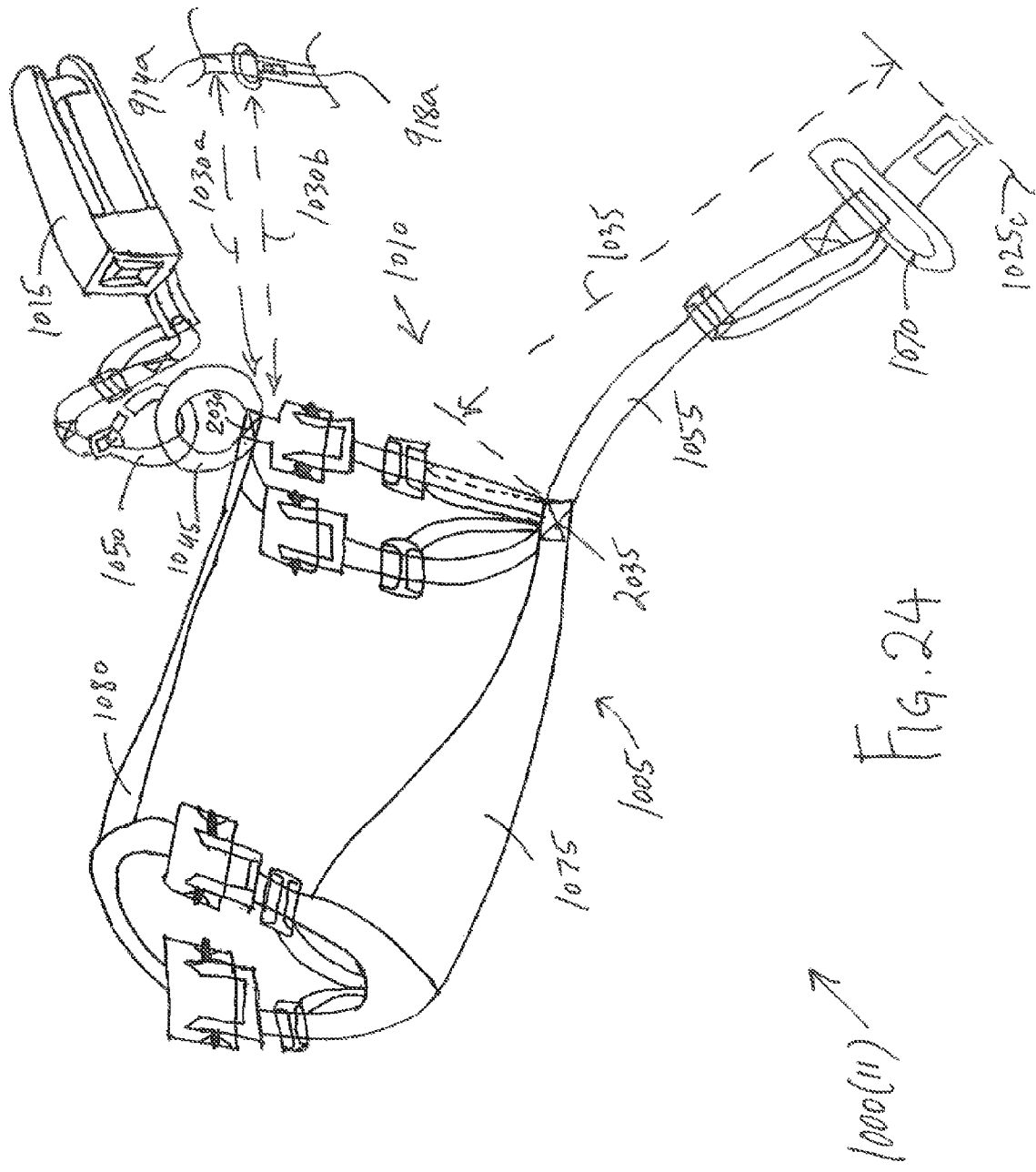

Referring to FIG. 24, a schematic view is shown of a seatbelt harness 1000(11) according to another embodiment of the present invention. Consistent with this embodiment of the present invention, the restraint portion 1005 of the seatbelt harness 1000(11) may further include the third connector 1045 and the first harness 1040 may include the fourth connector 1050 at the first harness end such that the fourth connector 1050 may be configured to removably couple to the third connector 1045. The third connector 1045 may be attached to the point 2030 on the second vest portion 1080. Likewise, the fourth connector 1050 may be coupled to the first harness 1040. The second harness 1055 may be coupled to the restraint portion 1005, e.g., fixedly attached to the first vest portion 1075 at the point 2035.

In this embodiment, the first connector 1015 may be configured and arranged at the first predetermined position 1017a (not shown, see FIG. 13) and the seventh connector 1070 may be configured and arranged at the second predetermined position 1017b (not shown, see FIG. 13) relative to the first determined position 1017a. For example, the first and second predetermined positions 1017a, 1017b may be selected for aligning the first and seventh connectors 1015, 1070 with the restraint portion 1005 such that the attachment portion 1010 to act in conjunction with the restraint portion 1005 to enable positioning of the given pet on the vehicle seat at the desired intermediate point 1022 (not shown, see FIG. 13) along the longitudinal path 1027 (not shown, see FIG. 13) between the first belt connector 918a and the second belt connector 917a or between the first belt connector 918a and the anchor 920a.

Accordingly, in this embodiment of the present invention, the first connector 1015 may be adapted to couple to either the seatbelt 914a or the first belt connector 918a such that, in use, the restraint portion 1005 has the first distance 1030a or 1030b from the default position of the seatbelt 914a or the default position of the first belt connector 918a, respectively. Likewise, the seventh connector 1070 may be adapted to couple the second belt connector 917a (as shown in FIG. 13) such that, in use, the restraint portion 1005 has the second distance 1035 from the free end 1025c of the seventh connector 1070. In this way, the seatbelt harness 1000(11) may be configured and arranged such that the second distance 1035 determines the maximum increase allowable to the first distance 1030a or 1030b, i.e., the second distance 1035 controls how much the first distance 1030a or 1030b can be at the most.

Figure 25:
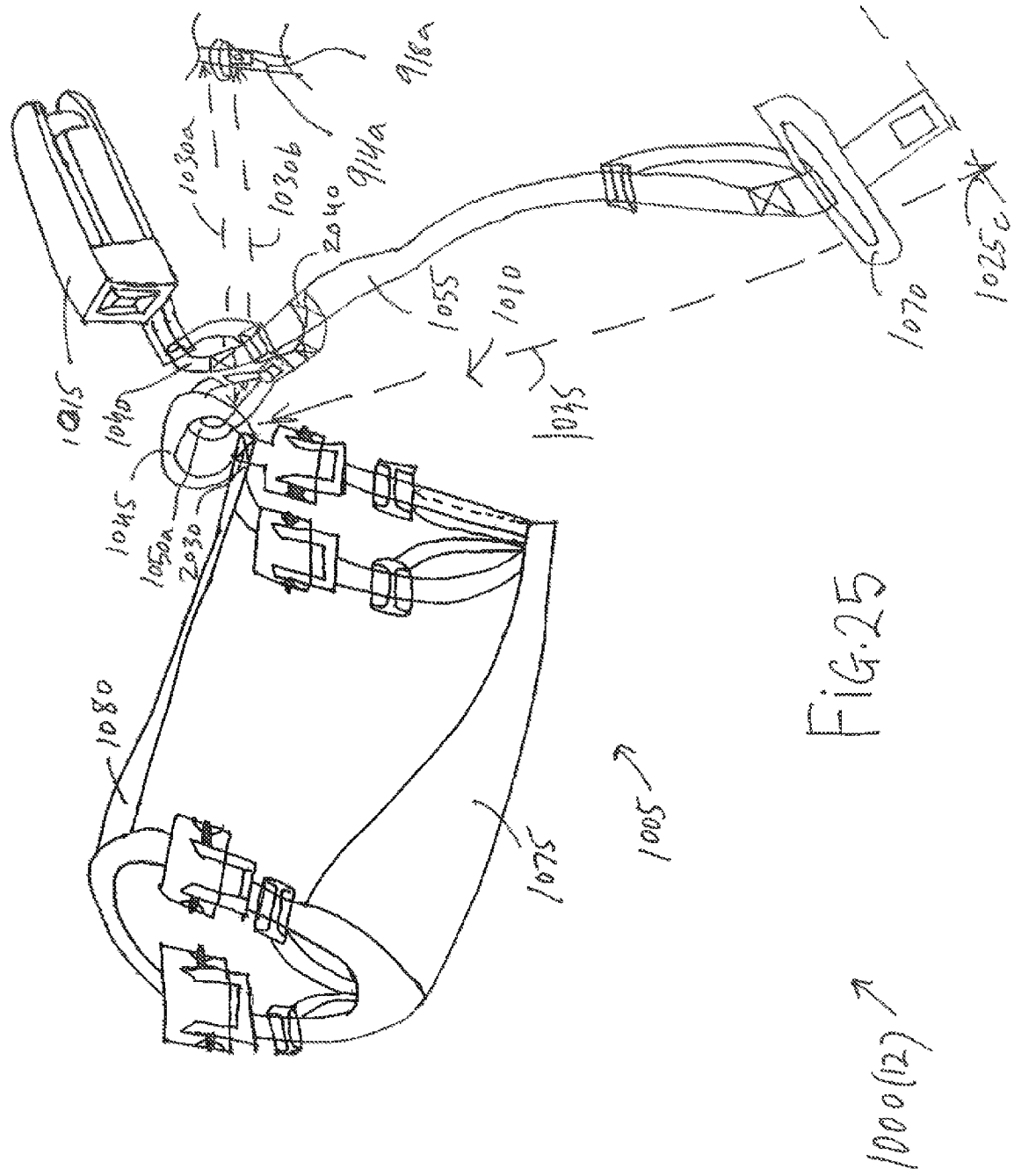

Referring to FIG. 25, a schematic view is shown of a seatbelt harness 1000(12) according to another embodiment of the present invention. Consistent with this embodiment of the present invention, the restraint portion 1005 of the seatbelt harness 1000(12) may further include the third connector 1045 and the first harness 1040 may include the fourth connector 1050a at the first harness end such that the fourth connector 1050a may be configured to removably couple to the third connector 1045. The third connector 1045 may be attached to the point 2030 on the second vest portion 1080. Likewise, the fourth connector 1050a can be coupled to either one of the first and second harnesses 1040, 1055. The second harness 1055 may be coupled to the first harness 1040 at the point 2040, e.g., fixedly attached to the first harness 1040 at the point 2040.

In this embodiment, the first connector 1015 may be configured and arranged at the first predetermined position 1017a (not shown, see FIG. 13) and the seventh connector 1070 may be configured and arranged at the second predetermined position 1017b (not shown, see FIG. 13) relative to the first determined position 1017a. For example, the first and second predetermined positions 1017a, 1017b may be selected for aligning the first and seventh connectors 1015, 1070 with the restraint portion 1005 such that the attachment portion 1010 to act in conjunction with the restraint portion 1005 to enable positioning of the given pet on the vehicle seat at the desired intermediate point 1022 (not shown, see FIG. 13) along the longitudinal path 1027 (not shown, see FIG. 13) between the first belt connector 918a and the second belt connector 917a or between the first belt connector 918a and the anchor 920a.

Accordingly, in this embodiment of the present invention, the first connector 1015 may be adapted to couple to either the seatbelt 914a or the first belt connector 918a such that, in use, the restraint portion 1005 has the first distance 1030a or 1030b from the default position of the seatbelt 914a or the default position of the first belt connector 918a, respectively. Likewise, the seventh connector 1070 may be adapted to couple the second belt connector 917a (as shown in FIG. 13) such that, in use, the restraint portion 1005 has the second distance 1035 from the free end 1025c of the seventh connector 1070. In this way, the seatbelt harness 1000(12) may be configured and arranged such that the second distance 1035 determines the maximum increase allowable to the first distance 1030a or 1030b, i.e., the second distance 1035 controls how much the first distance 1030a or 1030b can be at the most.

Figure 26:
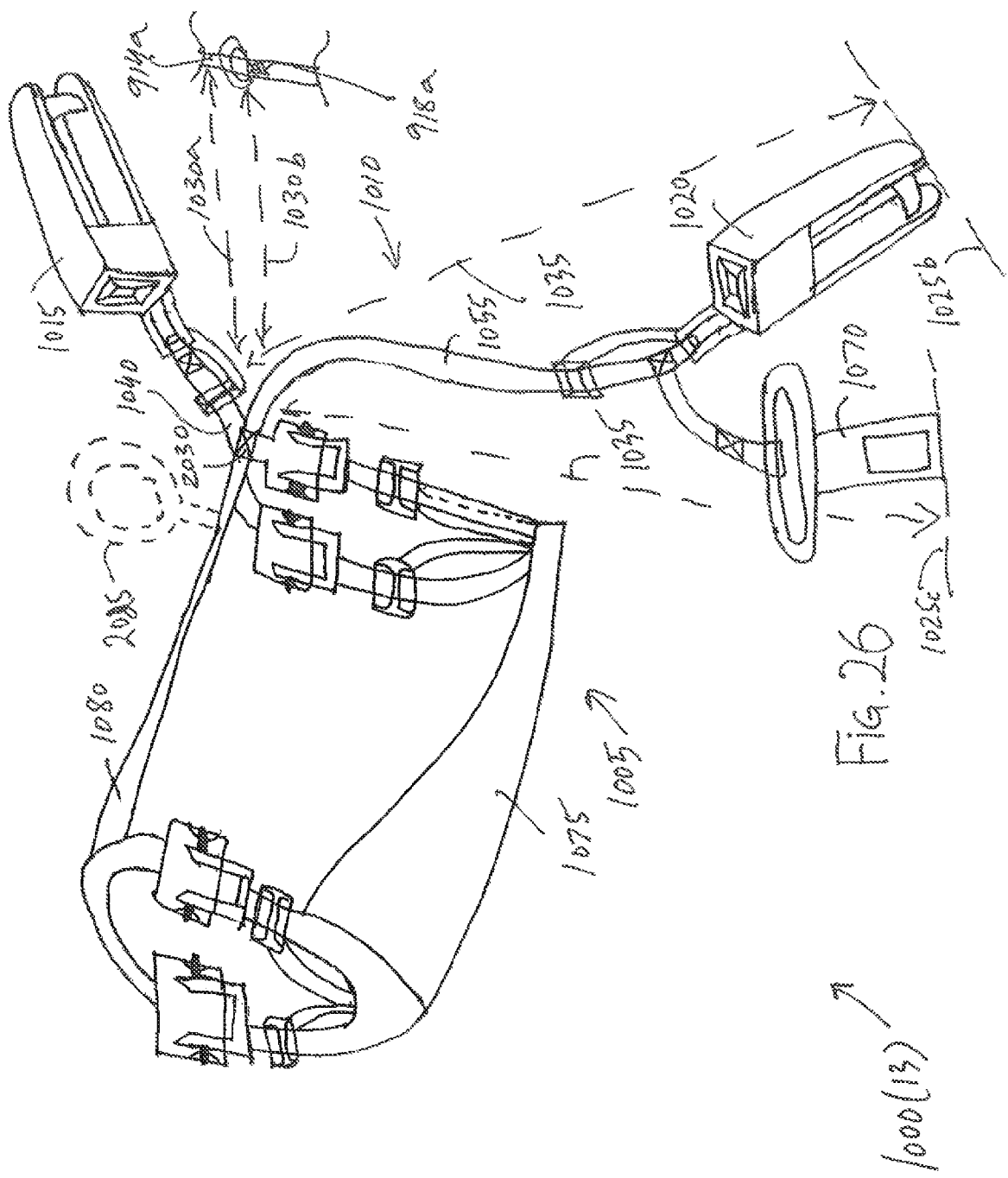

Referring to FIG. 26, a schematic view is shown of a seatbelt harness 1000(13) according to another embodiment of the present invention. Since this embodiment is a combination of three different embodiments depicted in FIGS. 13, 15 and 21, the reader is directed to description of these Figures for pertinent details for the purposes of brevity.

Figure 27:
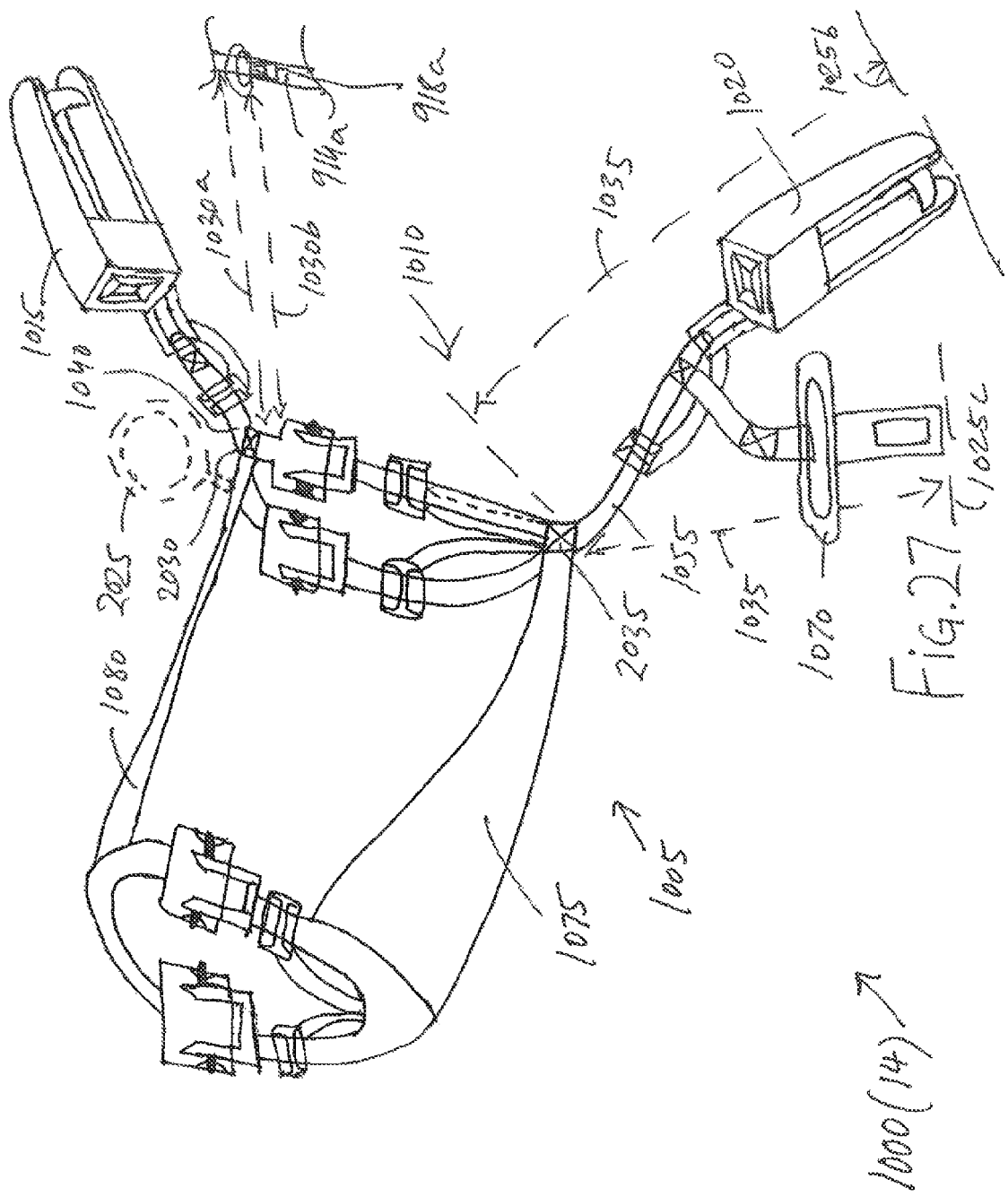

Referring to FIG. 27, a schematic view is shown of a seatbelt harness 1000(14) according to another embodiment of the present invention. Since this embodiment is a combination of three different embodiments depicted in FIGS. 13, 16 and 22, the reader is directed to description of these Figures for pertinent details for the purposes of brevity.

Figure 28:
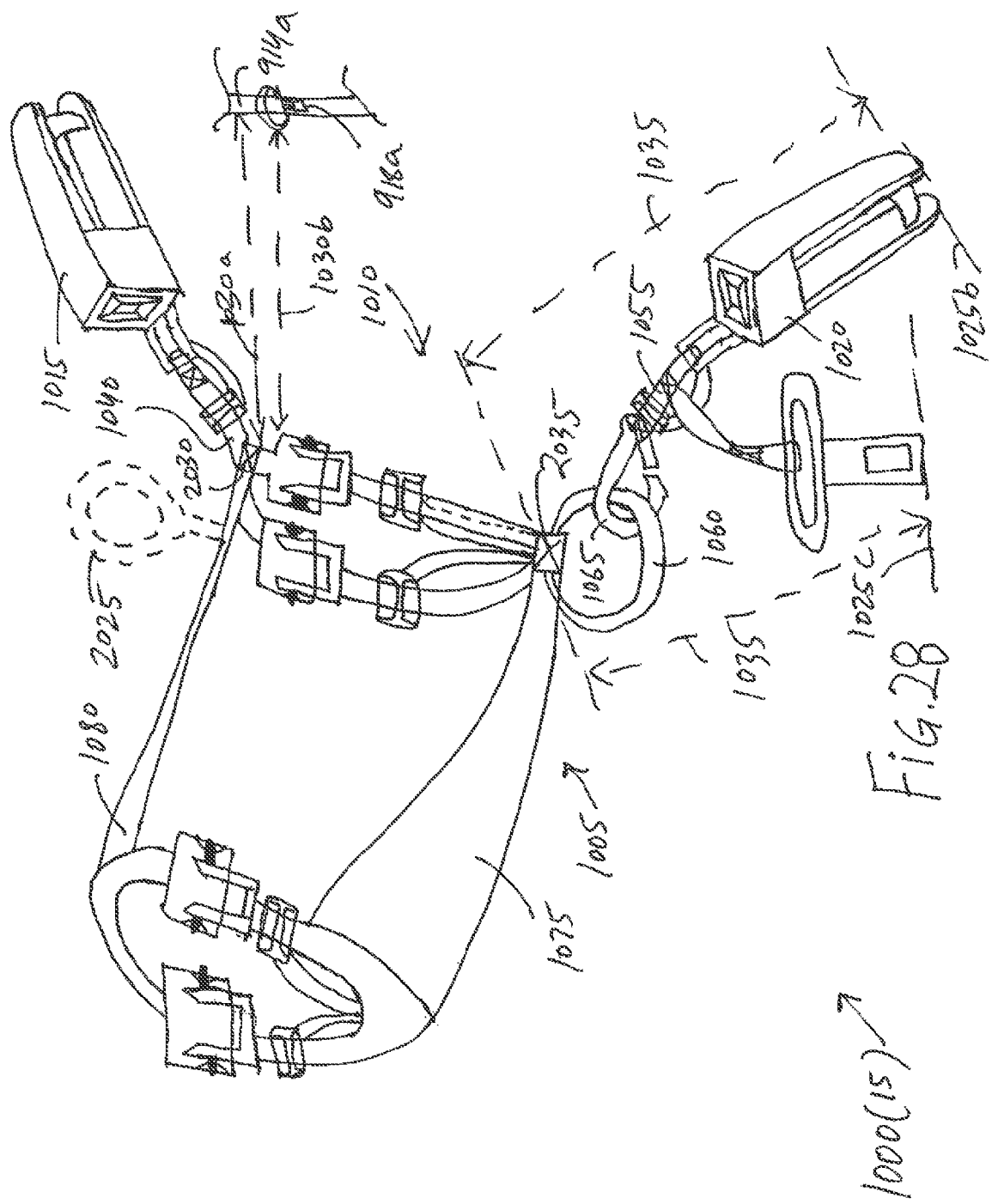

Referring to FIG. 28, a schematic view is shown of a seatbelt harness 1000(15) according to another embodiment of the present invention. Since this embodiment is a combination of three different embodiments depicted in FIGS. 13, 17 and 23, the reader is directed to description of these Figures for pertinent details for the purposes of brevity.

Figure 29:
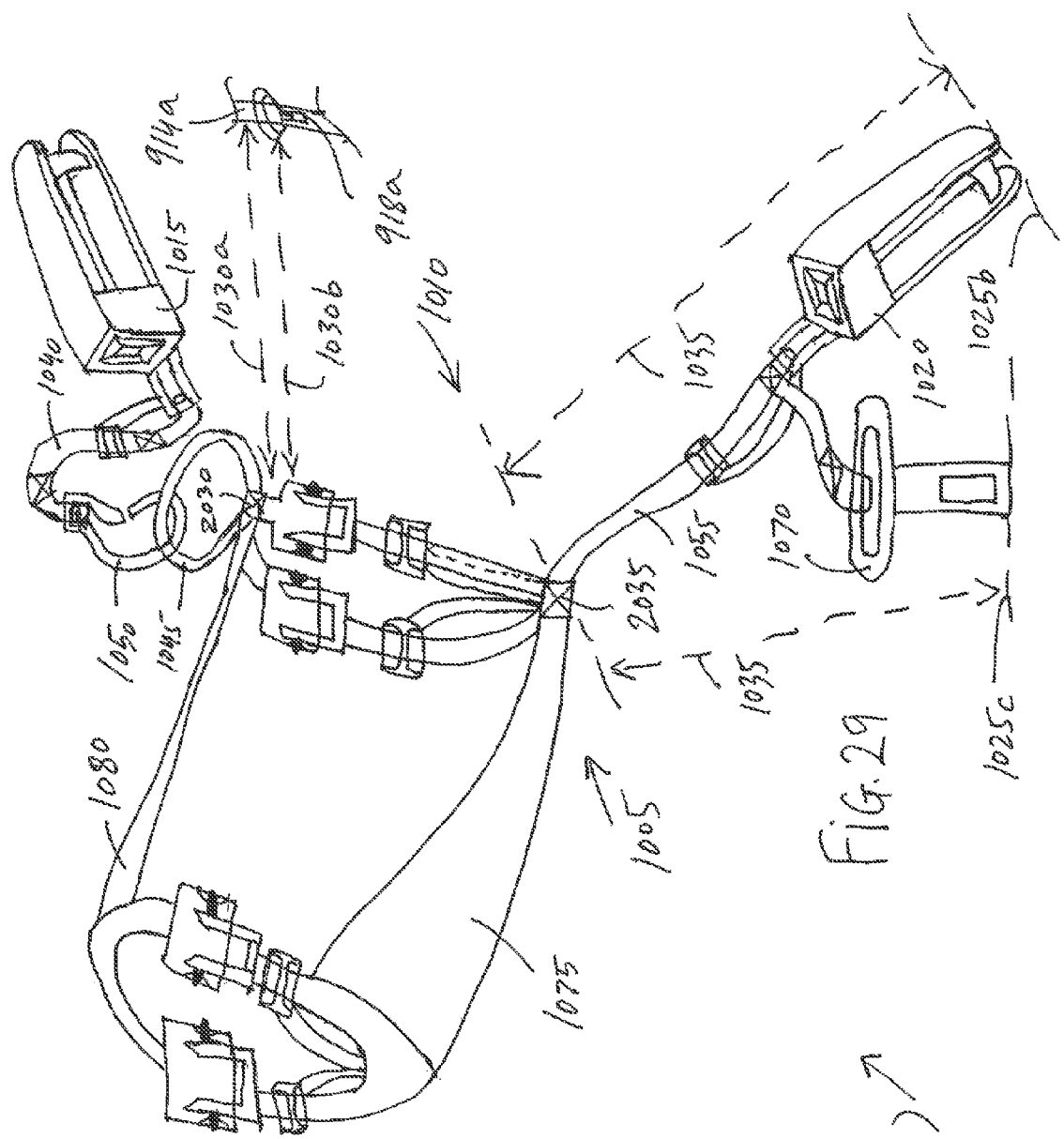

Referring to FIG. 29, a schematic view is shown of a seatbelt harness 1000(16) according to another embodiment of the present invention. Since this embodiment is a combination of three different embodiments depicted in FIGS. 13, 18 and 24, the reader is directed to description of these Figures for pertinent details for the purposes of brevity.

Figure 30:
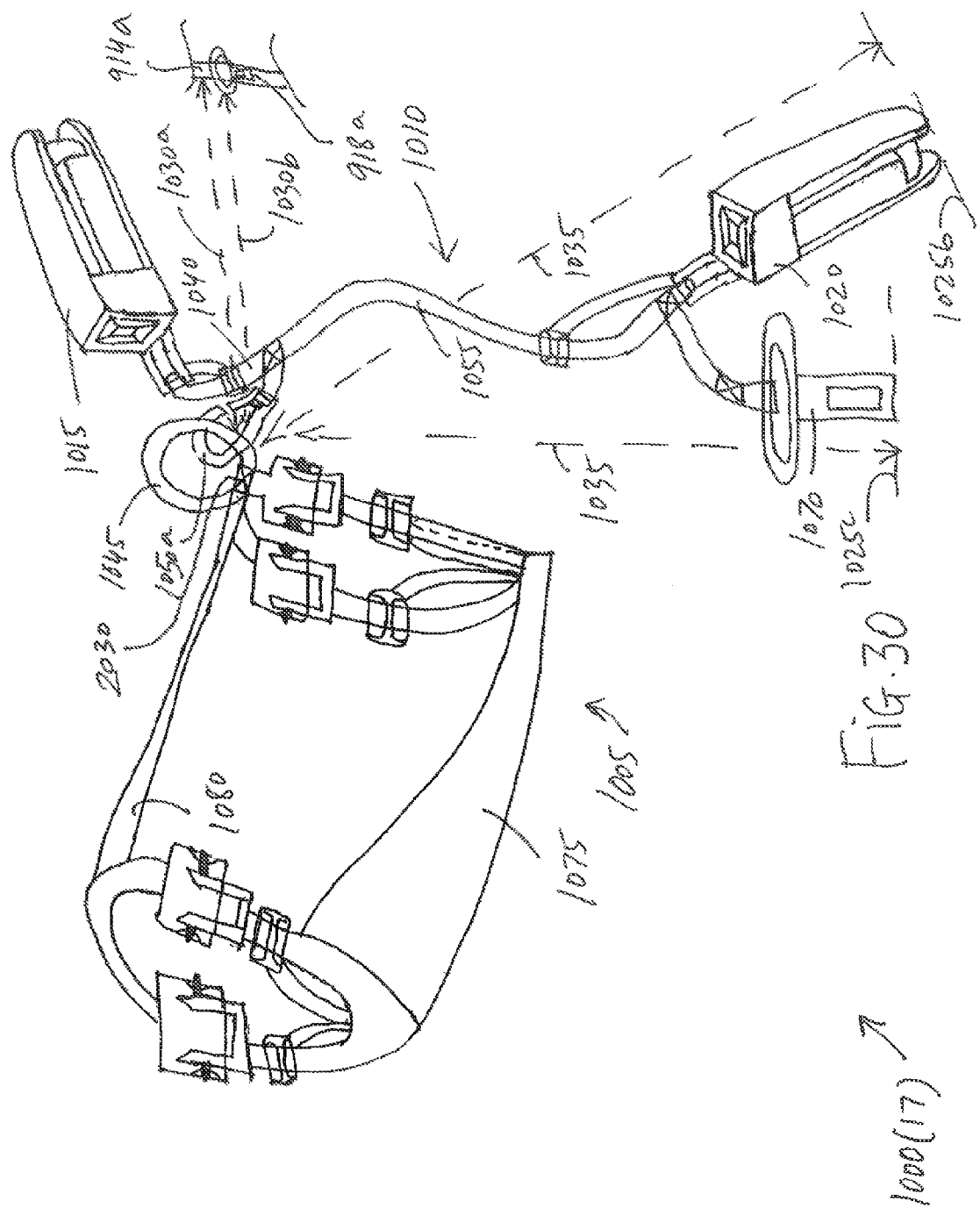

Referring to FIG. 30, a schematic view is shown of a seatbelt harness 1000(17) according to another embodiment of the present invention. Since this embodiment is a combination of three different embodiments depicted in FIGS. 13, 19 and 25, the reader is directed to description of these Figures for pertinent details for the purposes of brevity.

Figure 31:
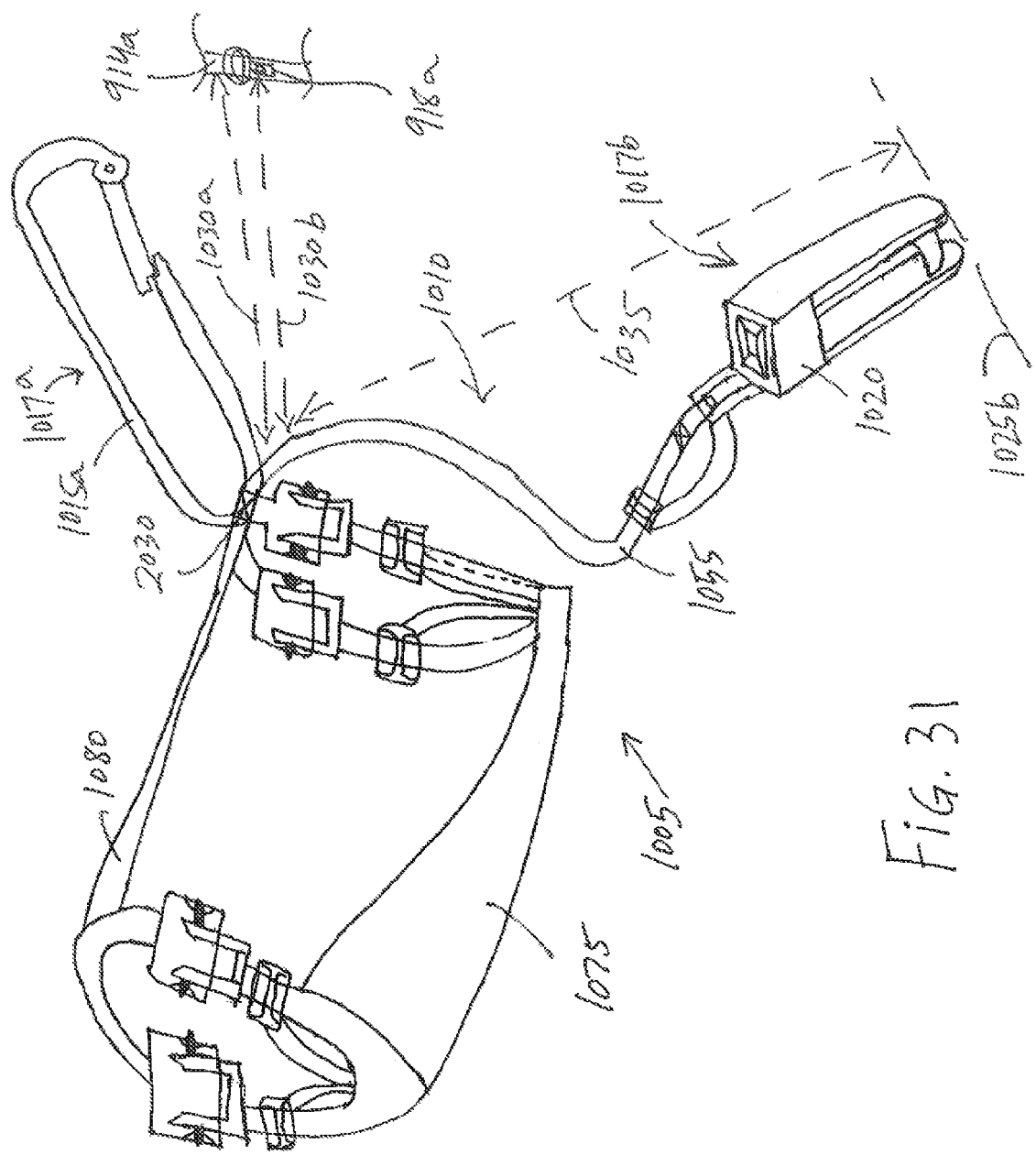

Referring to FIG. 31, a schematic view is shown of a seatbelt harness 1000(18) according to another embodiment of the present invention. A first connector 1015a of the attachment portion 1010 may be coupled to the restraint portion 1005, e.g., fixedly attached to the second vest portion 1080 at the point 2030. Likewise, the second harness 1055 may be coupled to the restraint portion 1005, e.g., fixedly attached to the second vest portion 1080 at the point 2030. In other embodiments, the first connector 1015a and the second harness 1055 can be fixedly attached to the restraint portion 1005, e.g., the second vest portion 1080 at two different points, respectively.

In this embodiment, the connector 1015a may be configured and arranged at the first predetermined position 1017a and the second connector 1020 may be configured and arranged at the second predetermined position 1017b relative to the first determined position 1017a. For example, the first and second predetermined positions 1017a, 1017b may be selected for aligning the connector 1015a and second connector 1020 with the restraint portion 1005 such that the attachment portion 1010 to act in conjunction with the restraint portion 1005 to enable positioning of the given pet on the vehicle seat at the desired intermediate point 1022 (not shown, see FIG. 13) along the longitudinal path 1027 (not shown, see FIG. 13) between the first belt connector 918a and the second belt connector 917a or between the first belt connector 918a and the anchor 920a.

Accordingly, in this embodiment of the present invention, the first connector 1015a may be adapted to couple to either the seatbelt 914a or the first belt connector 918a such that, in use, the restraint portion 1005 has the first distance 1030a or 1030b from the default position of the seatbelt 914a or the default position of the first belt connector 918a, respectively. Likewise, the second connector 1020 may be adapted to couple either the second belt connector 917a or the anchor 920a (as shown in FIG. 13) such that, in use, the restraint portion 1005 has the second distance 1035 from the free end 1025b of the second connector 1020. In this way, the seatbelt harness 1000(18) may be configured and arranged such that the second distance 1035 determines the maximum increase allowable to the first distance 1030a or 1030b, i.e., the second distance 1035 controls how much the first distance 1030a or 1030b can be at the most.

Figure 32:
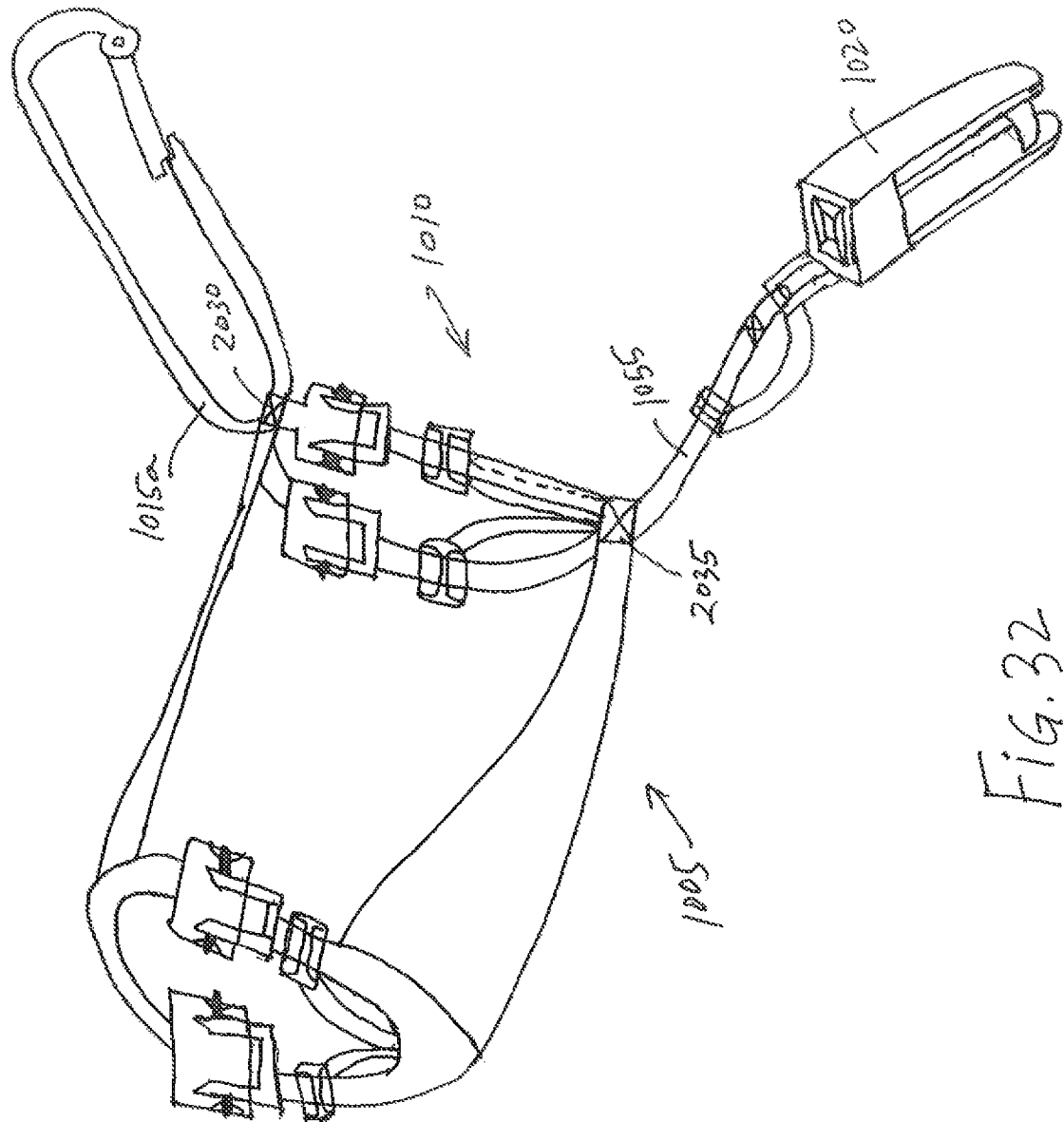
Figure 33:
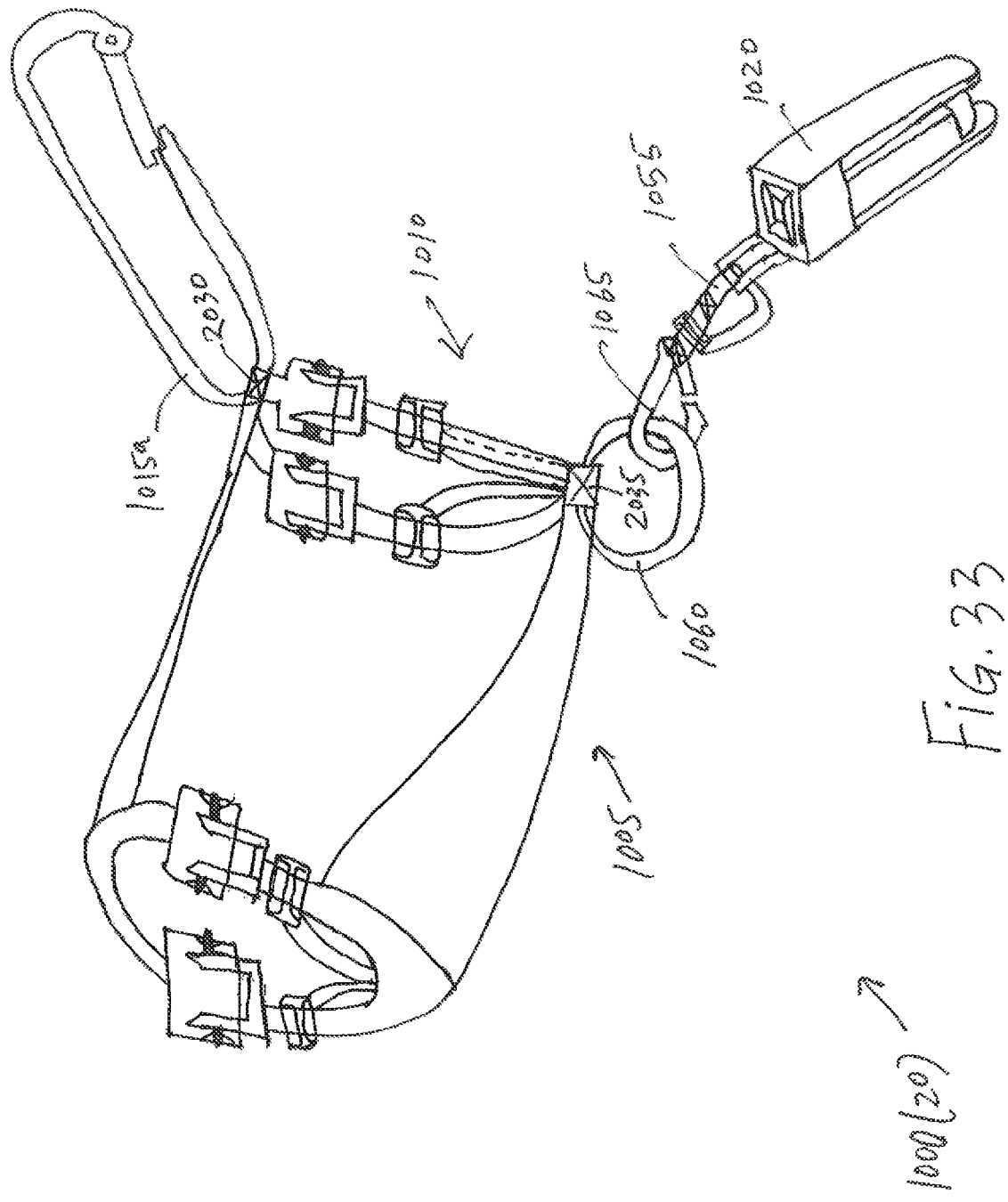
Figure 34:
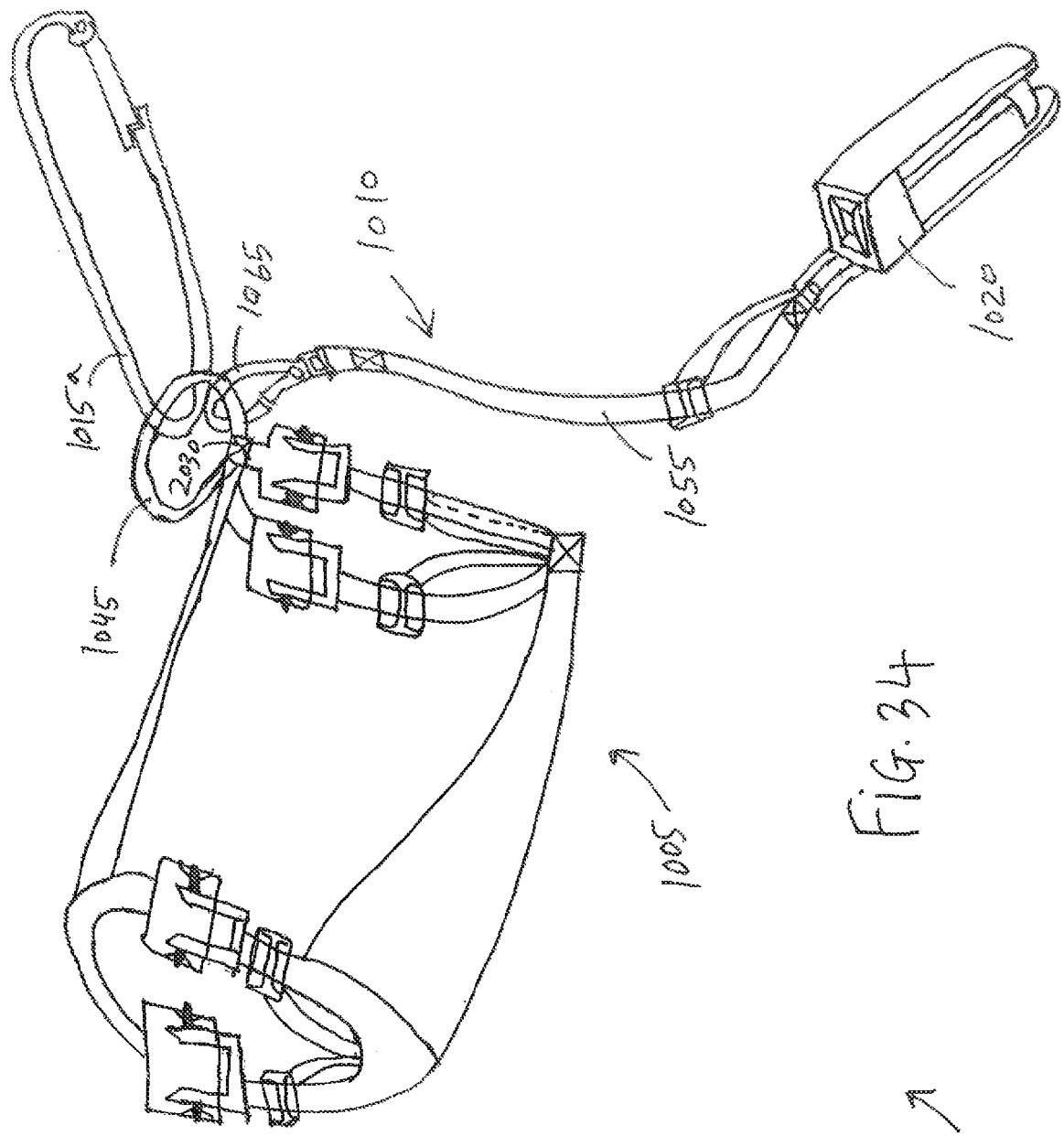
Figure 35:
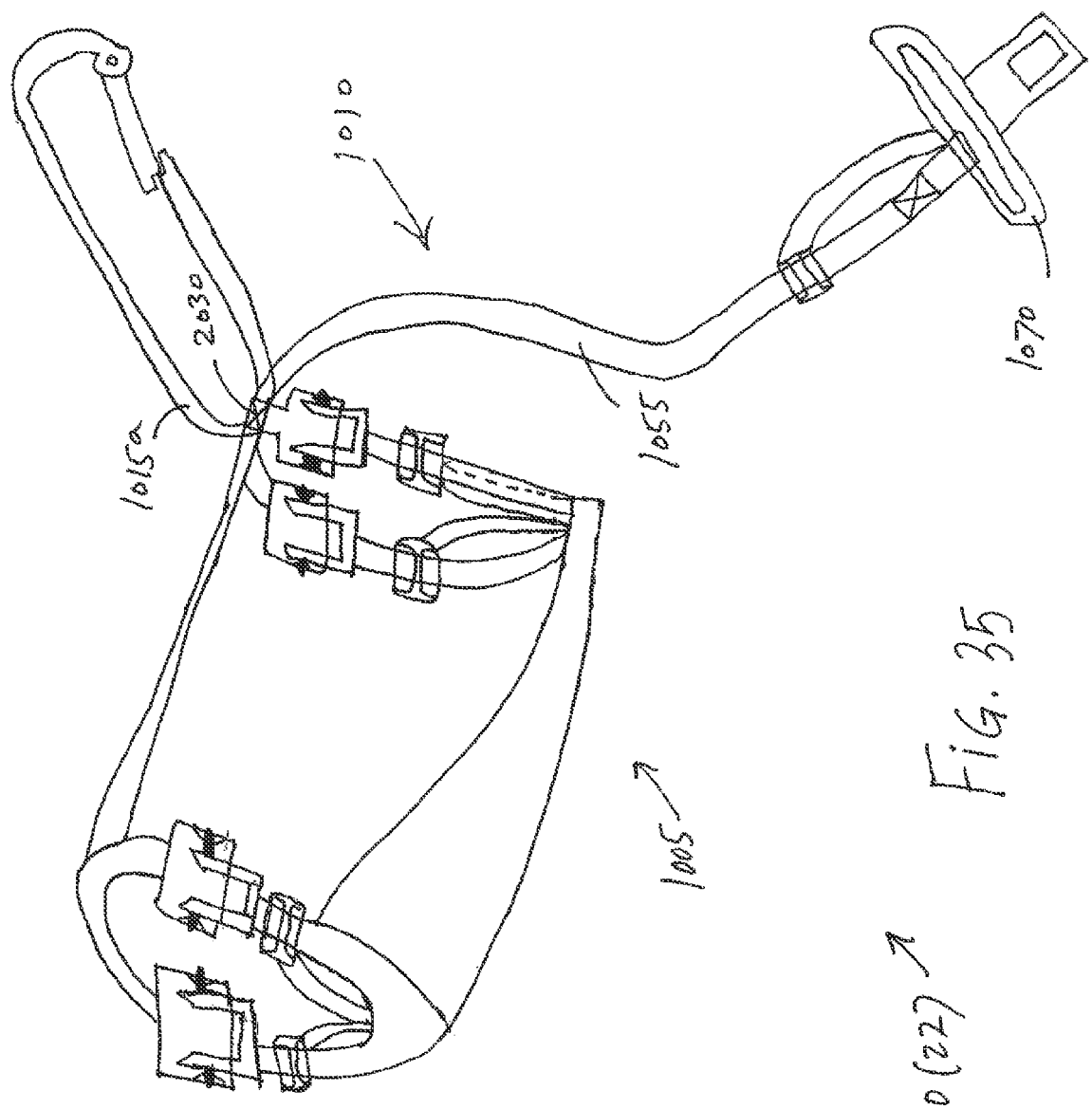
Figure 36:
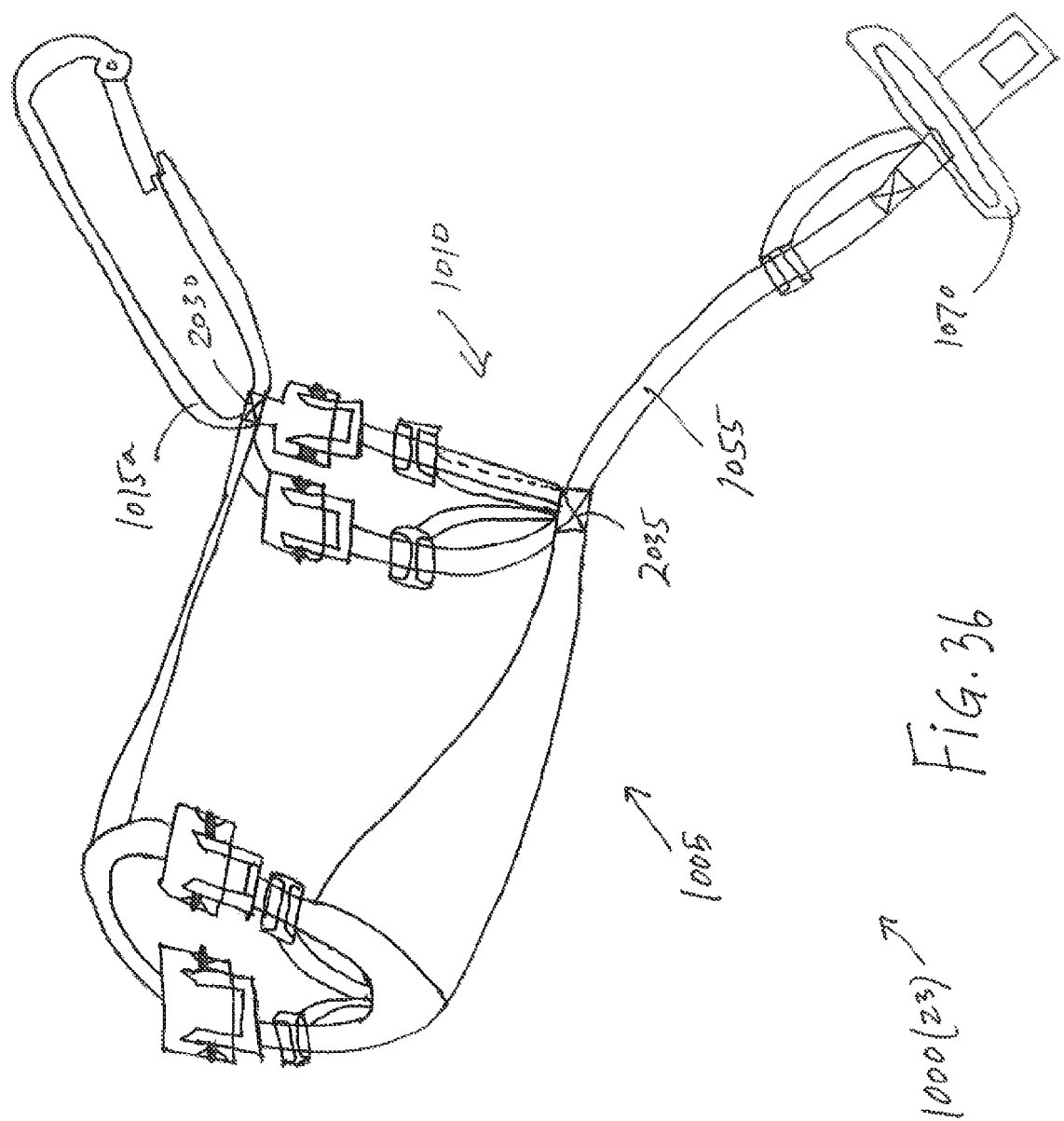
Figure 37:
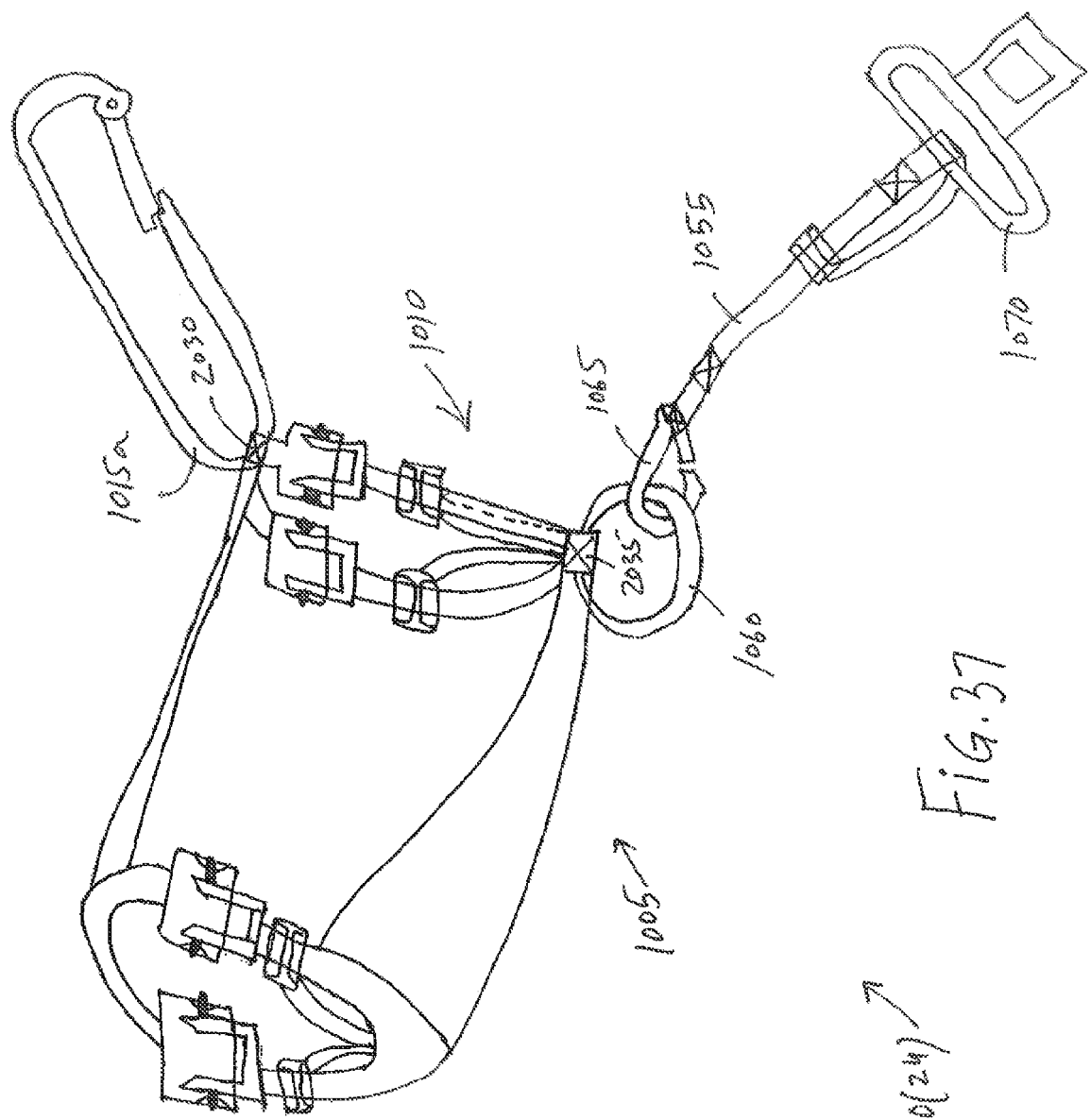

Referring to FIG. 32, a schematic view is shown of a seatbelt harness 1000(19) according to another embodiment of the present invention. Since this embodiment is similar to three different embodiments depicted in FIGS. 13, 16 and 31, the reader is directed to description of these Figures for pertinent details for the purposes of brevity. Referring to FIG. 33, a schematic view is shown of a seatbelt harness 1000(20) according to another embodiment of the present invention. Since this embodiment is similar to three different embodiments depicted in FIGS. 13, 17 and 31, the reader is directed to description of these Figures for pertinent details for the purposes of brevity. Referring to FIG. 34, a schematic view is shown of a seatbelt harness 1000(21) according to another embodiment of the present invention. Since this embodiment is similar to three different embodiments depicted in FIGS. 13, 19 and 31, the reader is directed to description of these Figures for pertinent details for the purposes of brevity. Referring to FIG. 35, a schematic view is shown of a seatbelt harness 1000(22) according to another embodiment of the present invention. Since this embodiment is similar to three different embodiments depicted in FIGS. 13, 21 and 31, the reader is directed to description of these Figures for pertinent details for the purposes of brevity. Referring to FIG. 36, a schematic view is shown of a seatbelt harness 1000(23) according to another embodiment of the present invention. Since this embodiment is similar to three different embodiments depicted in FIGS. 13, 22 and 31, the reader is directed to description of these Figures for pertinent details for the purposes of brevity. Referring to FIG. 37, a schematic view is shown of a seatbelt harness 1000(24) according to another embodiment of the present invention. Since this embodiment is similar to three different embodiments depicted in FIGS. 13, 23 and 31, the reader is directed to description of these Figures for pertinent details for the purposes of brevity.

Figure 38:
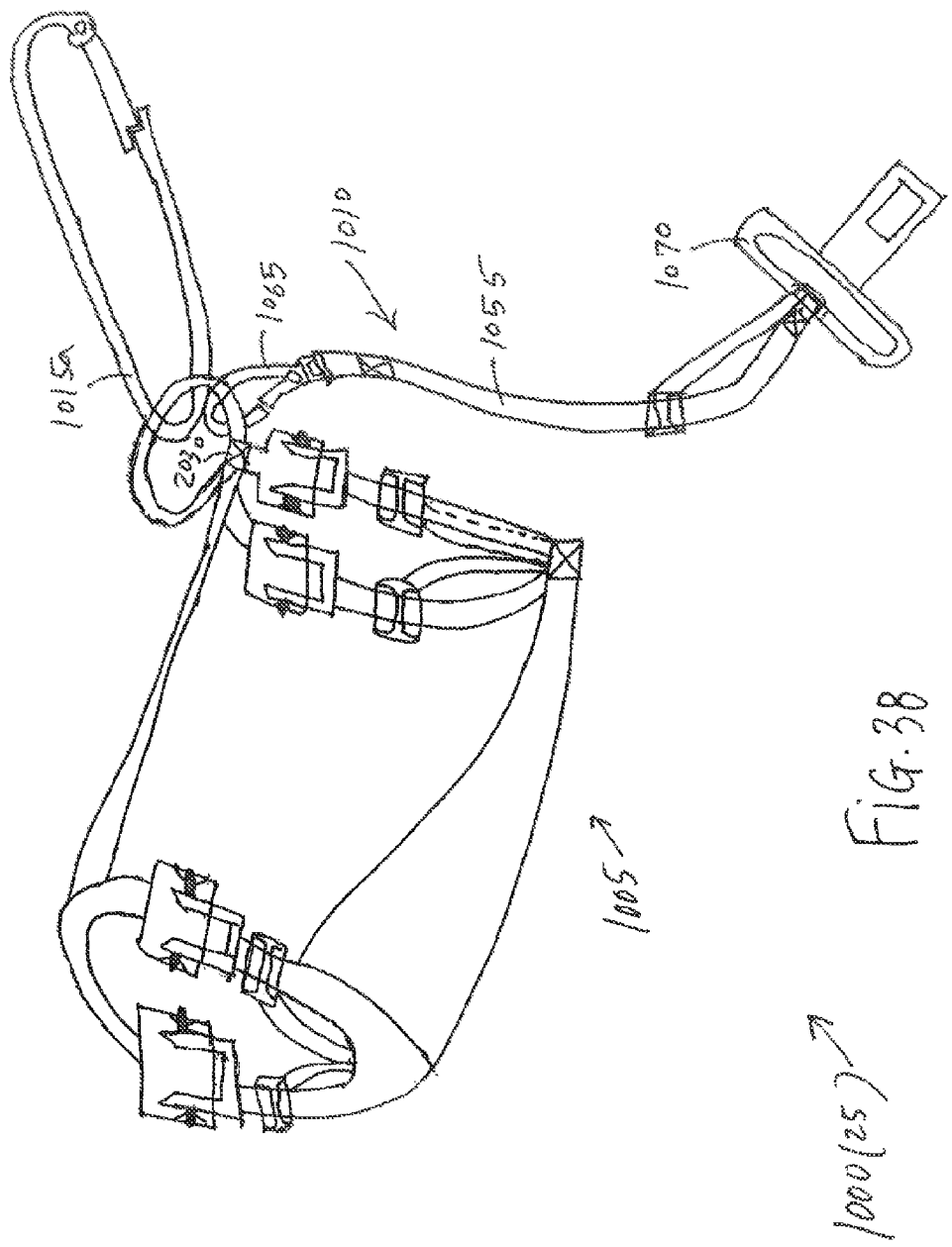
Figure 39:
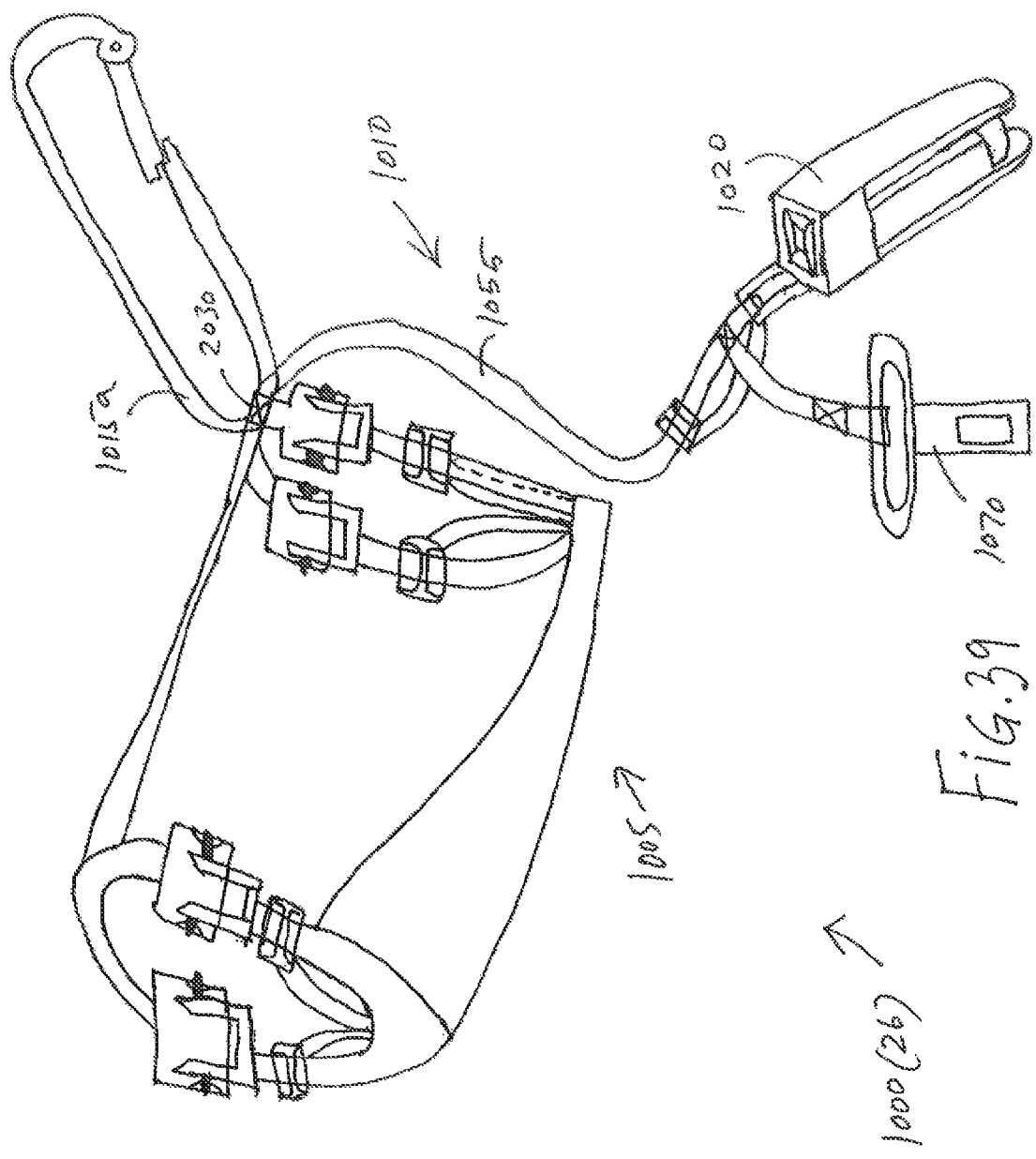
Figure 40:
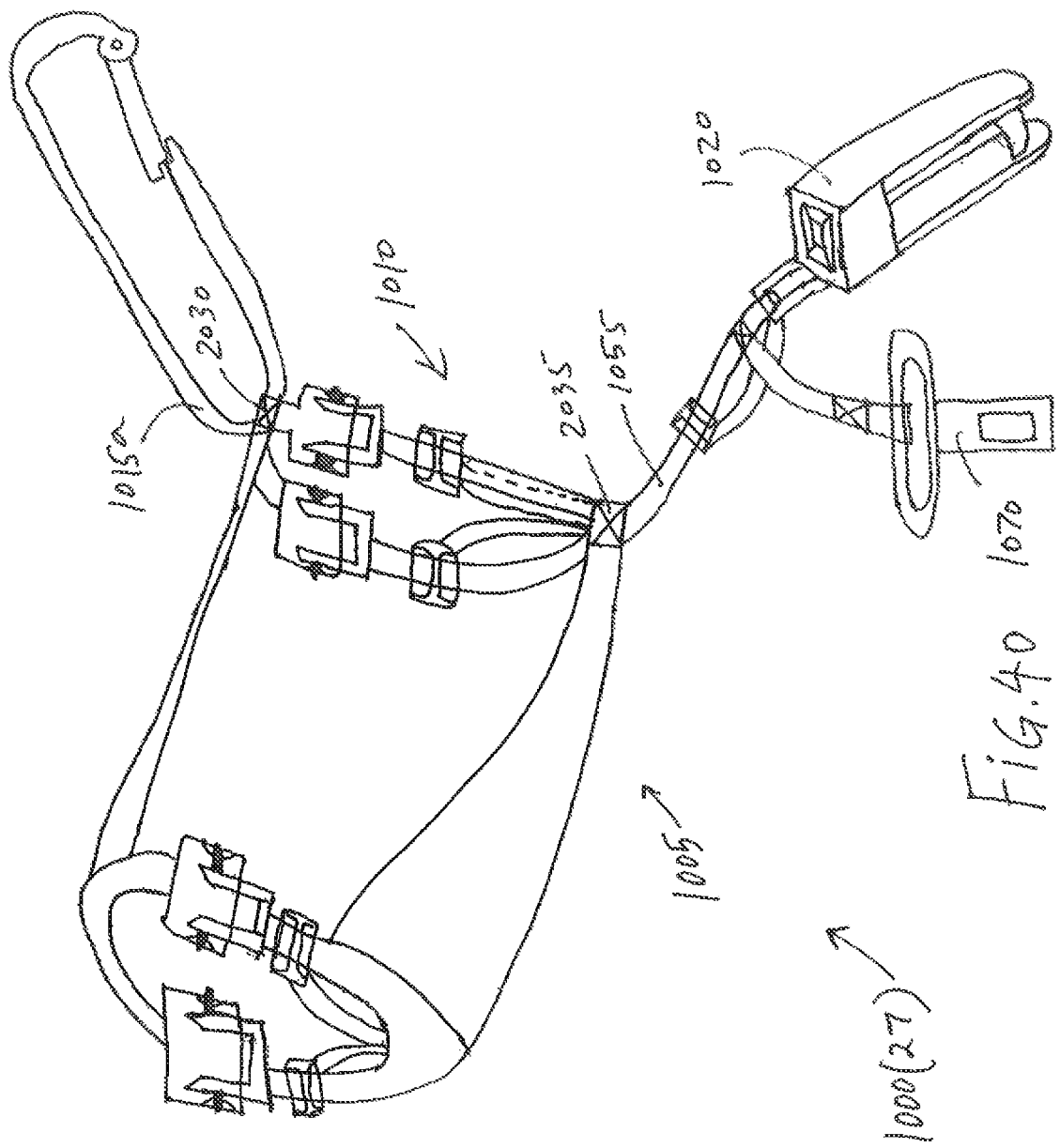
Figure 41:
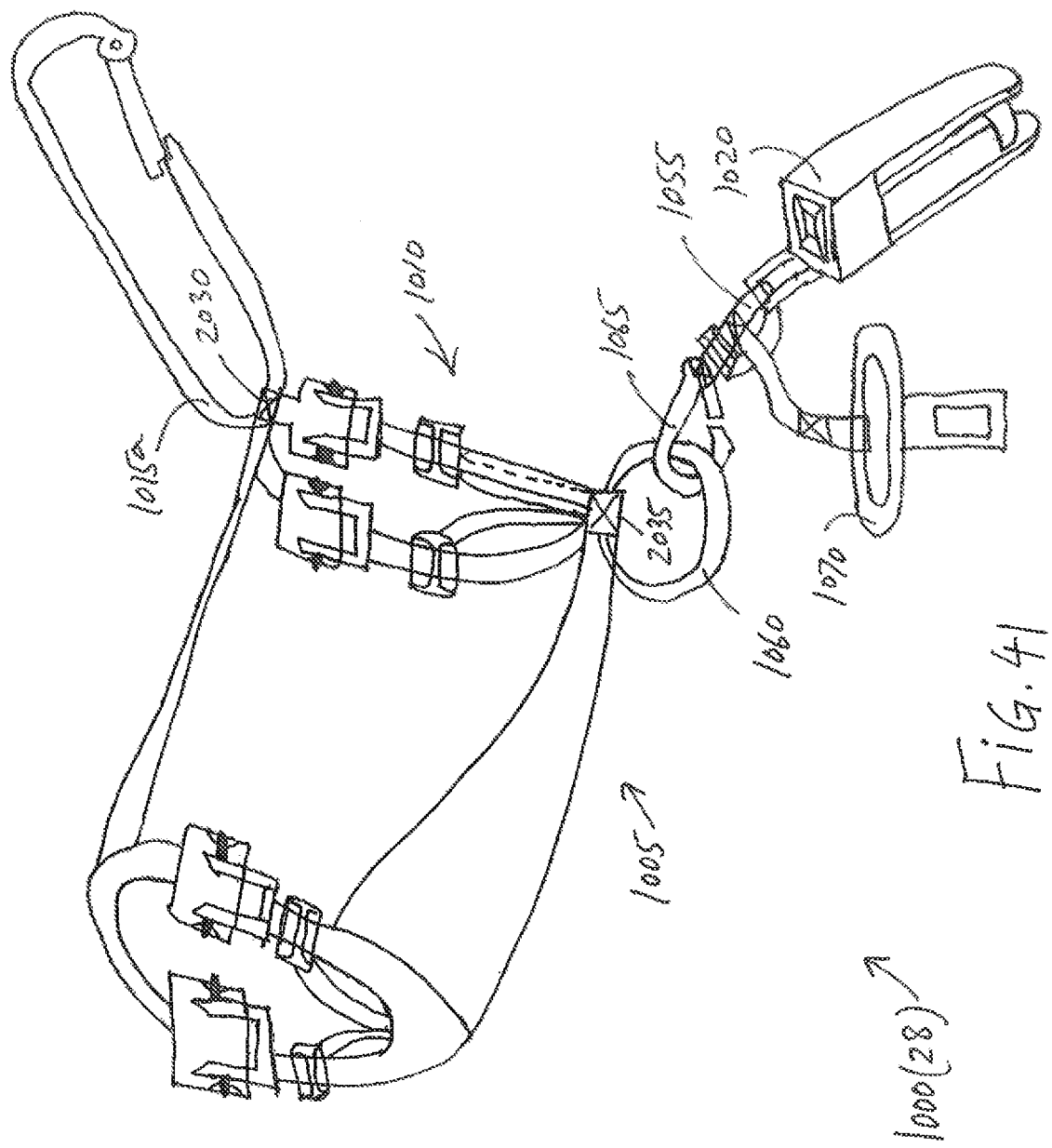
Figure 42:
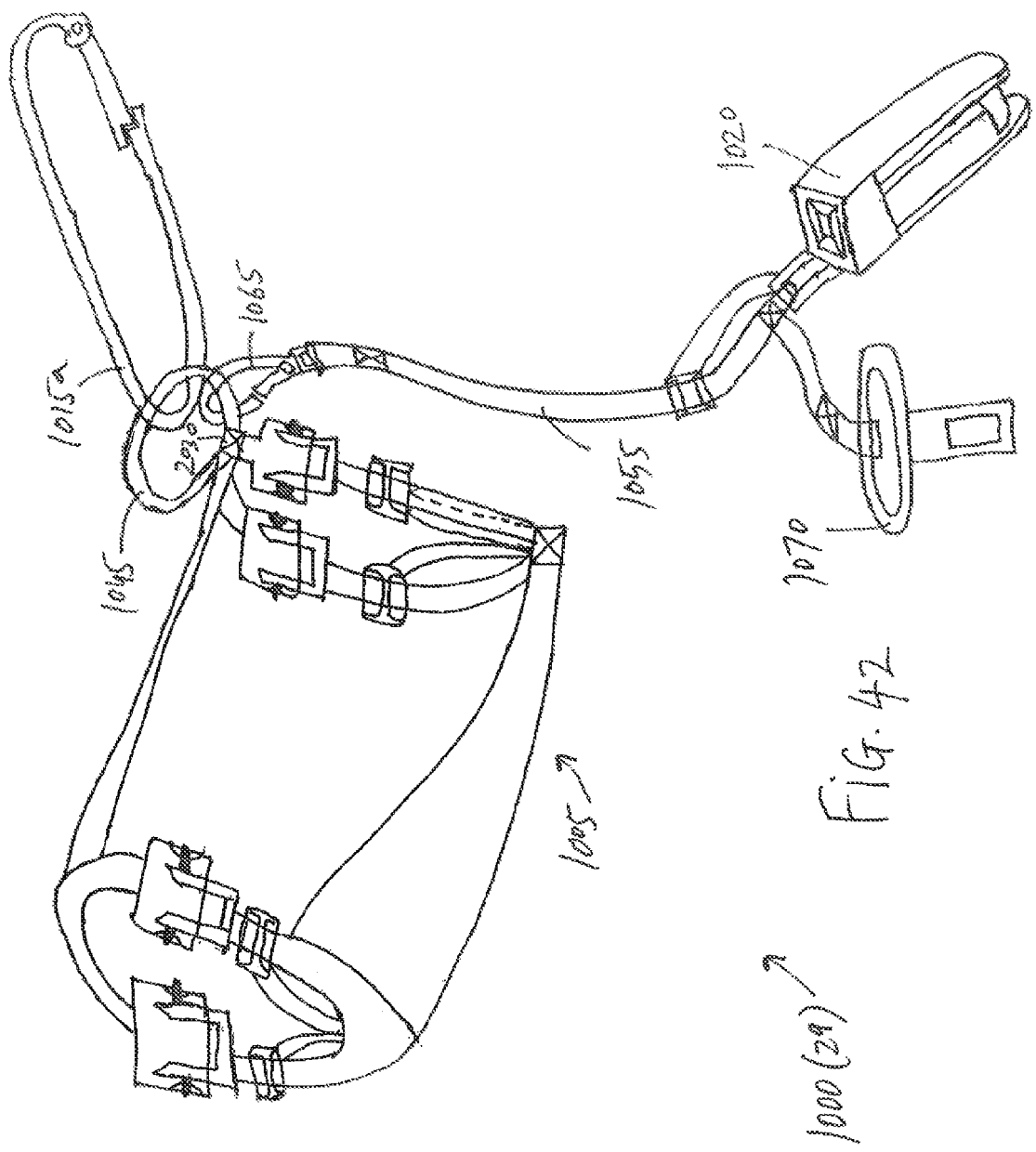

Referring to FIG. 38, a schematic view is shown of a seatbelt harness 1000(25) according to another embodiment of the present invention. Since this embodiment is similar to three different embodiments depicted in FIGS. 13, 25 and 31, the reader is directed to description of these Figures for pertinent details for the purposes of brevity. Referring to FIG. 39, a schematic view is shown of a seatbelt harness 1000(26) according to another embodiment of the present invention. Since this embodiment is similar to three different embodiments depicted in FIGS. 13, 26 and 31, the reader is directed to description of these Figures for pertinent details for the purposes of brevity. Referring to FIG. 40, a schematic view is shown of a seatbelt harness 1000(27) according to another embodiment of the present invention. Since this embodiment is similar to three different embodiments depicted in FIGS. 13, 27 and 31, the reader is directed to description of these Figures for pertinent details for the purposes of brevity. Referring to FIG. 41, a schematic view is shown of a seatbelt harness 1000(28) according to another embodiment of the present invention. Since this embodiment is similar to three different embodiments depicted in FIGS. 13, 28 and 31, the reader is directed to description of these Figures for pertinent details for the purposes of brevity. Referring to FIG. 42, a schematic view is shown of a seatbelt harness 1000(29) according to another embodiment of the present invention. Since this embodiment is similar to three different embodiments depicted in FIGS. 13, 30 and 31, the reader is directed to description of these Figures for pertinent details for the purposes of brevity.

Figure 43:
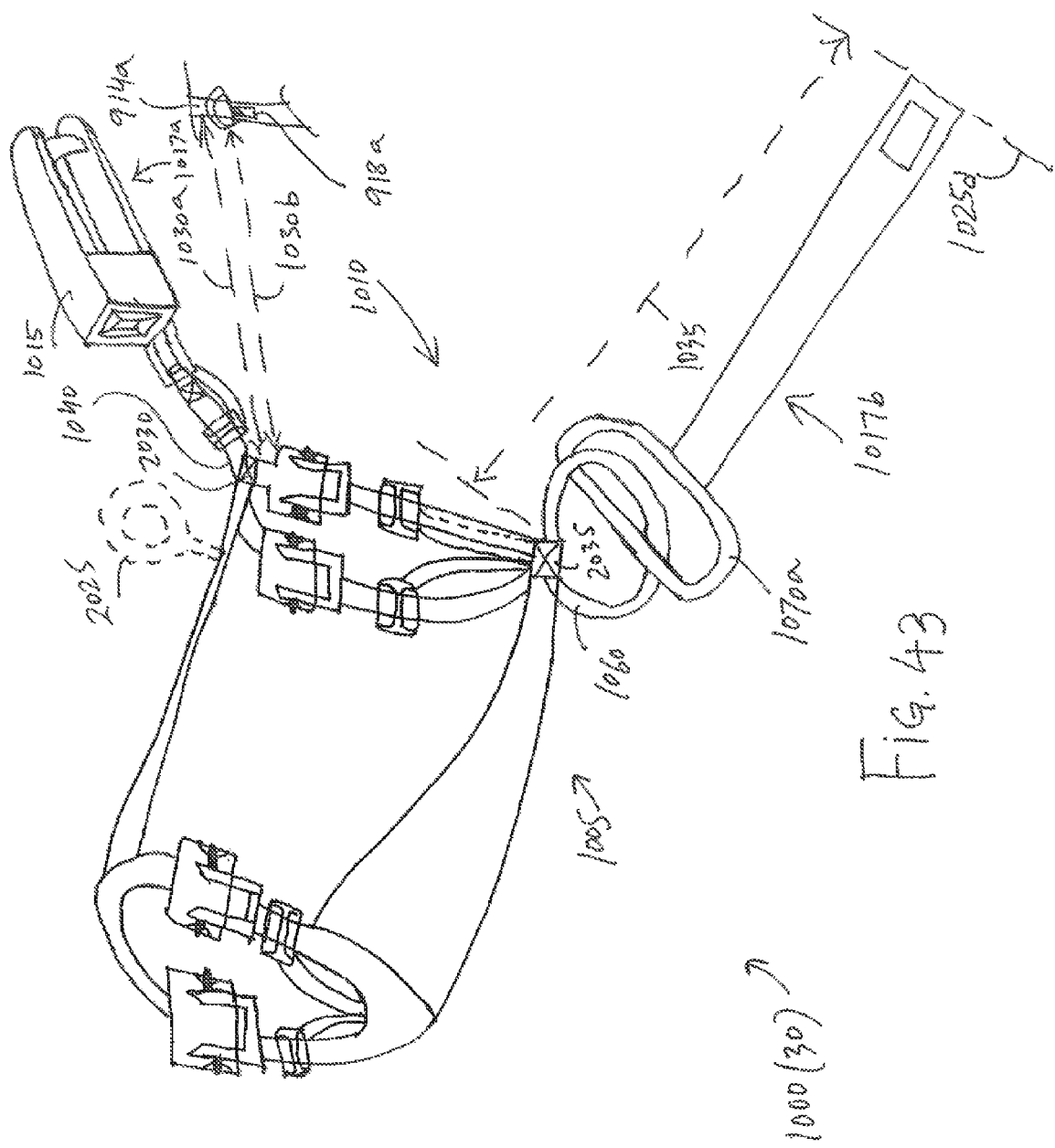

Referring to FIG. 43, a schematic view is shown of a seatbelt harness 1000(30) according to another embodiment of the present invention. Consistent with this embodiment of the present invention, the restraint portion 1005 of the seatbelt harness 1000(30) may further include the filth connector 1060 attached at the point 2035 on the first vest portion 1075. Optionally, the connector 2025 may be coupled to the restraint portion 1005, e.g., the connector 2025 may be fixedly attached to the second vest portion 1080. The seventh connector 1070a is coupled to the fifth connector 1060 and the connector 1015 is fixedly coupled to the restraint portion 1005 via the first harness 1040.

In this embodiment, the first connector 1015 may be configured and arranged at the first predetermined position 1017a and another seventh connector 1070a may be configured and arranged at the second predetermined position 1017b relative to the first determined position 1017a. For example, the first and second predetermined positions 1017a, 1017b may be selected for aligning the first and seventh connectors 1015, 1070a with the restraint portion 1005 such that the attachment portion 1010 to act in conjunction with the restraint portion 1005 to enable positioning of the given pet on the vehicle seat at the desired intermediate point 1022 (not shown, see FIG. 13) along the longitudinal path 1027 (not shown, see FIG. 13) between the first belt connector 918a and the second belt connector 917a or between the first belt connector 918a and the anchor 920a.

Accordingly, in this embodiment of the present invention, the first connector 1015 may be adapted to couple to either the seatbelt 914a or the first belt connector 918a such that, in use, the restraint portion 1005 has the first distance 1030a or 1030b from the default position of the seatbelt 914a or the default position of the first belt connector 918a, respectively. Likewise, another seventh connector 1070a may be adapted to couple the second belt connector 917a (as shown in FIG. 13) such that, in use, the restraint portion 1005 has the second distance 1035 from a free end 1025d of the seventh connector 1070a. In this way, the seatbelt harness 1000(30) may be configured and arranged such that the second distance 1035 determines the maximum increase allowable to the first distance 1030a or 1030b, i.e., the second distance 1035 controls how much the first distance 1030a or 1030b can be at the most.

Figure 44:
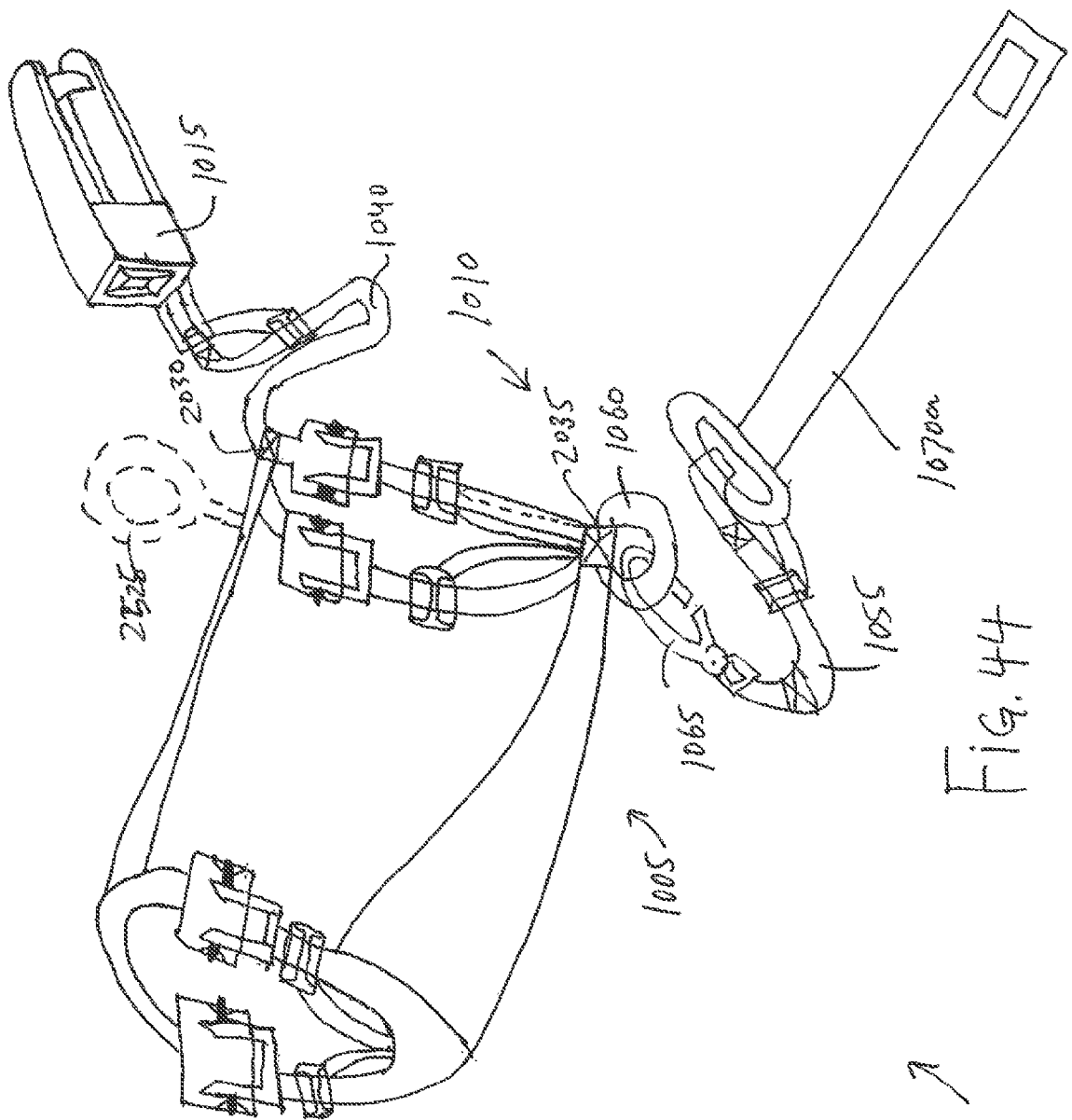
Figure 45:
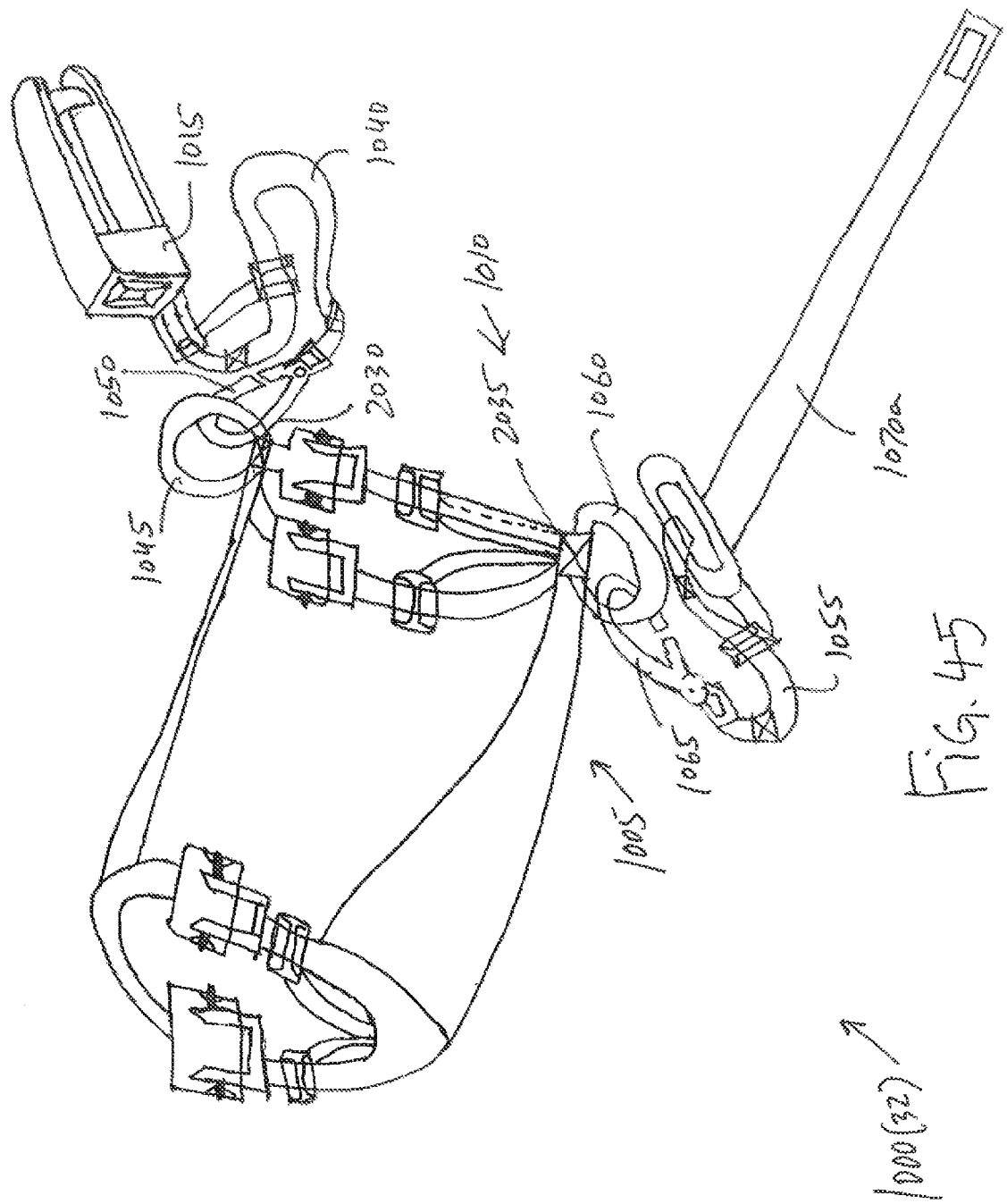
Figure 46:
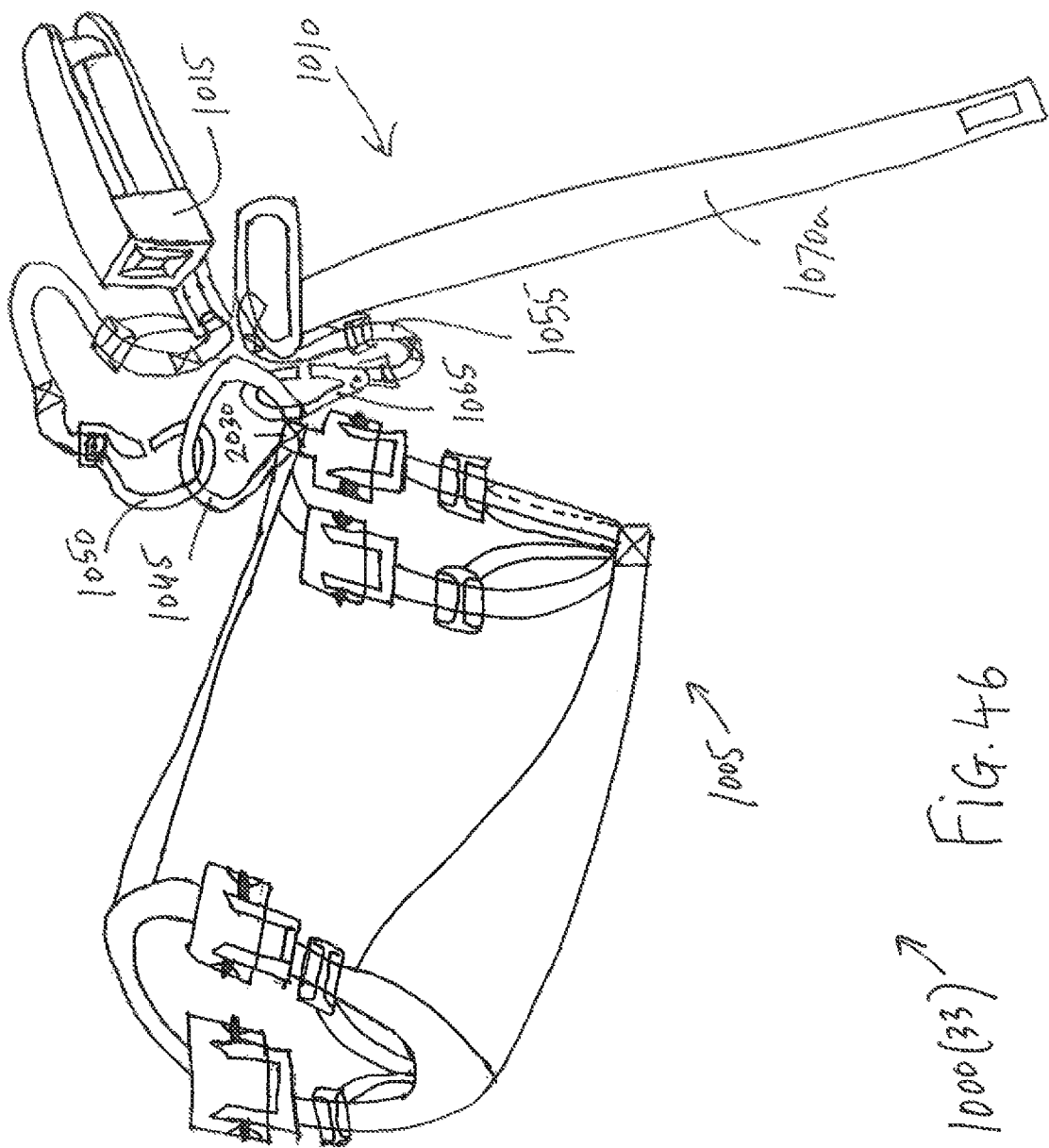
Figure 47:
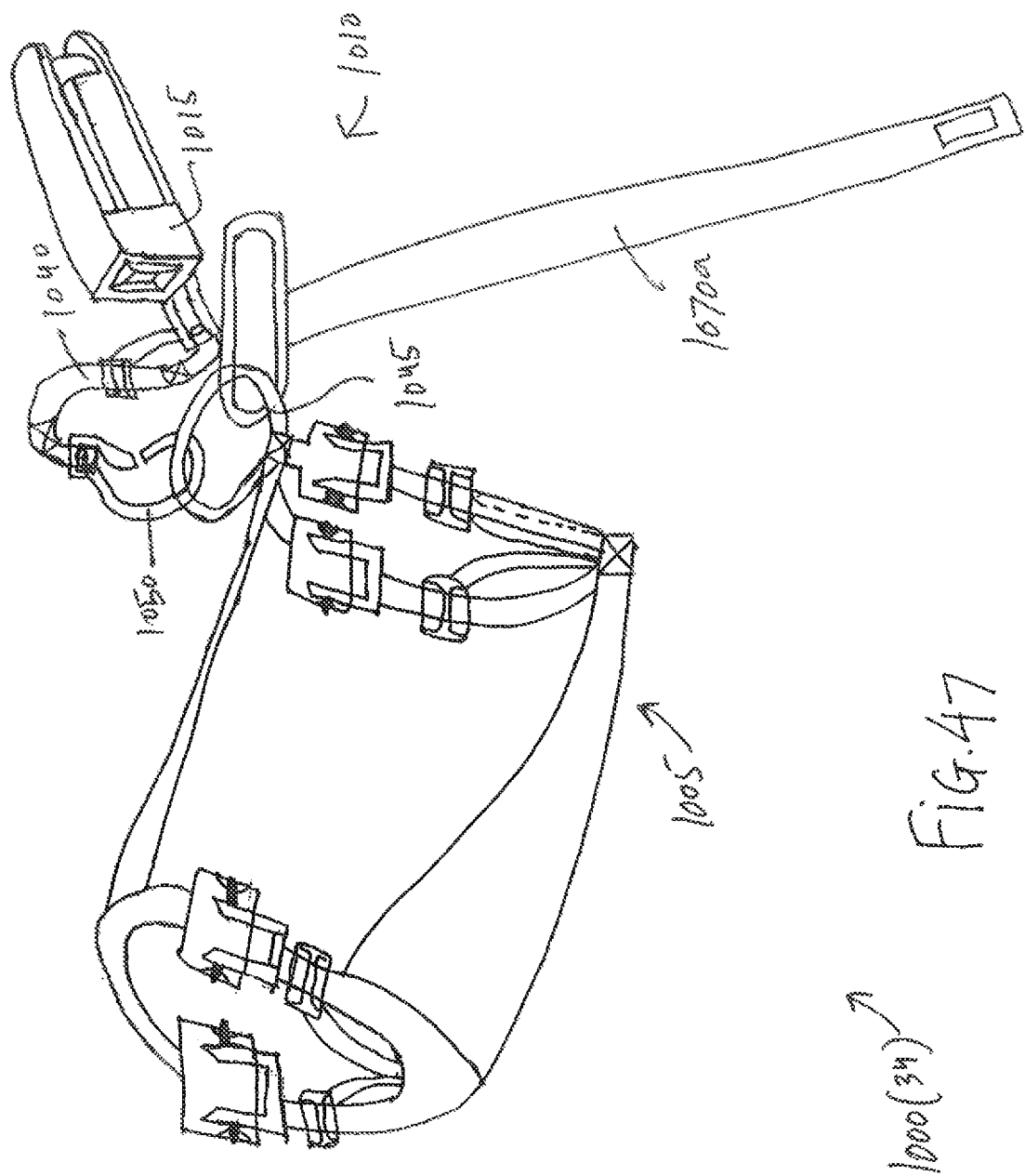
Figure 48:
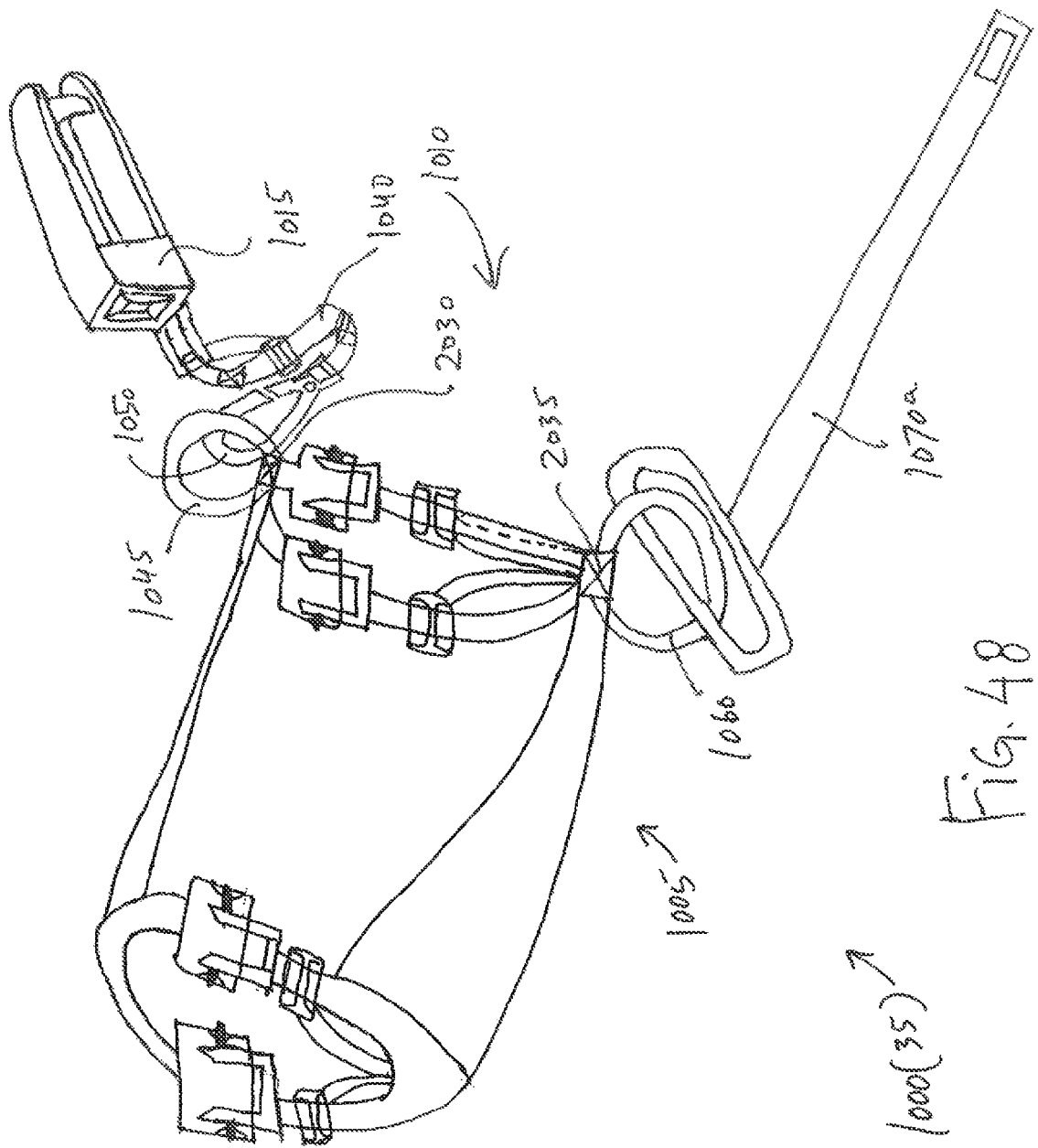
Figure 49:
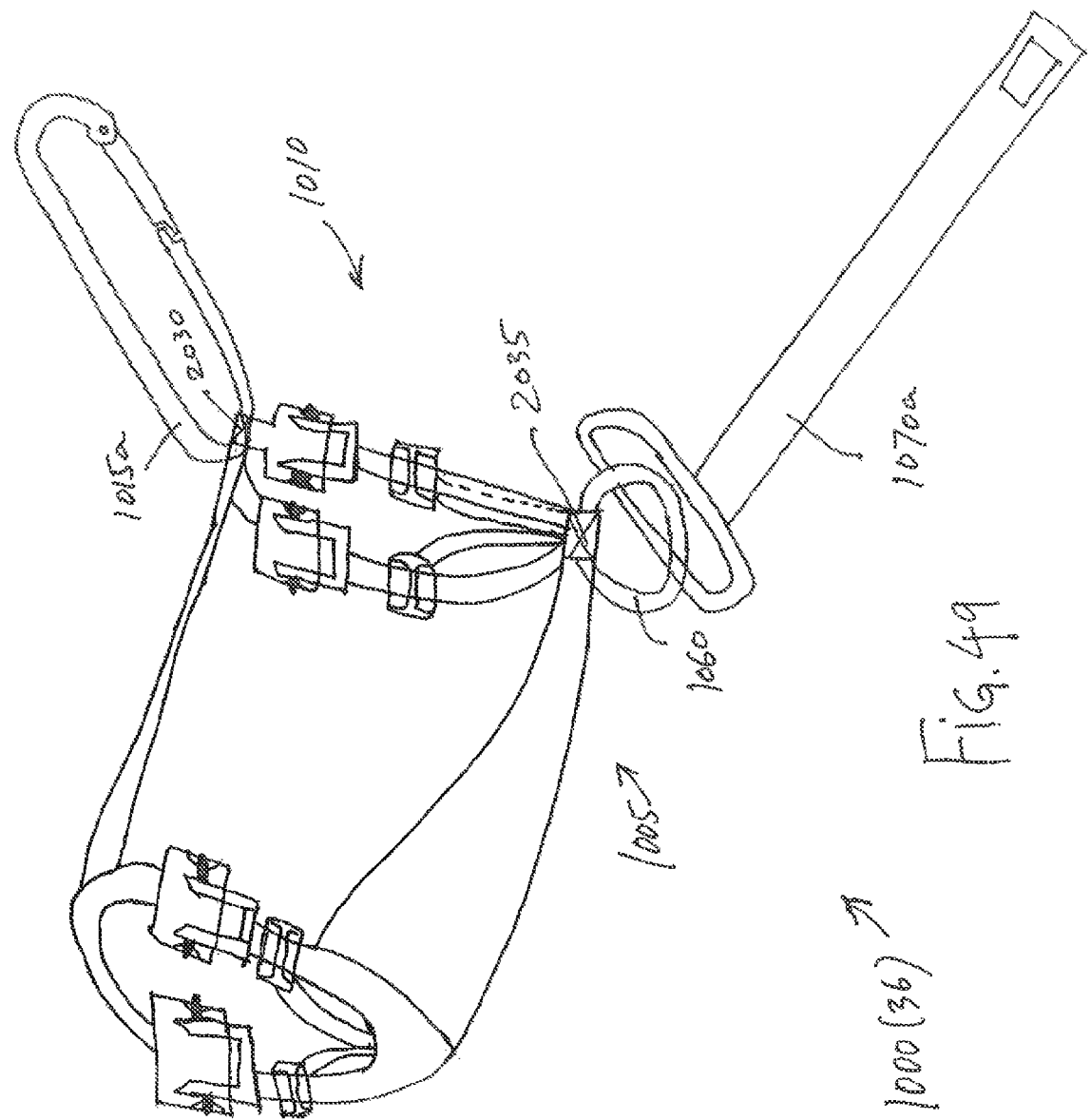
Figure 50:
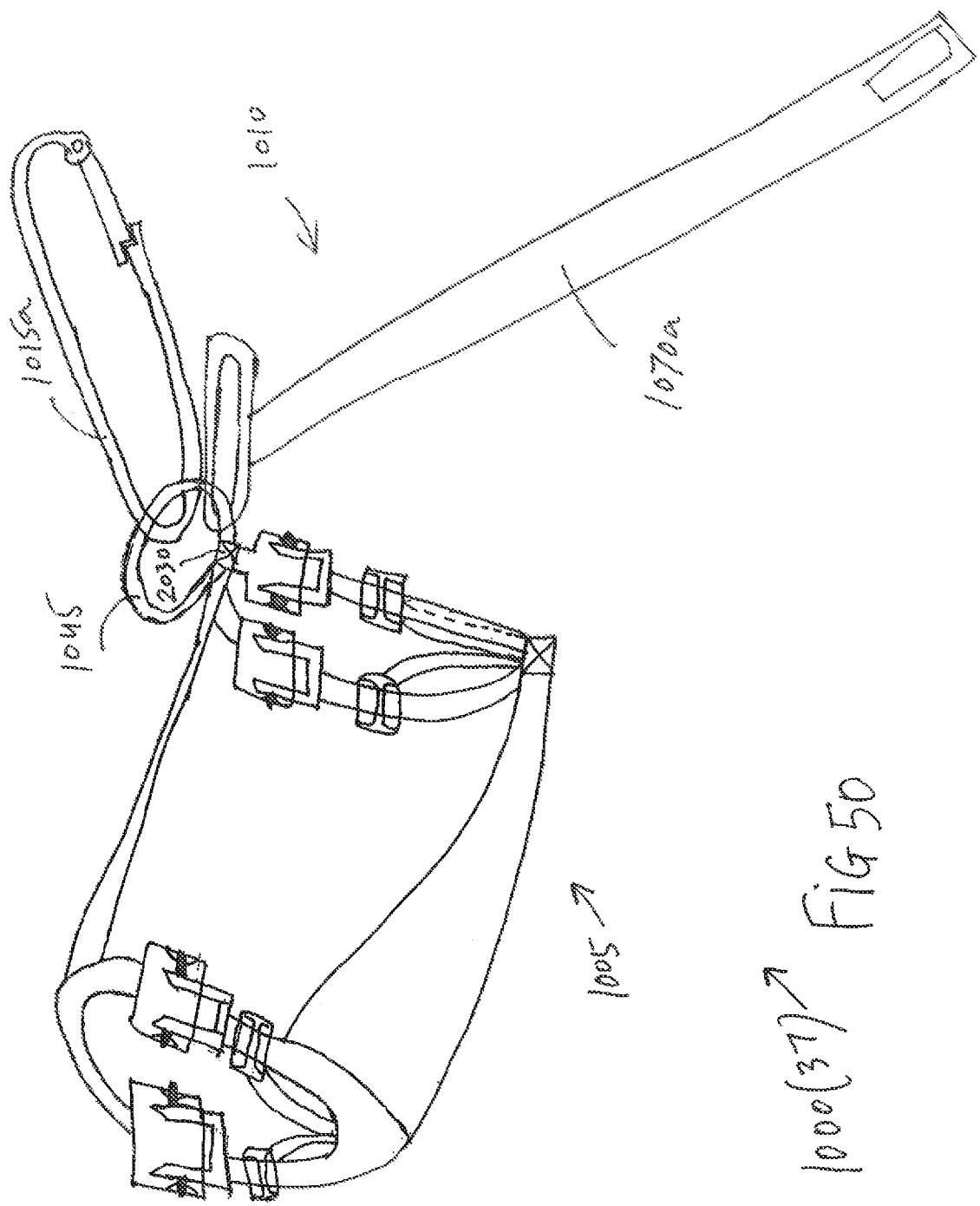
Figure 51:
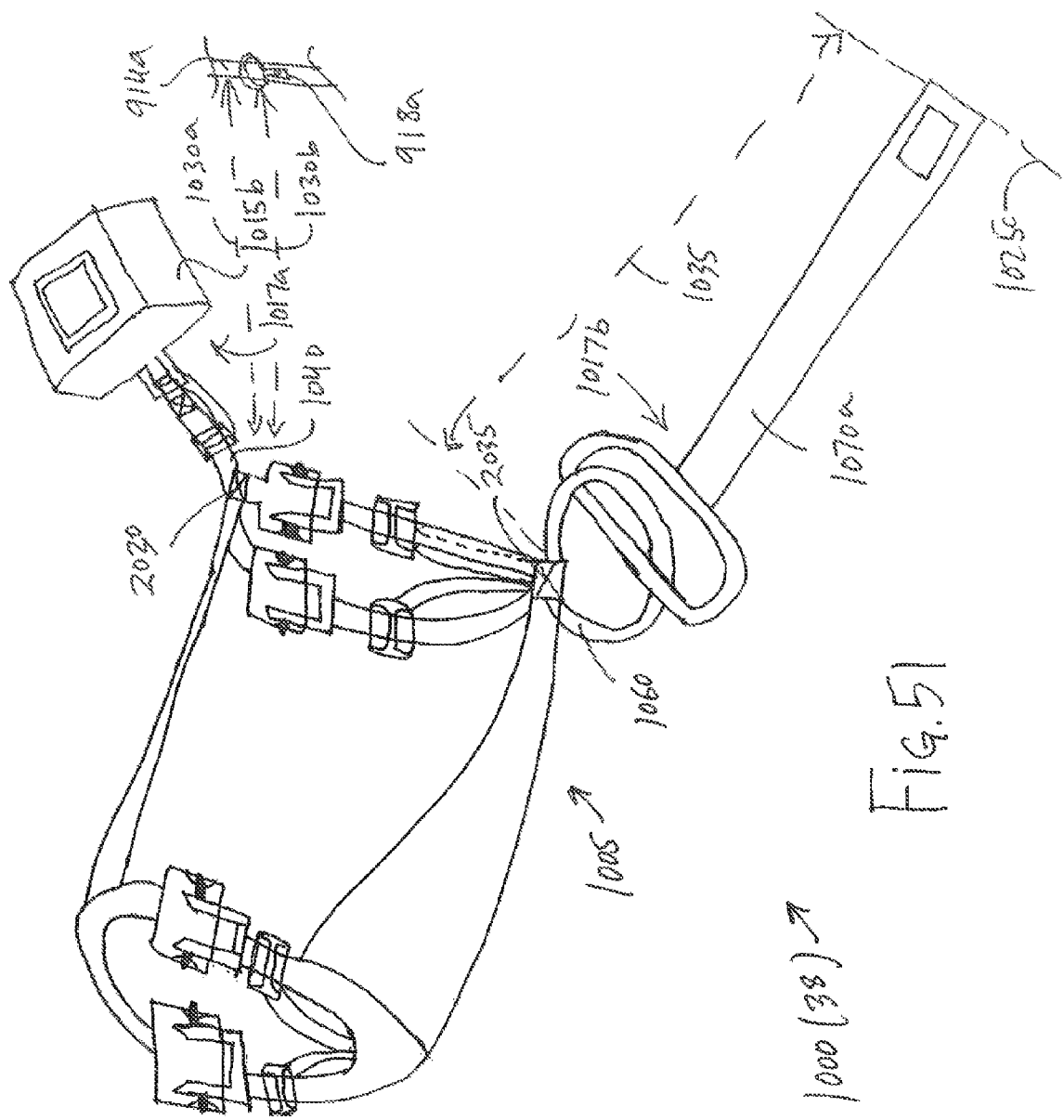

Referring to FIG. 44, a schematic view is shown of a seatbelt harness 1000(31) according to another embodiment of the present invention. Since this embodiment is similar to three different embodiments depicted in FIGS. 13, 17 and 43, the reader is directed to description of these Figures for pertinent details for the purposes of brevity. Referring to FIG. 45, a schematic view is shown of a seatbelt harness 1000(32) according to another embodiment of the present invention. Since this embodiment is similar to three different embodiments depicted in FIGS. 13, 20 and 43, the reader is directed to description of these Figures for pertinent details for the purposes of brevity. Referring to FIG. 46, a schematic view is shown of a seatbelt harness 1000(33) according to another embodiment of the present invention. Since this embodiment is similar to two different embodiments depicted in FIGS. 13, 19 and 43, the reader is directed to description of these Figures for pertinent details for the purposes of brevity. Referring to FIG. 47, a schematic view is shown of a seatbelt harness 1000(34) according to another embodiment of the present invention. Since this embodiment is similar to three different embodiments depicted in FIGS. 13, 19 and 43, the reader is directed to description of these Figures for pertinent details for the purposes of brevity. Referring to FIG. 48, a schematic view is shown of a seatbelt harness 1000(35) according to another embodiment of the present invention. Since this embodiment is similar to three different embodiments depicted in FIGS. 13, 20 and 43, the reader is directed to description of these Figures for pertinent details for the purposes of brevity. Referring to FIG. 49, a schematic view is shown of a seatbelt harness 1000(36) according to another embodiment of the present invention. Since this embodiment is similar to three different embodiments depicted in FIGS. 13, 37 and 43, the reader is directed to description of these Figures for pertinent details for the purposes of brevity. Referring to FIG. 50, a schematic view is shown of a seatbelt harness 1000(37) according to another embodiment of the present invention. Since this embodiment is similar to three different embodiments depicted in FIGS. 13, 38 and 43, the reader is directed to description of these Figures for pertinent details for the purposes of brevity. Referring to FIG. 51, a schematic view is shown of a seatbelt harness 1000(38) according to another embodiment of the present invention. Consistent with this embodiment of the present invention, the restraint portion 1005 of the seatbelt harness 1000(38) may further include the fifth connector 1060 such that the seventh connector 1070a may be fixedly coupled to the fifth connector 1060 attached at the point 2035 on the first vest portion 1075.

In this embodiment, another first connector 1015b may be configured and arranged at the first predetermined position 1017a and the seventh connector 1070a may be configured and arranged at the second predetermined position 1017b relative to the first determined position 1017a. For example, the first and second predetermined positions 1017a, 1017b may be selected for aligning the first and seventh connectors 1015b, 1070a with the restraint portion 1005 such that the attachment portion 1010 to act in conjunction with the restraint portion 1005 to enable positioning of the given pet on the vehicle seat at the desired intermediate point 1022 (not shown, see FIG. 13) along the longitudinal path 1027 (not shown, see FIG. 13) between the first belt connector 918a and the second belt connector 917a or between the first belt connector 918a and the anchor 920a.

Accordingly, in this embodiment of the present invention, the first connector 1015b may be adapted to couple to the first belt connector 918a such that, in use, the restraint portion 1005 has the first distance 1030a or 1030b from the default position of the seatbelt 914a or the default position of the first belt connector 918a, respectively. Likewise, the seventh connector 1070a may be adapted to couple the second belt connector 917a (as shown in FIG. 13) such that, in use, the restraint portion 1005 has the second distance 1035 from the free end 1025c of the seventh connector 1070a. In this way, the seatbelt harness 1000(38) may be configured and arranged such that the second distance 1035 determines the maximum increase allowable to the first distance 1030a or 1030b, i.e., the second distance 1035 controls how much the first distance 1030a or 1030b can be at the most.

Figure 52:
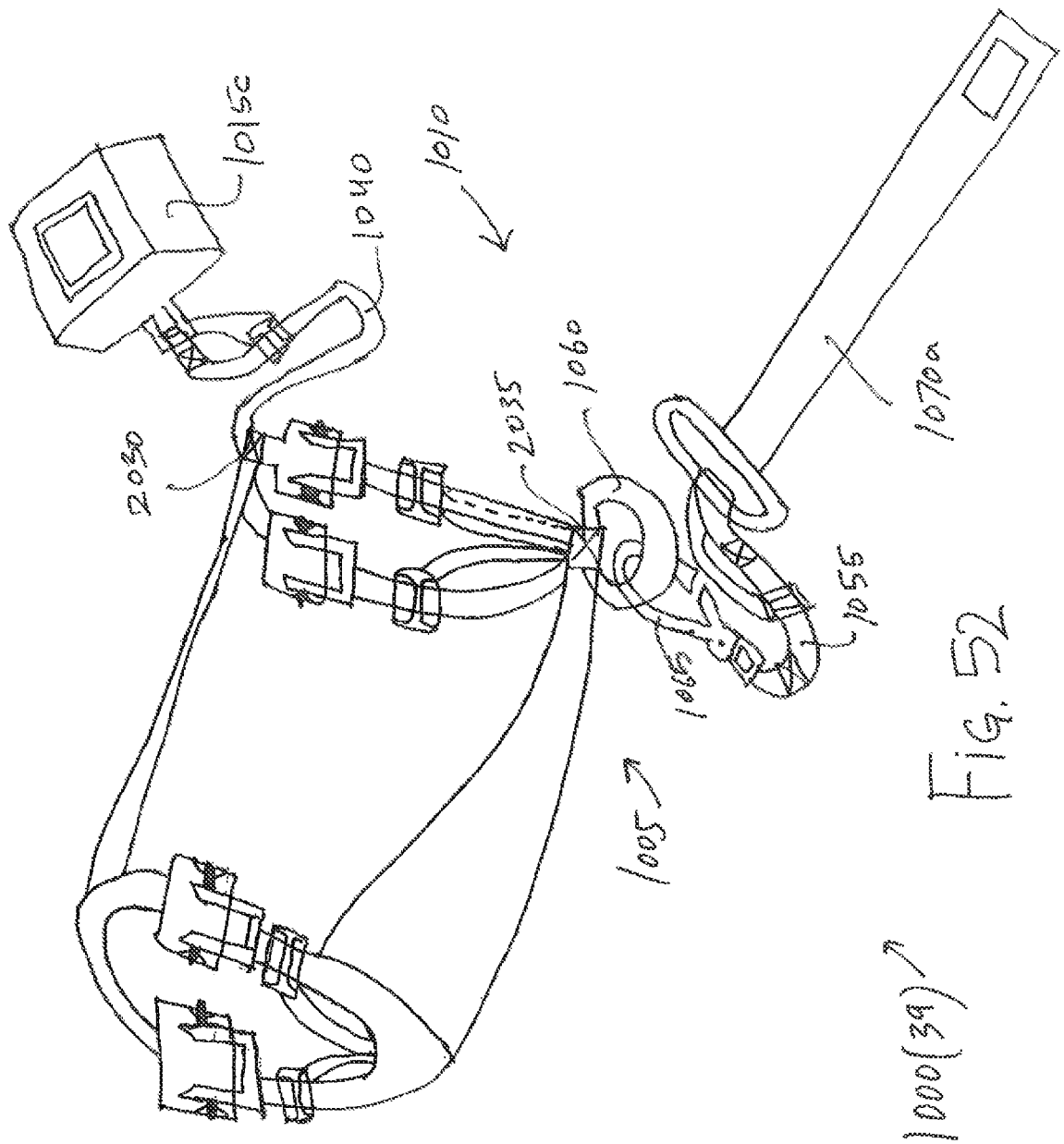
Figure 53:
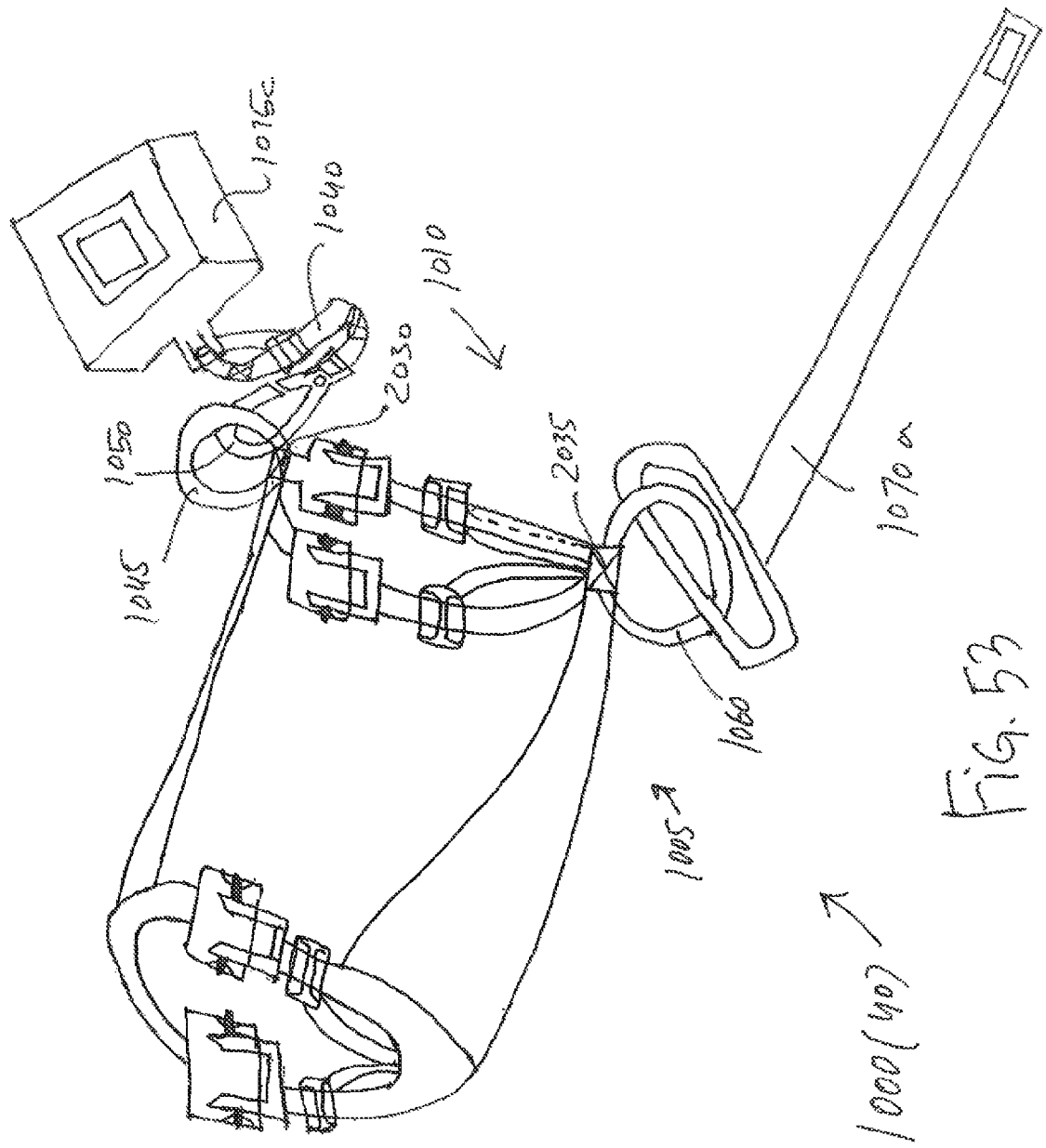
Figure 54:
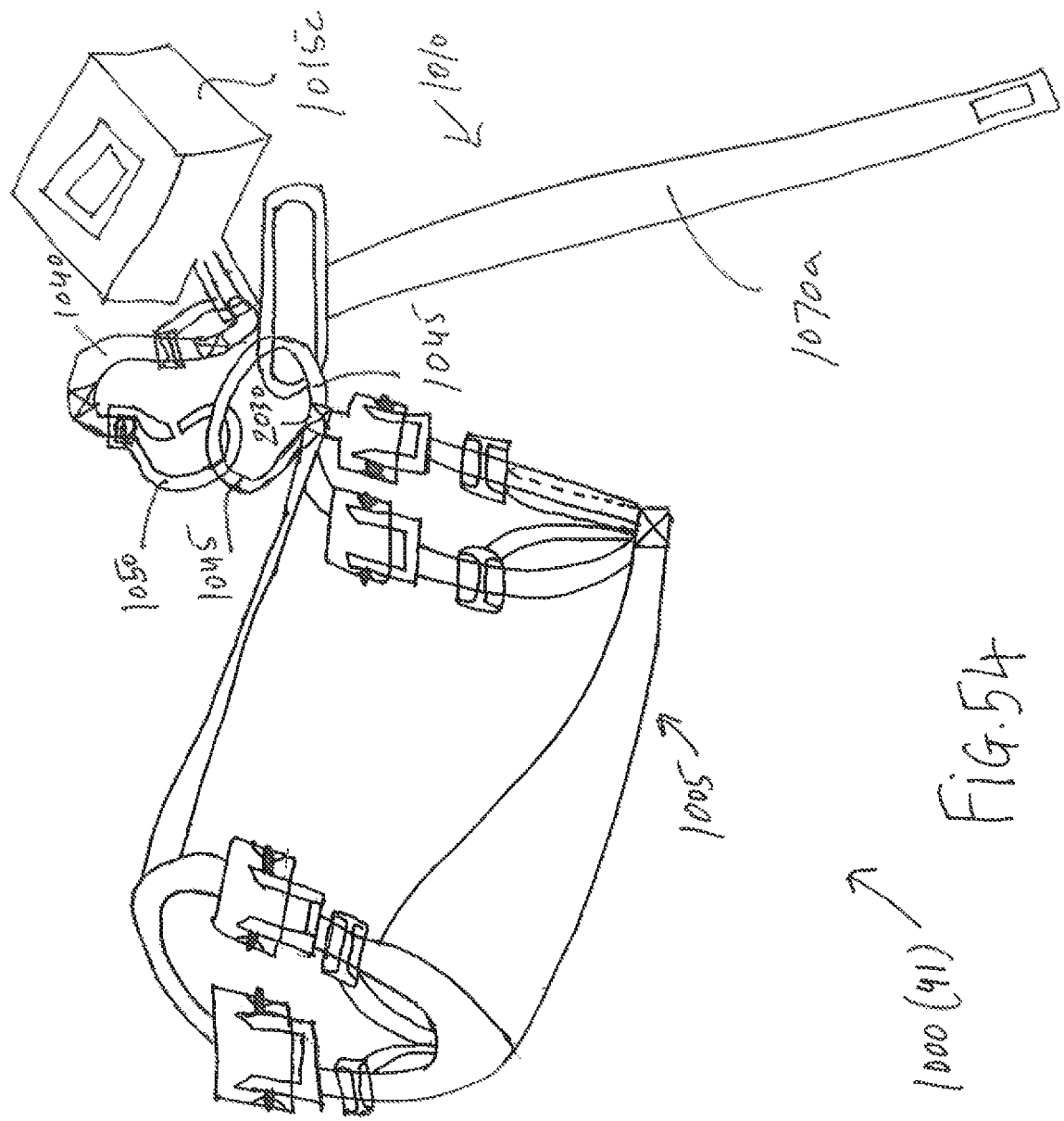
Figure 55:
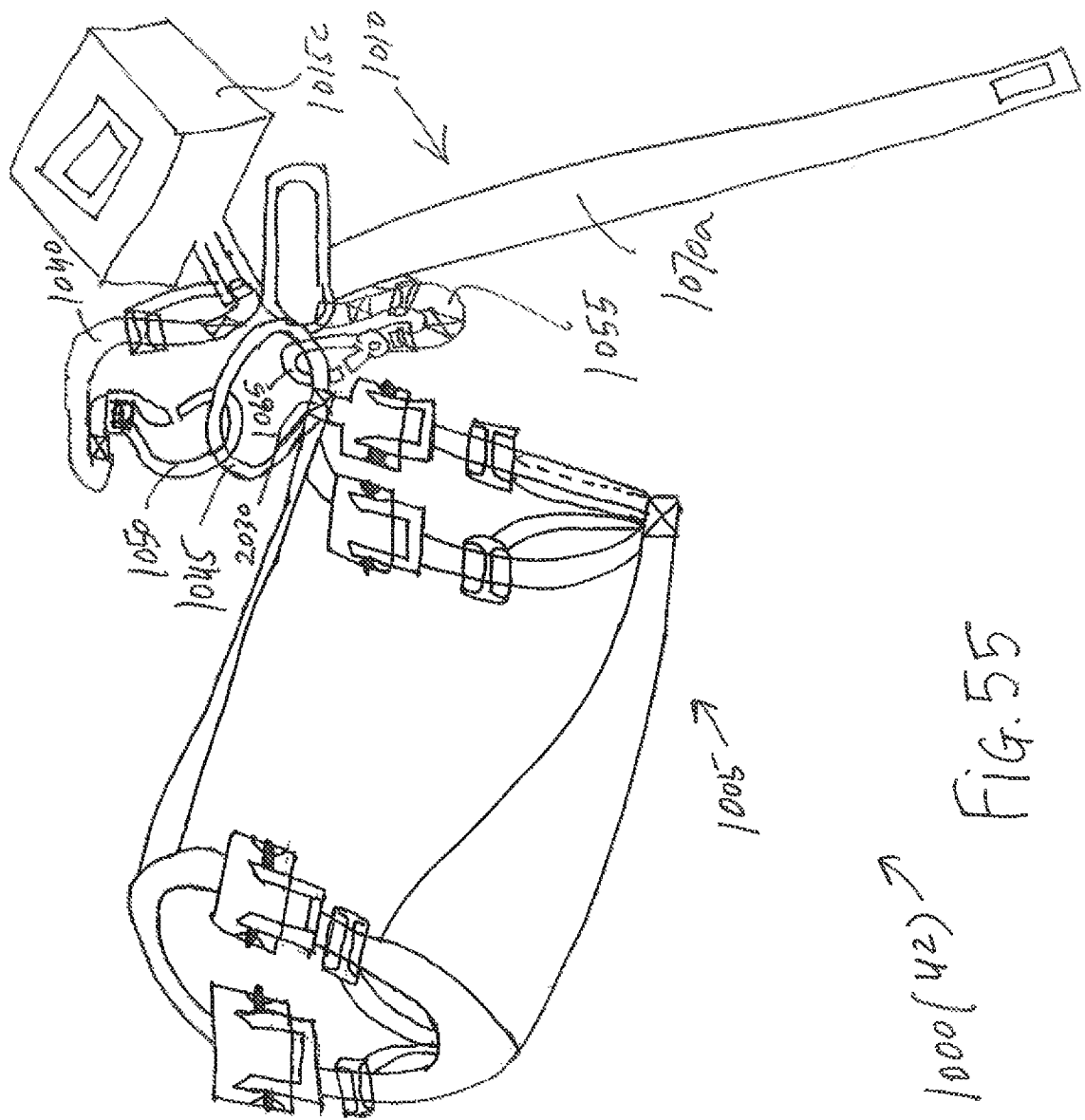
Figure 56:
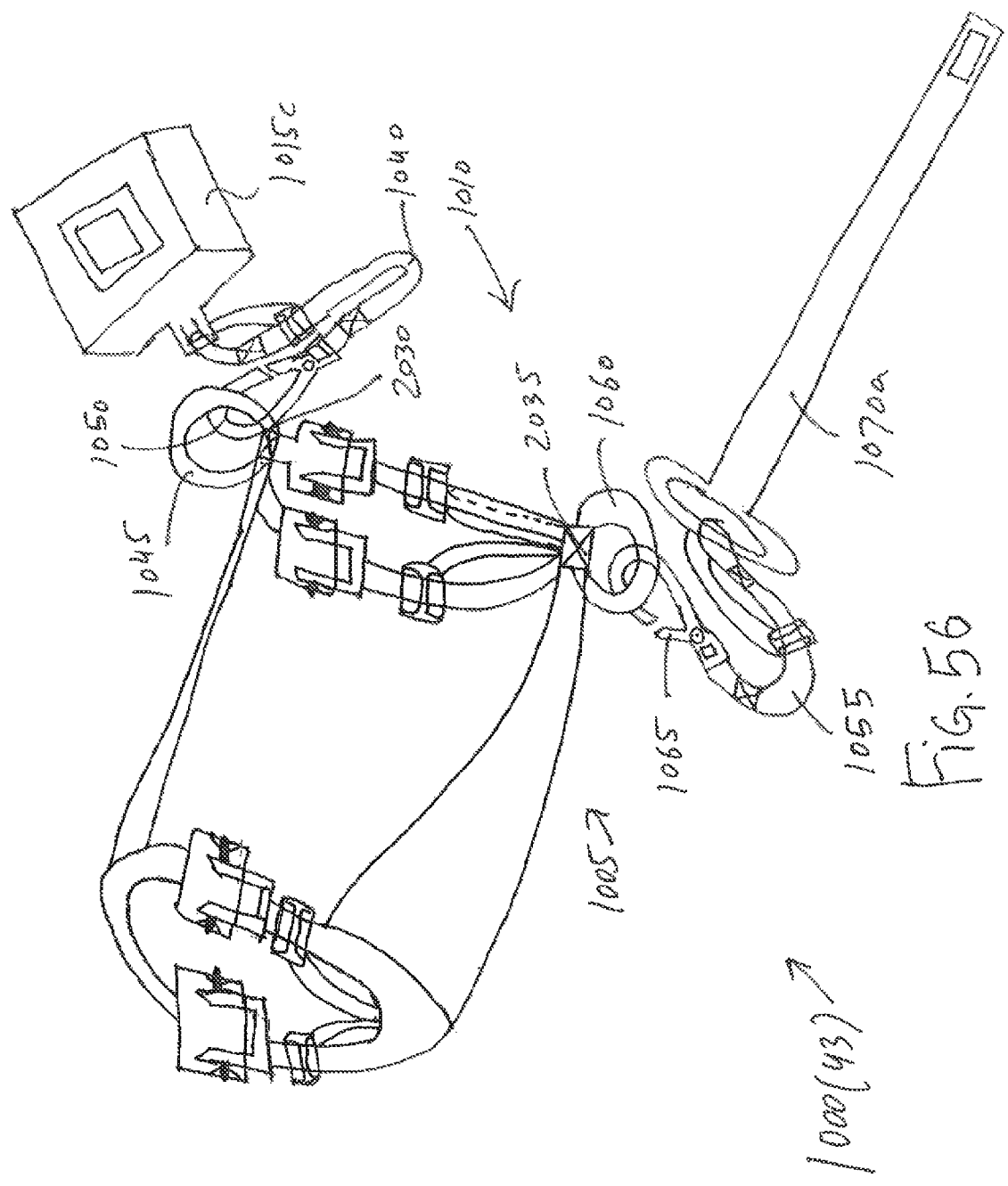

Referring to FIG. 52, a schematic view is shown of a seatbelt harness 1000(39) according to another embodiment of the present invention. Since this embodiment is similar to three different embodiments depicted in FIGS. 13, 17 and 51, the reader is directed to description of these Figures for pertinent details for the purposes of brevity. Referring to FIG. 53, a schematic view is shown of a seatbelt harness 1000(40)

according to another embodiment of the present invention. Since this embodiment is similar to three different embodiments depicted in FIGS. 13, 20 and 51, the reader is directed to description of these Figures for pertinent details for the purposes of brevity. Referring to FIG. 54, a schematic view is shown of a seatbelt harness 1000(41) according to another embodiment of the present invention. Since this embodiment is similar to three different embodiments depicted in FIGS. 13, 19 and 51, the reader is directed to description of these Figures for pertinent details for the purposes of brevity. Referring to FIG. 55, a schematic view is shown of a seatbelt harness 1000(42) according to another embodiment of the present invention. Since this embodiment is similar to three different embodiments depicted in FIGS. 13, 19 and 51, the reader is directed to description of these Figures for pertinent details for the purposes of brevity. Referring to FIG. 56, a schematic view is shown of a seatbelt harness 1000(43) according to another embodiment of the present invention. Since this embodiment is similar to three different embodiments depicted in FIGS. 13, 20 and 51, the reader is directed to description of these Figures for pertinent details for the purposes of brevity.

I claim:

1. A seatbelt harness for use in a motor vehicle having a vehicle seat and an associated shoulder/lap belt combination seatbelt system that has at least one of a seatbelt connected to a seatbelt webbing lock-release system, a first belt connector connected to the seatbelt, a second belt connector and an anchor that connects to an auto child seat which are coupled near or at the vehicle seat so as to restrain a pet, the seatbelt harness comprising:
   a restraint portion configured to be worn by the pet on the torso; and
   an attachment portion coupled to the restraint portion, the attachment portion having first and second connectors each of which having a free end,
   wherein the first connector is adapted to couple to at least one of the seatbelt or the first belt connector in default positions thereof during a state of non-operating mode such that the first connector connects the attachment portion directly to the seatbelt webbing lock-release system,
   wherein the second connector is adapted to couple to at least one of the second belt connector or the anchor,
   wherein the first connector is configured and arranged at a first predetermined position and the second connector is configured and arranged at a second predetermined position relative to the first determined position, and
   wherein the first and second predetermined positions are selected for aligning the first and second connectors with the restraint portion such that the attachment portion to act in conjunction with the restraint portion to enable positioning of the pet on the vehicle seat at an intermediate point along a longitudinal path between the first belt connector and the second belt connector or between the first belt connector and the anchor.

2. The seatbelt harness of claim 1, wherein the first belt connector is connected to the seatbelt which is further connected to the seatbelt webbing lock-release system of the shoulder/lap belt combination seatbelt system, which is configured and arranged to lock a given position on the pet upon at least one of a vehicle collision, a sudden braking or deceleration and a sudden maneuvering of the motor vehicle, and
   wherein, in use, the restraint portion has a first distance from the default position of the seatbelt or the default position of the first belt connector and the restraint portion has a second distance from the free end of the second connector such that the second distance determines the maximum increase allowable to the first distance.

3. The seatbelt harness of claim 1, wherein the attachment portion further comprising:
   a first harness having first and second harness ends, wherein the first harness is disposed between the restraint portion and the first connector such that the first harness end of the first harness is coupled to the restraint portion and the second harness end of the first harness is coupled to the first connector.

4. The seatbelt harness of claim 3, wherein the restraint portion further comprising:
   a third connector and the first harness including a fourth connector at the first harness end, wherein the fourth connector is configured to removably couple to the third connector.

5. The seatbelt harness of claim 3, wherein the attachment portion further comprising:
   a second harness having first and second harness ends, wherein the second harness is disposed between the restraint portion and the second connector such that the first harness end of the second harness is coupled to the restraint portion and the second harness end of the second harness is coupled to the second connector.

6. The seatbelt harness of claim 5, wherein the restraint portion further comprising:
   a third connector and the first harness including a fourth connector at the first harness end, wherein the fourth connector is configured to removably couple to the third connector; and
   a fifth connector and the second harness including a sixth connector at the first harness end, wherein the sixth connector is configured to removably couple to the fifth connector.

7. The seatbelt harness of claim 6, wherein the attachment portion further comprising:
   a seventh connector, wherein the seventh connector is coupled at the second harness end of the second harness.

8. The seatbelt harness of claim 7, wherein the seventh connector is a first prong.

9. The seatbelt harness of claim 5, wherein the attachment portion further comprising:
   a seventh connector, wherein the seventh connector is coupled at the second harness end of the second harness.

10. The seatbelt harness of claim 5, wherein the restraint portion further comprising:
    a third connector and the attachment portion including a fourth connector coupled to the first and second harnesses, wherein the fourth connector is configured to removably couple to the third connector.

11. The seatbelt harness of claim 5, wherein the first connector is a first buckle and the second connector is a second buckle.

12. The seatbelt harness of claim 1, wherein the attachment portion further comprising:
    a second harness having first and second harness ends, wherein the second harness is disposed between the restraint portion and the second connector such that the first harness end of the second harness is coupled to the restraint portion and the second harness end of the second harness is coupled to the second connector.

13. The seatbelt harness of claim 12, wherein the attachment portion further comprising:
    a first harness having first and second harness ends, wherein the first harness is disposed between the restraint portion and the first connector such that the first harness end of the first harness is coupled to the restraint portion and the second harness end of the first harness is coupled to the first connector.

14. The seatbelt harness of claim 13, wherein the restraint portion further comprising:
   a fifth connector and the second harness including a sixth connector at the first harness end, wherein the sixth connector is configured to removably couple to the fifth connector.

15. The seatbelt harness of claim 14, wherein the attachment portion further comprising:
   a seventh connector, wherein the seventh connector is coupled at the second harness end of the second harness.

16. The seatbelt harness of claim 12, wherein the attachment portion further comprising:
   a seventh connector, wherein the seventh connector is coupled at the second harness end of the second harness.

17. A seatbelt harness kit for use in a motor vehicle having a vehicle seat and an associated shoulder/lap belt combination seatbelt system that has at least one of a seatbelt connected to a seatbelt webbing lock-release system, a first belt connector connected to the seatbelt, a second belt connector and an anchor that connects to an auto child seat which are coupled near or at the vehicle seat so as to restrain a pet, the seatbelt harness kit comprising:
   a restraint portion configured to be worn by the pet on the torso; and
   an attachment portion configured to be removably coupled to the restraint portion, the attachment portion having first and second connectors each of which having a free end,
   wherein the first connector is adapted to couple to at least one of the seatbelt or the first belt connector in default positions thereof during a state of non-operating mode such that the first connector connects the attachment portion directly to the seatbelt webbing lock-release system,
   wherein the second connector is adapted to couple to at least one of the second belt connector or the anchor,
   wherein the first connector is configured and arranged at a first predetermined position and the second connector is configured and arranged at a second predetermined position relative to the first determined position, and
   wherein the first and second predetermined positions are selected for aligning the first and second connectors with the restraint portion such that the attachment portion to act in conjunction with the restraint portion to enable positioning of the pet on the vehicle seat at an intermediate point along a longitudinal path between the first belt connector and the second belt connector or between the first belt connector and the anchor.

18. The seatbelt harness kit of claim 17, wherein the first belt connector is connected to the seatbelt which is further connected to the seatbelt webbing lock-release system of the shoulder/lap belt combination seatbelt system, which is configured and arranged to lock a given position on the pet upon at least one of a vehicle collision, a sudden braking or deceleration and a sudden maneuvering of the motor vehicle, and
   wherein, in use, the restraint portion has a first distance from the default position of the seatbelt or the default position of the first belt connector and the restraint portion has a second distance from the free end of the second connector such that the second distance determines the maximum increase allowable to the first distance.

19. The seatbelt harness kit of claim 17, wherein the attachment portion further comprising at least one of:
   a first harness having first and second harness ends, wherein the first harness is disposed between the restraint portion and the first connector such that the first harness end of the first harness is coupled to the restraint portion and the second harness end of the first harness is coupled to the first connector; and
   a second harness having first and second harness ends, wherein the second harness is disposed between the restraint portion and the second connector such that the first harness end of the second harness is coupled to the restraint portion and the second harness end of the second harness is coupled to the second connector.

20. The seatbelt harness kit of claim 19, wherein the restraint portion further comprising at least one of:
   a third connector and the first harness including a fourth connector at the first harness end, wherein the fourth connector is configured to removably couple to the third connector; and
   a fifth connector and the second harness including a sixth connector at the first harness end, wherein the sixth connector is configured to removably couple to the fifth connector.

* * * * *